US012332617B2

(12) United States Patent
Davis et al.

(10) Patent No.: US 12,332,617 B2
(45) **Date of Patent: *Jun. 17, 2025**

(54) BUILDING MANAGEMENT SYSTEM WITH SUSTAINABILITY IMPROVEMENT

(71) Applicant: Tyco Fire & Security GmbH, Neuhausen am Rheinfall (CH)

(72) Inventors: Robbie G. Davis, Milwaukee, WI (US); Katianne Pechauer, Milwaukee, WI (US); Leigh-Golding DeSantis, Milwaukee, WI (US); Surabhi Shroff, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 272 days.

This patent is subject to a terminal disclaimer.

(21) Appl. No.: 18/098,003

(22) Filed: Jan. 17, 2023

(65) Prior Publication Data

US 2023/0152763 A1 May 18, 2023

Related U.S. Application Data

(63) Continuation-in-part of application No. 17/948,118, filed on Sep. 19, 2022.

(Continued)

(51) Int. Cl.
*G05B 15/02* (2006.01)

(52) U.S. Cl.
CPC .................................. *G05B 15/02* (2013.01)

(58) Field of Classification Search
CPC .................................................. G05B 15/02
See application file for complete search history.

(56) References Cited

U.S. PATENT DOCUMENTS 7,580,775 B2 8/2009 Kulyk et al.
7,894,946 B2 2/2011 Kulyk et al.

(Continued)

FOREIGN PATENT DOCUMENTS

EP 2 237 201 A1 10/2010
EP 2 504 807 A2 10/2012

(Continued)

OTHER PUBLICATIONS

U.S. Appl. No. 17/537,046, filed Nov. 29, 2021, Johnson Controls Tyco IP Holdings LLP.

(Continued)

*Primary Examiner* — Gary Collins
(74) *Attorney, Agent, or Firm* — Foley & Lardner LLP

(57) ABSTRACT

A carbon reduction system for a building, the carbon reduction system can include one or more memory devices storing instructions thereon that, when executed by one or more processors, cause the one or more processors to receive operational data for the building, the operational data comprising at least one of current or historical operational data, determine, for the building, a baseline value for carbon emissions based on the operational data, and establish, for the building, a carbon reduction goal to improve carbon emissions for the building from the baseline value for carbon emissions, the carbon reduction goal comprising a target value for carbon emissions and a timeframe to achieve the target value for carbon emissions.

20 Claims, 84 Drawing Sheets

Related U.S. Application Data

(60) Provisional application No. 63/246,177, filed on Sep. 20, 2021, provisional application No. 63/336,935, filed on Apr. 29, 2022, provisional application No. 63/435,191, filed on Dec. 23, 2022.

(56) References Cited

U.S. PATENT DOCUMENTS

| | | | | |
|---|---|---|---|---|
| 8,527,108 | B2 | 9/2013 | Kulyk et al. | |
| 8,527,109 | B2 | 9/2013 | Kulyk et al. | |
| 8,918,223 | B2 | 12/2014 | Kulyk et al. | |
| 9,110,647 | B2 | 8/2015 | Kulyk et al. | |
| 9,429,923 | B2 | 8/2016 | Ward et al. | |
| 9,703,339 | B2 | 7/2017 | Kulyk et al. | |
| 10,139,877 | B2 | 11/2018 | Kulyk et al. | |
| 10,678,227 | B2 | 6/2020 | Przybylski et al. | |
| 10,718,542 | B2 | 7/2020 | Alanqar et al. | |
| 10,884,398 | B2 | 1/2021 | Elbsat et al. | |
| 10,928,784 | B2 | 2/2021 | Craig et al. | |
| 11,068,821 | B2 | 7/2021 | Wenzel et al. | |
| 11,164,126 | B2 | 11/2021 | Elbsat et al. | |
| 11,182,714 | B2 | 11/2021 | Wenzel et al. | |
| 11,567,466 | B1 | 1/2023 | Galvez et al. | |
| 2002/0165671 | A1 | 11/2002 | Middya | |
| 2010/0318200 | A1* | 12/2010 | Foslien | G05B 15/02 700/83 |
| 2013/0134962 | A1 | 5/2013 | Kamel et al. | |
| 2014/0236869 | A1 | 8/2014 | Fujimaki et al. | |
| 2016/0091904 | A1 | 3/2016 | Horesh et al. | |
| 2016/0103475 | A1 | 4/2016 | Lee et al. | |
| 2017/0003676 | A1 | 1/2017 | Yoshida et al. | |
| 2017/0097616 | A1 | 4/2017 | Cozad et al. | |
| 2018/0196456 | A1 | 7/2018 | Elbsat | |
| 2018/0231967 | A1 | 8/2018 | Cohen et al. | |
| 2018/0313563 | A1 | 11/2018 | Turney et al. | |
| 2018/0340704 | A1 | 11/2018 | Turney et al. | |
| 2018/0372362 | A1 | 12/2018 | Turney et al. | |
| 2018/0375444 | A1 | 12/2018 | Gamroth | |
| 2019/0155268 | A1 | 5/2019 | Cohen et al. | |
| 2019/0235453 | A1 | 8/2019 | Turney et al. | |
| 2019/0257544 | A1 | 8/2019 | Alanqar et al. | |
| 2019/0340709 | A1 | 11/2019 | Elbsat et al. | |
| 2020/0026249 | A1 | 1/2020 | Przybylski et al. | |
| 2020/0041158 | A1 | 2/2020 | Turney et al. | |
| 2020/0132328 | A1 | 4/2020 | Boettcher et al. | |
| 2020/0149768 | A1 | 5/2020 | Turney et al. | |
| 2020/0193345 | A1 | 6/2020 | Elbsat et al. | |
| 2020/0218208 | A1 | 7/2020 | Alanqar et al. | |
| 2020/0319610 | A1 | 10/2020 | Ray et al. | |
| 2021/0200169 | A1 | 7/2021 | Ploegert et al. | |
| 2021/0200807 | A1 | 7/2021 | Ploegert et al. | |
| 2021/0270490 | A1 | 9/2021 | Turney et al. | |
| 2021/0356916 | A1 | 11/2021 | Wenzel et al. | |
| 2021/0365861 | A1 | 11/2021 | Elbsat et al. | |
| 2022/0011731 | A1 | 1/2022 | Risbeck et al. | |
| 2022/0042704 | A1 | 2/2022 | Drees et al. | |
| 2022/0058545 | A1 | 2/2022 | Warake et al. | |
| 2022/0092500 | A1 | 3/2022 | Drees et al. | |
| 2022/0137580 | A1 | 5/2022 | Burroughs et al. | |
| 2022/0186962 | A1 | 6/2022 | Turney et al. | |
| 2022/0268471 | A1 | 8/2022 | Turney et al. | |
| 2022/0284519 | A1 | 9/2022 | Pancholi et al. | |
| 2022/0299230 | A1 | 9/2022 | Boettcher et al. | |
| 2022/0299963 | A1 | 9/2022 | Waghmare et al. | |
| 2022/0335547 | A1 | 10/2022 | Wenzel | |
| 2022/0381471 | A1 | 12/2022 | Wenzel et al. | |
| 2022/0390137 | A1 | 12/2022 | Wenzel et al. | |
| 2023/0020417 | A1 | 1/2023 | Elbsat et al. | |
| 2023/0085641 | A1* | 3/2023 | Jones | G05B 15/02 700/275 |
| 2023/0152763 | A1 | 5/2023 | Davis et al. | |
| 2023/0169220 | A1 | 6/2023 | Ramanasankaran et al. | |
| 2023/0236560 | A1 | 7/2023 | Lee et al. | |
| 2023/0253787 | A1 | 8/2023 | Wenzel et al. | |
| 2023/0350387 | A1 | 11/2023 | Davis et al. | |

FOREIGN PATENT DOCUMENTS

| | | | |
|---|---|---|---|
| EP | 3 675 003 | A1 | 7/2020 |
| WO | WO-2010/129913 | A1 | 11/2010 |

OTHER PUBLICATIONS

U.S. Appl. No. 17/668,791, filed Feb. 10, 2022, Johnson Controls Tyco IP Holdings LLP.

U.S. Appl. No. 17/692,642, filed Mar. 11, 2022, Johnson Controls Tyco IP Holdings LLP.

U.S. Appl. No. 17/697,772, filed Mar. 17, 2022, Johnson Controls Tyco IP Holdings LLP.

U.S. Appl. No. 17/710,458, filed Mar. 31, 2022, Johnson Controls Tyco IP Holdings LLP.

U.S. Appl. No. 17/827,439, filed May 27, 2022, Johnson Controls Tyco IP Holdings LLP.

International Search Report and Written Opinion on PCT Appl. No. PCT/US2022/044034 dated Dec. 20, 2022 (12 pages).

International Search Report and Written Opinion on PCT Appl. No. PCT/US2023/020413 dated Jun. 20, 2023 (12 pages).

International Search Report and Written Opinion on PCT Appl. No. PCT/US2023/020414 dated Jun. 15, 2023 (22 pages).

* cited by examiner

FIG. 16
Sustainability Manager
GHG Emissions Totals for 2021
Total Emissions
13,960,000
Total Emissions Reduction
XX,XXX
Net Emissions
XX,XXX
GHG Emissions
GHG Emissions by Scope
XXX
XXX
XXX
XXX
XXX
XXX

FIG. 49
At a Glance View
Portfolio | Emission | Goal 1
BASELINE
LAST YEAR
TARGET
REMAINDER
836.4
666.68
Total Emissions (tCO2e)
By Locations

BEST AVAILABLE IMAGE

FIG. 83
Portfolio | Emission | Goal 1
Reduce total emissions of scope 1 by 90% by 2040 from a 2018 baseline year
BASELINE 2018 1000
LAST YEAR 2021 750
TARGET 2040 100
REMAINDER 2021 650
To stay on track with your 2040 target, your total emissions for 2021 should be at or below:
836
At your current rate, your projected 2022 emissions are:
666
You are on track
Progress toward 2040 Goal
27.7%
Progress against 2018 Baseline
25%
At a glance
Location 4 | Emissions | Target
Reduce total emissions of scope 1 by 91% by 2040 from a 2018 baseline year
BASELINE 2018 450
LAST YEAR 2021 200
TARGET 2040 40
REMAINDER 2021 160
375
116
Building targets for this location have not been setup.
Finish Setup
Location 3 | Emission | Target
Reduce total emissions of scope 1 by 86.7% by 2040 from a 2018 baseline year
BASELINE 2018 225
LAST YEAR 2021 200
TARGET 2040 30
REMAINDER 2021 170
190
192
You are off track

BUILDING MANAGEMENT SYSTEM WITH SUSTAINABILITY IMPROVEMENT

CROSS-REFERENCE TO RELATED PATENT APPLICATIONS

This application is a Continuation-In-Part of U.S. patent application Ser. No. 17/948,118 filed Sep. 19, 2022, which claims the benefit of and priority to U.S. Provisional Patent Application No. 63,246,177 filed on Sep. 20, 2021 and U.S. Provisional Patent Application No. 63,336,935 filed on Apr. 29, 2022, the entirety of each is incorporated by reference herein. This application also claims the benefit of and priority to U.S. Provisional Patent Application No. 63/435,191 filed Dec. 23, 2022, the entirety of which is incorporated by reference herein. The following applications are also incorporated herein by reference in their entireties: U.S. patent application Ser. No. 17/710,458 filed Mar. 31, 2022, U.S. patent application Ser. No. 17/134,661 filed Dec. 28, 2020, U.S. Provisional Patent Application 63/289,499 filed Dec. 14, 2021, and U.S. patent application Ser. No. 17/537,046 filed Nov. 29, 2021.

SUMMARY

At least one embodiment is directed to a building management system (BMS). The BMS can include one or more memory devices storing instructions thereon that, when executed by the one or more processors, cause the one or more processors to receive, for a set of one or more buildings, operational data for the set of buildings, the operational data comprising at least one of current or historical operational data. The instructions can also cause the one or more processors to determine, for the set of buildings, a baseline sustainability performance based on the operational data. The instructions can also cause the one or more processors to establish, for the set of buildings, a sustainability goal to improve a sustainability of the set of buildings from the baseline sustainability performance, the sustainability goal comprising a target sustainability level and a timeframe to achieve the target sustainability level. The instructions can also cause the one or more processors to generate, using the baseline sustainability performance and the sustainability goal, a plurality of control actions for a plurality of pieces of building equipment of the set of buildings to move the sustainability of the set of buildings towards the target sustainability level, and the instructions can also cause the one or more processors to control the plurality of pieces of building equipment using the control actions.

In some embodiments, the sustainability goal comprises a goal to improve a sustainability level impacted by a plurality of sustainability characteristics of the building, and the instructions cause the one or more processors to determine, using the baseline sustainability performance and the sustainability goal, target characteristic levels for the plurality of sustainability characteristics to achieve, in the aggregate, the target sustainability level within the timeframe, and generate, using the target characteristic levels for the plurality of sustainability characteristics, a second plurality of control actions to move operation of the set of buildings towards the target characteristic levels.

In some embodiments, generating the control actions can include generating a first control action for a first set of one or more pieces of the building equipment in a first building equipment domain based on a first target characteristic level of a first sustainability characteristic of a plurality of sustainability characteristics, and generating a second control action for a second set of one or more pieces of the building equipment in a second building equipment domain based on a second target characteristic level of a second sustainability characteristic of the plurality of sustainability characteristics, the second building domain different than the first building domain.

In some embodiments, the instructions cause the one or more processors to receive an indication to update the target sustainability level, wherein the indication includes a user defined target sustainability level that pertains to the sustainability goal for the set of buildings. The instructions can also cause the one or more processors determine, using the user defined target sustainability level and the sustainability goal, that the user defined target sustainability level satisfies the sustainability goal, and update the target sustainability level to reflect the user defined target sustainability level.

In some embodiments, the instructions cause the one or more processors to receive, responsive to using the control actions to control the plurality of pieces of building equipment, second operational data for the set of buildings. The instructions also cause the one or more processors to determine, using the second operational data for the set of buildings, a current sustainability performance, wherein the current sustainability performance is determined responsive to a predetermined period of time. The instructions also cause the one or more processors to determine a difference between the current sustainability performance and the baseline sustainability performance, and determine, responsive to the difference being larger than a predetermined threshold, that the sustainability of the set of buildings has improved.

In some embodiments, the instructions cause the one or more processors to cause a user interface to display an element, wherein the element includes the target sustainability level, the baseline sustainability performance and a difference between the target sustainability level and the baseline sustainability performance.

In some embodiments, the instructions cause the one or more processors to establish, for a particular building of the set of buildings, a second sustainability goal, wherein the second sustainability goal includes a second target sustainability level associated with the particular building of the set of buildings, and generate, using the second target sustainability level and a second baseline sustainability performance, a second plurality of control actions that move the sustainability of the particular building of the set of buildings towards the second target sustainability level.

In some embodiments, the instructions cause the one or more processors to receive an indication to update the second target sustainability level, wherein the indication includes a second user defined target sustainability level, and update the second target sustainability level to reflect the second user defined target sustainability level responsive to determining that the second user defined target sustainability level satisfies the second sustainability goal.

In some embodiments, the instructions cause the one or more processors to establish, for a particular building of the set of buildings, a third sustainability goal, wherein the third sustainability goal includes a third target sustainability level, wherein the particular building includes a second plurality of pieces of building equipment, and generate, using the third target sustainability level and a third baseline sustainability performance, one or more control actions for the second plurality of pieces of building equipment to move the sustainability of the particular building towards the third target sustainability level.

In some embodiments, the instructions cause the one or more processors to control the second plurality of pieces of building equipment using the one or more control actions. The instructions also cause the one or more processors to receive operational data for the second plurality of pieces of building equipment, and determine, using the operational data for the second plurality of pieces of building equipment, that the sustainability of the particular building has moved towards the third target sustainability level In some embodiments, the sustainability of the set of buildings pertains to at least one of carbon emission, greenhouse gas emission, electricity consumption, natural gas consumption, diesel consumption, or butane consumption.

At least one embodiment is directed to a method of improving sustainability of a set of one or more buildings. The method can include receiving, by one or more processors for the set of buildings, operational data for the set of buildings, the operational data comprising at least one of current or historical operational data. The method can also include determining, by the one or more processors for the set of buildings, a baseline sustainability performance based on the operational data. The method can also include establishing, by the one or more processors for the set of buildings, a sustainability goal to improve a sustainability of the set of buildings from the baseline sustainability performance, the sustainability goal comprising a target sustainability level and a timeframe to achieve the target sustainability level. The method can also include generating, by the one or more processors using the baseline sustainability performance and the sustainability goal, one or more operational changes for a plurality of pieces of building equipment of the set of buildings to move the sustainability of the set of buildings towards the target sustainability level, and outputting, by the one or more processors, the generated operational changes.

In some embodiments, the sustainability goal comprises a goal to improve a sustainability level impacted by a plurality of sustainability characteristics of the building, and the method includes determining, by the one or more processors using the baseline sustainability performance and the sustainability goal, target characteristic levels for the plurality of sustainability characteristics to achieve, in the aggregate, the target sustainability level within the timeframe, and generating, by the one or more processors using the target characteristic levels for the plurality of sustainability characteristics, a plurality of control actions to move operation of the set of buildings towards the target characteristic levels.

In some embodiments, the method can include generating, by the one or more processors, a first control action for a first set of one or more pieces of the building equipment in a first building equipment domain based on a first target characteristic level of a first sustainability characteristic of a plurality of sustainability characteristics, and generating, by the one or more processors, a second control action for a second set of one or more pieces of the building equipment in a second building equipment domain based on a second target characteristic level of a second sustainability characteristic of the plurality of sustainability characteristics, the second building domain different than the first building domain.

In some embodiments, the method can include receiving, by the one or more processors, an indication to update the target sustainability level, wherein the indication includes a user defined target sustainability level that pertains to the sustainability goal for the set of buildings. The method can also include determining, by the one or more processors using the user defined target sustainability level and the sustainability goal, that the user defined target sustainability level satisfies the sustainability goal, and updating, by the one or more processors, the target sustainability level to reflect the user defined target sustainability level.

In some embodiments, outputting the generated operational changes comprises generating a recommendation to implement the one or more operational changes, and the method can include receiving, by the one or more processors, approval to implement the one or more operational changes. The method can also include generating control actions to implement the operational changes, and controlling the building equipment using the generated control actions.

In some embodiments, the method can include establishing, by the one or more processors for a particular building of the set of buildings, a second sustainability goal, wherein the second sustainability goal includes a second target sustainability level associated with the particular building of the set of buildings, and generating, by the one or more processors using the second target sustainability level and a second baseline sustainability performance, a plurality of control actions that move the sustainability of the particular building of the set of buildings towards the second target sustainability level.

At least one embodiment is directed to a carbon reduction system for a building. The carbon reduction system can include one or more memory devices storing instructions thereon that, when executed by the one or more processors, cause the one or more processors to receive operational data for the building, the operational data comprising at least one of current or historical operational data. The instructions can also cause the one or more processors to determine, for the building, a baseline value for carbon emissions based on the operational data, and establish, for the building, a carbon reduction goal to improve carbon emissions for the building from the baseline value for carbon emissions, the carbon reduction goal comprising a target value for carbon emissions and a timeframe to achieve the target value for carbon emissions.

In some embodiments, the instructions cause the one or more processors to generate, using the baseline value for carbon emissions and the carbon reduction goal, a plurality of control actions for a plurality of pieces of building equipment of the building to move the sustainability of the building towards the target value for carbon emissions, and control the plurality of pieces of building equipment using the control actions.

In some embodiments, the instructions cause the one or more processors to receive, responsive to using a plurality of control actions to control a plurality of pieces of building equipment of the building, second operational data for the building. The instructions can also cause the one or more processors to determine, using the second operational data for the building, a current value for carbon emissions, wherein the current value for carbon emissions is determined responsive to a predetermined period of time. The instructions can also cause the one or more processors to determine a difference between the current value for carbon emissions and the baseline value for carbon emissions, and determine, responsive to the difference being larger than a predetermined threshold, that the sustainability of the building has moved towards the target value for carbon emissions.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 85 is a flow diagram of process for establishing a business goal, according to an exemplary embodiment.

DETAILED DESCRIPTION

Referring generally to the FIGURES, systems and methods are provided for sustainability assessment and/or improvement for one or more buildings, according to various exemplary embodiments. A sustainability optimization system can be configured to collect various pieces of information regarding a building, e.g., energy supply data, on-site energy generation systems, demand data, indications of building equipment, etc. The sustainability optimization system can be configured to run an optimization on the collected data to identify improvements for the building that result in sustainable operation of the building. For example, the optimization can optimize for various metrics of the building, e.g., carbon footprint, energy usage, financial cost, etc. The result of the optimization could be to retrofit certain pieces of building equipment, install on-site solar panels, purchase renewable energy credits (RECs), generate a building control plan, etc. In some implementations, the system can additionally or alternatively provide an assessment of historical, present, and/or future sustainability performance of the building, spaces of the building, occupants of the building, equipment of the building, etc., either with or without recommendations for improving the performance.

The optimization can, in some embodiments, result in building planning that causes the building to meet a sustainability goal in a particular timeline. For example, the user may have a goal for their building to reach net-zero carbon emissions (or a predefined and/or user-defined level of carbon emissions) over a certain timeframe (e.g., the next thirty years). The optimization can run periodically, e.g., every year, to optimize over an optimization period (e.g., the next five years) and to meet the goal over the total planning period (e.g., the next thirty years). In some embodiments, the optimization can additionally or alternatively be run on request/demand of a user, upon the occurrence of certain events/targets, etc.

Building Management System and HVAC System

Figure 1:
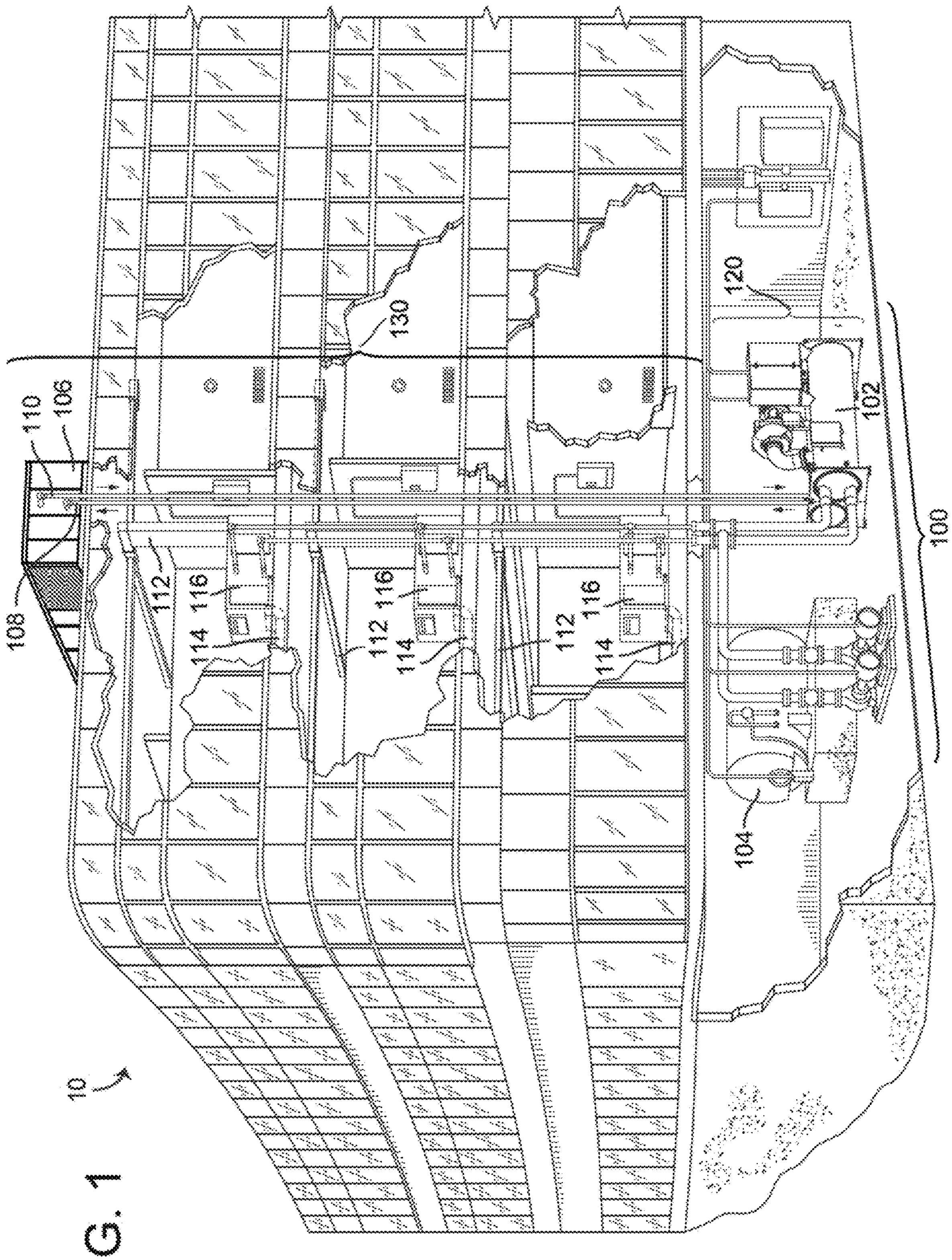
FIG. 1 is a drawing of a building equipped with a HVAC system, according to an exemplary embodiment.

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
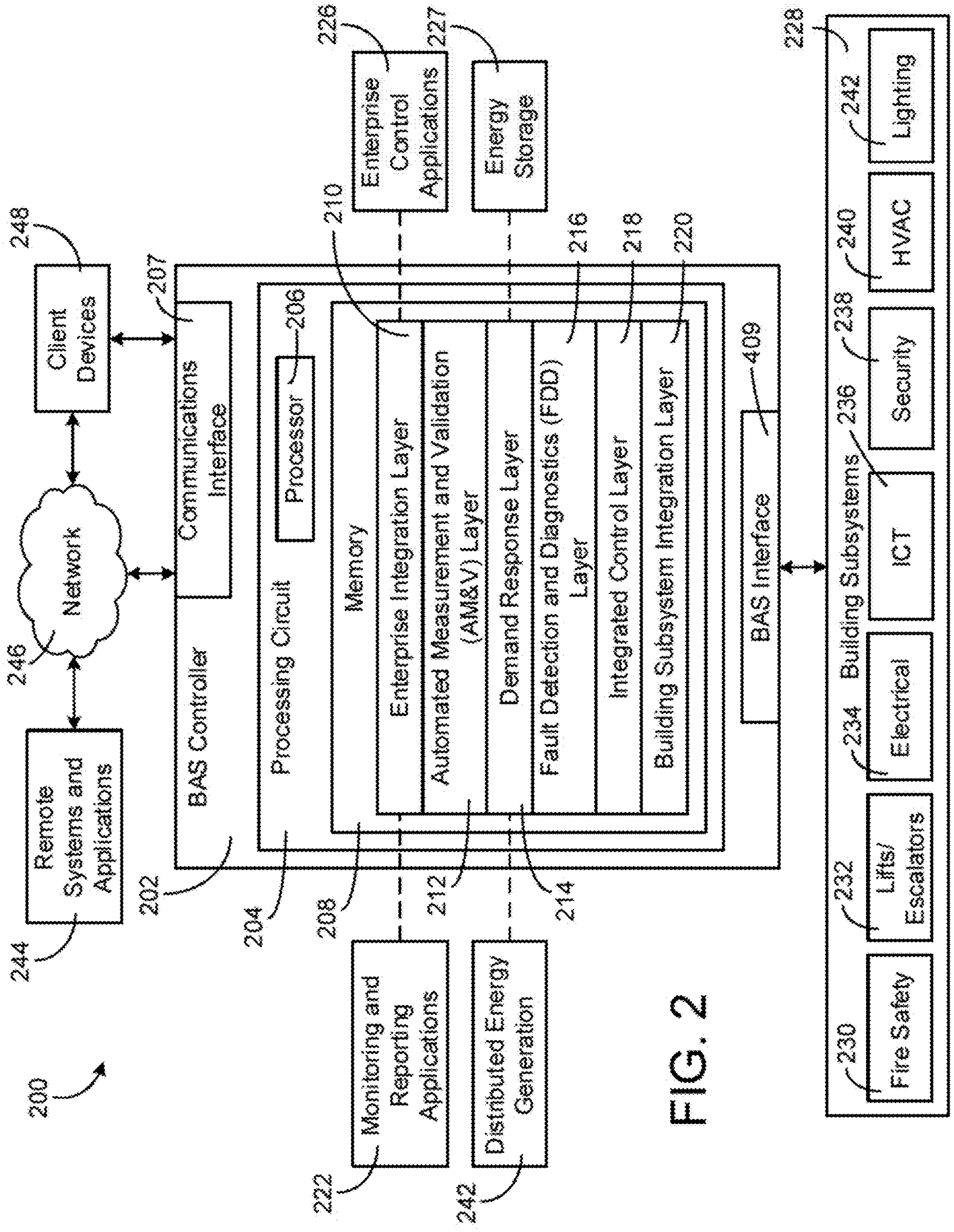
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 202 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 202 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 2 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data sources, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Figure 3:
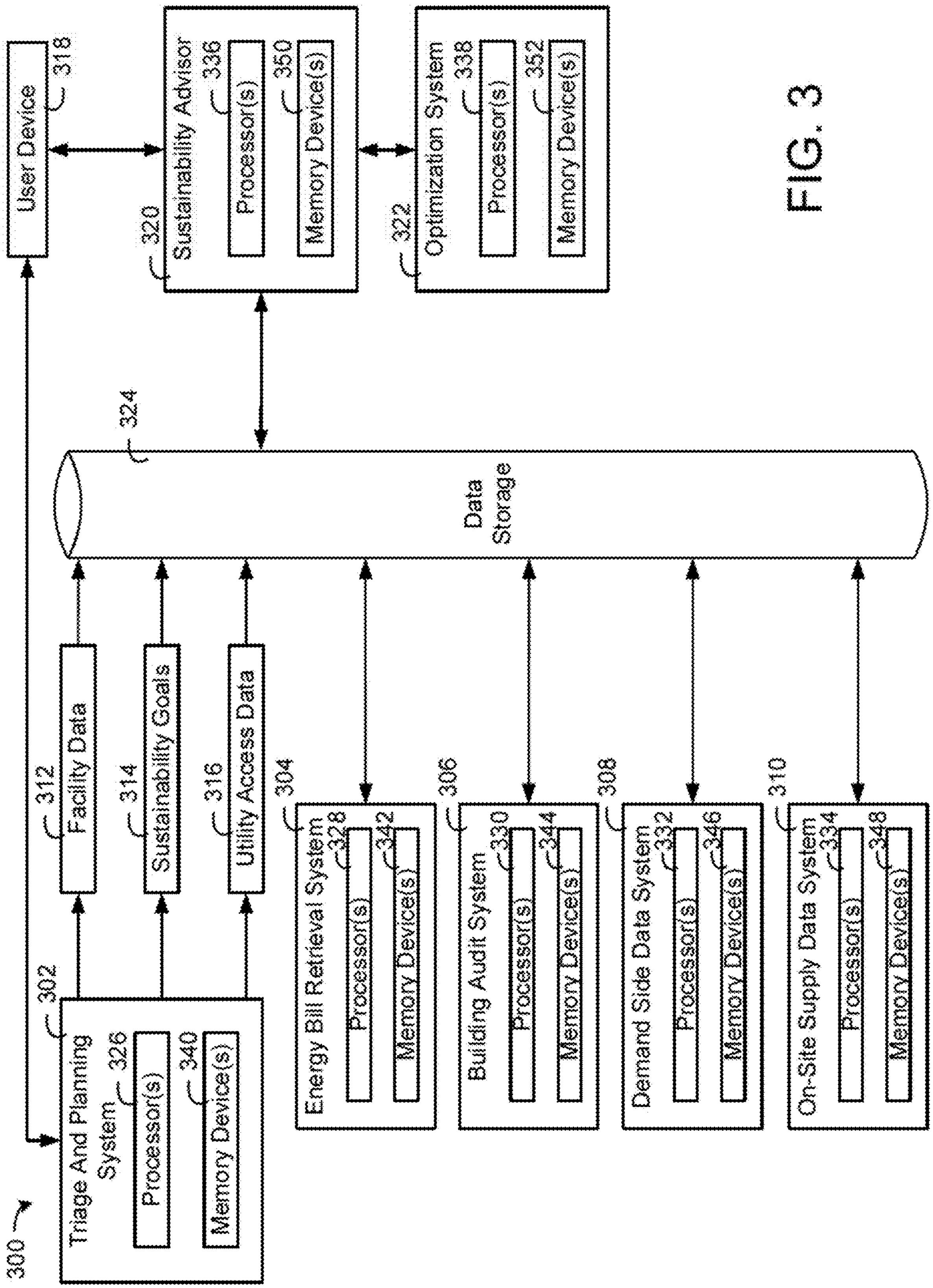
FIG. 3 is a block diagram of a system for sustainability optimization for planning a building, according to an exemplary embodiment.

Referring now to FIG. 3, a system 300 for sustainability optimization for planning a building is shown, according to an exemplary embodiment. The system 300 includes a triage and planning system 302 that is configured to interact with a user, via a user device 318. The system 300 further includes an energy bill retrieval system 304 configured to retrieve energy bills for a building. The system 300 further includes a building audit system 306 configured to collect and aggregate audit data for the building. The system 300 further includes a demand side data system 308 configured to collect demand related data from various building subsystems of a building.

Furthermore, the system 300 includes an on-site supply data system 310 configured to collect data regarding on-site supply systems of the building. Furthermore, the system 300 includes a sustainability advisor 320 configured to present sustainability related optimization results to a user via the user device 318. The system 300 includes an optimization system 322 configured to run an optimization that can identify optimal building retrofit decisions, building improvements, and/or operating plans.

The components of the system 300 can, in some embodiments, be run as instructions on one or more processors. The instructions can be stored in various memory devices. The processors can be the processors 326-338 and the memory devices can be the memory devices 340-352. The processors 326-338 can be implemented as a general purpose processor, an application specific integrated circuit (ASIC), one or more field programmable gate arrays (FPGAs), a group of processing components, or other suitable electronic processing components. The memory devices 340-352 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory devices 340-352 can be or include volatile memory and/or non-volatile memory.

The memory devices 340-352 can include object code components, script components, or any other type of information structure for supporting the various activities and information structures described in the present application. According to some embodiments, the memory 406 is communicably connected to the processors 326-338 and can include computer code for executing (e.g., by the processors 326-338) one or more processes of functionality described herein.

The system 300 includes data storage 324. The data storage 324 can be a database, a data warehouse, a data lake, a data lake-house, etc. The data storage 324 can store raw data, aggregated data, annotated data, formatted data, etc. The data storage 324 can act as a repository for all data collected from the triage and planning system 302, the energy bill retrieval system 304, the building audit system 306, the demand side data system 308, the on-site supply data system 310, the sustainability advisor 320, the optimization system 322, and/or any other system. In some embodiments, the data storage 324 can, in some embodiments, be a digital twin. The digital twin can, in some embodiments, be a graph data structure. The digital twin can be the digital twin described with reference to U.S. patent application Ser. No. 17/134,664 filed Dec. 28, 2020.

The triage and planning system 302 can provide one or more user interfaces to a user via the user device 318. The user interfaces can allow the user to interact and provide various pieces of information describing a building while the building is in a design phase and/or for an onboarding phase where a user first registers with the system 300 to begin sustainability planning for their building. The triage and planning system 302 can receive facility data 312, sustainability goals 314, and/or utility access data 316. The facility data 312 can describe a building facility, e.g., provide a name of the facility or campus, identify a number of buildings in the facility or campus, identify a use of each building, include a name of each building, indicate campus layout, indicate building size, indicate building square footage, indicate campus square footage, indicate geographic location, etc.

The triage and planning system 302 can receive sustainability goals 314 from the user devices 318. The sustainability goals 314 can be customer goals for their building with respect to energy reduction, carbon creation, carbon footprint, water usage reduction, switching to renewable energy, purchasing a certain number of renewable energy credits, etc. The goals can include target levels for energy consumption, carbon production, net zero carbon emissions, renewable energy, etc. The goals can further include timelines for the various target levels. For example, the timeline could be a period of time into the future, e.g., a number of days, weeks, months, years, decades, etc. The timeline can indicate a target date. For example, the timeline could be that a building is energy independent in the next forty years, or that the building is at a net-zero carbon emissions level in the next twenty five years. In some embodiments, the timelines for the sustainability goals can be returned to the user via the user device 318 with recommendations for meeting certain goals, e.g., a recommendation could be to extend a recommendation by five years (e.g., to 25 year) to hit a certain carbon emissions level which would be more financially feasible than attempting to meet the carbon emissions level in 20 years.

Figure 4:
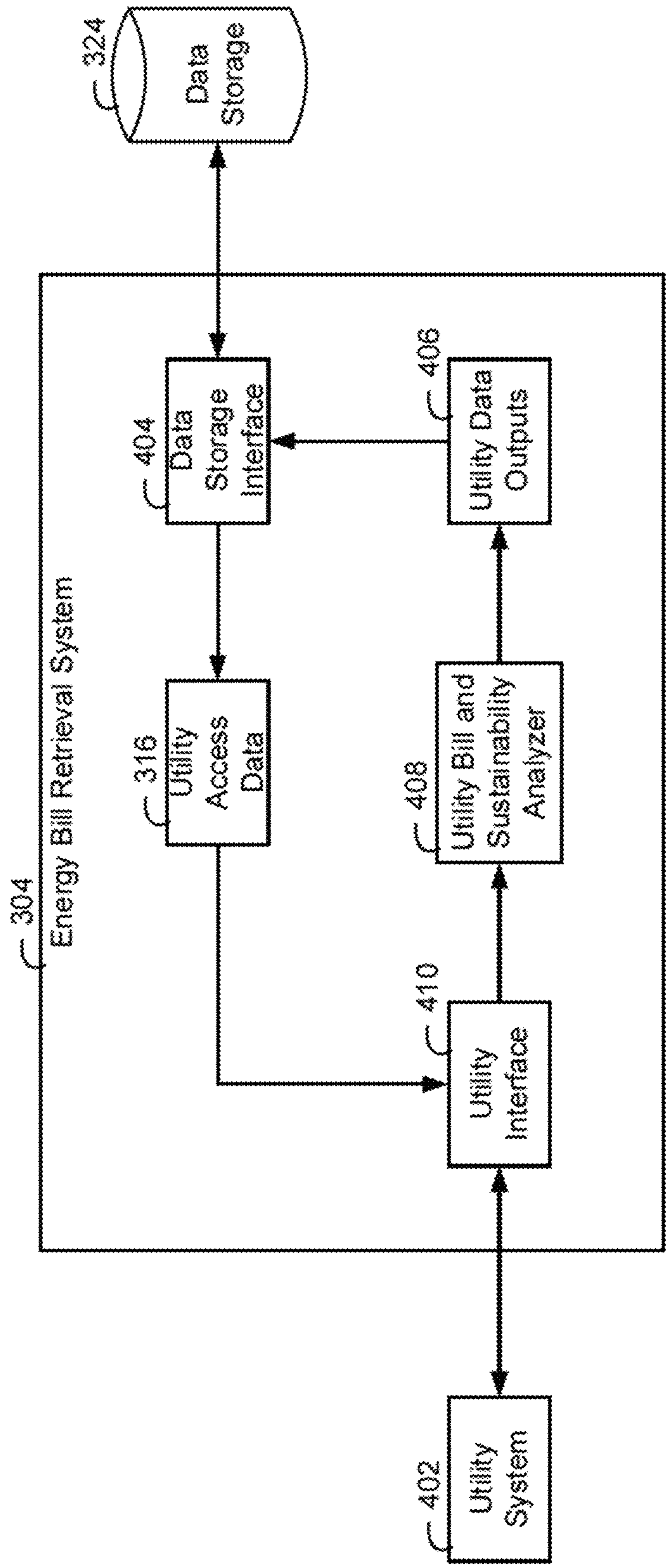
FIG. 4 is a block diagram of an energy bill retrieval system of the sustainability optimization system of FIG. 3, the energy bill retrieval system retrieving utility bills for the building, according to an exemplary embodiment.

Referring now to FIG. 4, energy bill retrieval system 304 of the sustainability optimization system 300, the energy bill retrieval system retrieves utility bills for the building, according to an exemplary embodiment. The energy bill retrieval system 304 can be configured to retrieve utility access data 316 from the data storage 324 via a data storage interface 404. The bills can be electric bills, natural gas bills, water bills, etc. The data storage interface 404 can be an interface that integrates with the data storage 324 via an application programming interface (API) or otherwise exposes and API to external systems. A utility interface 410 can receive the utility access data 316 and retrieve utility bills from a utility system 402 based on the utility access data 316. The utility access data 316 can include a username, a login credential, an email address, an access code, an account number, a name of the energy provider, etc.

A utility interface 410 can, in some embodiments, integrate with the utility system 402 via the utility access data 316. The utility bills can include electricity consumption, water consumption, gas consumption, solar power electric consumption, wind turbine electric consumption, the utility interface 410 can provide the energy bills to a utility bill and sustainability analyzer 408. The analyzer 408 can run various analytics on the utility bills.

For example, the analyzer 408 could identify invoice data, perform an audit on utility bill data, and/or perform an analysis on energy rates and/or tariffs for the energy (e.g., environmental penalties for various forms of energy). The analyzer 408 can identify an energy consumption baseline for the building, identify benchmarking for the building (e.g., compare the baseline of the building to other peer buildings or an industry to determine a benchmark index), determine facility key performance indicators (KPIs), etc.

The analyzer 408 can identify sustainability data, for example, a carbon emissions baseline for the building (e.g., carbon emissions produced from natural gas or carbon emissions from electricity consumption), sustainability benchmarking (e.g., a peer comparison of the emissions baseline for the building against other buildings), renewable energy usage tracking, etc. The analyzer 408 can generate sustainability reports (e.g., an indication between a baseline emissions and a current emissions to show sustainability tracking), management and verification (M&V) reports, etc. The results of the analysis performed by the analyzer 408 can be the utility data outputs 406 which can be stored in the data storage 324 by the data storage interface 404. In some embodiments, the M&V reporting could illustrate savings between a baseline and an improvement for the building. For example, the M&V reporting could indicate a carbon emissions reduction that results (compared to a baseline) from a particular FIM.

Figure 5:
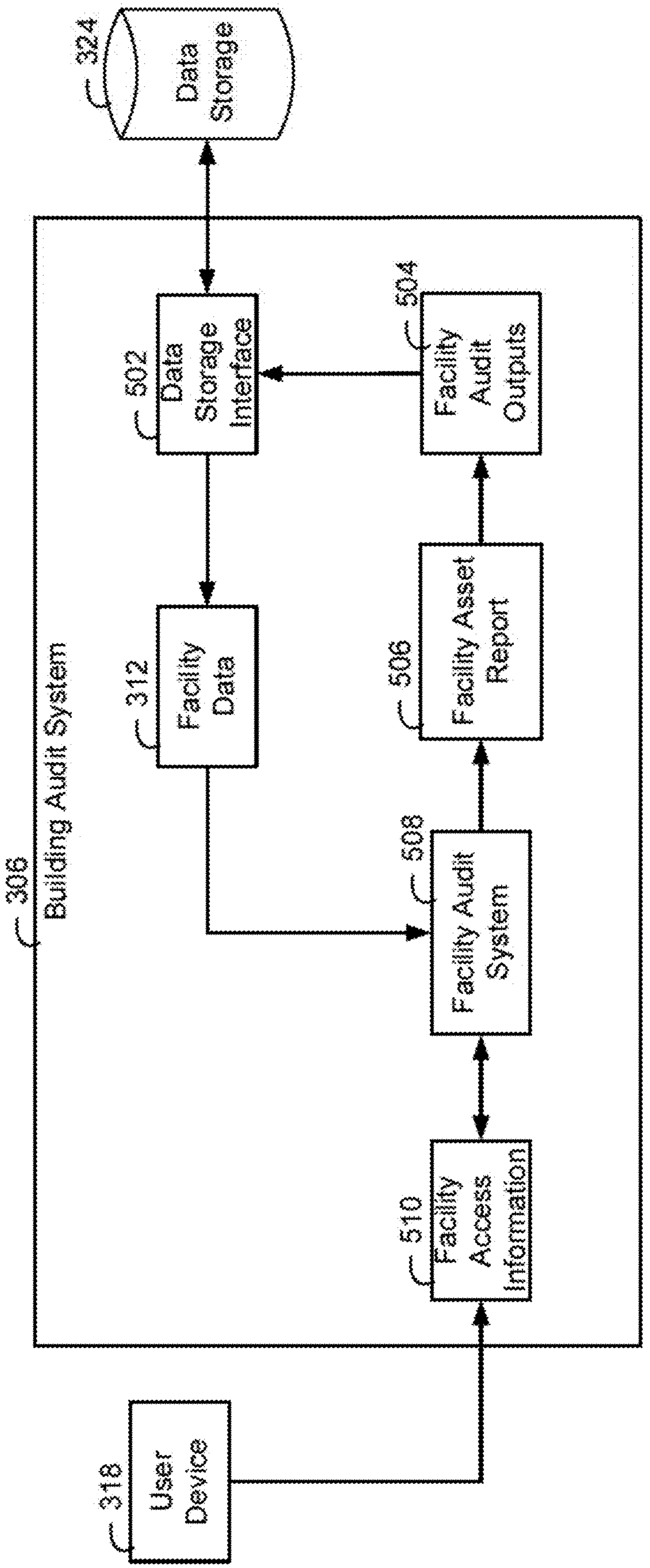
FIG. 5 is a block diagram of a building audit system of the system of FIG. 3, the facility audit system configured to collect building data of the building via an audit, according to an exemplary embodiment.

Referring now to FIG. 5, the building audit system 306 of the system 300 is shown, the facility audit system 306 is configured to collect building data of the building via an audit, according to an exemplary embodiment. The building audit system 306 includes a data storage interface 502 that can be the same as, or similar to the data storage interface 404. The interface 504 can retrieve the facility data 312 from the data storage 324. The facility data 312 can be provided to a facility audit system 508. Furthermore, a user, via the user device 318, can provide facility access information 510 (e.g., key codes, registration details, access directions, etc.) to the facility audit system 508. The facility audit system 508 can receive audit details from audit personnel who visit the physical building and record information regarding the building.

Based on the audit data collected by the audit personnel and provided to facility audit system 508, the facility audit system 508 can compile a facility asset report 506. The facility asset report can include information such as a detailed facility description. The facility description can identify each room, zone, and/or floor of a building and indicate the square footage and/or ceiling height of each area of the building. The report 506 can include an equipment inventory. The equipment inventory can indicate the number, make, model, etc. of each piece of equipment in the building. For example, the number and type of chillers in the building could be indicated in the report 506. Furthermore, a maintenance log of all maintenance operations of equipment inventory can be included in the report 506. Furthermore, the report 506 could include photos of all pieces of equipment of the building. The report 506 could further include building envelop information. The result of all the audit outputs of the system 508, including the facility asset report 506, can be stored in the data storage 324 by the data storage interface 502.

Figure 6:
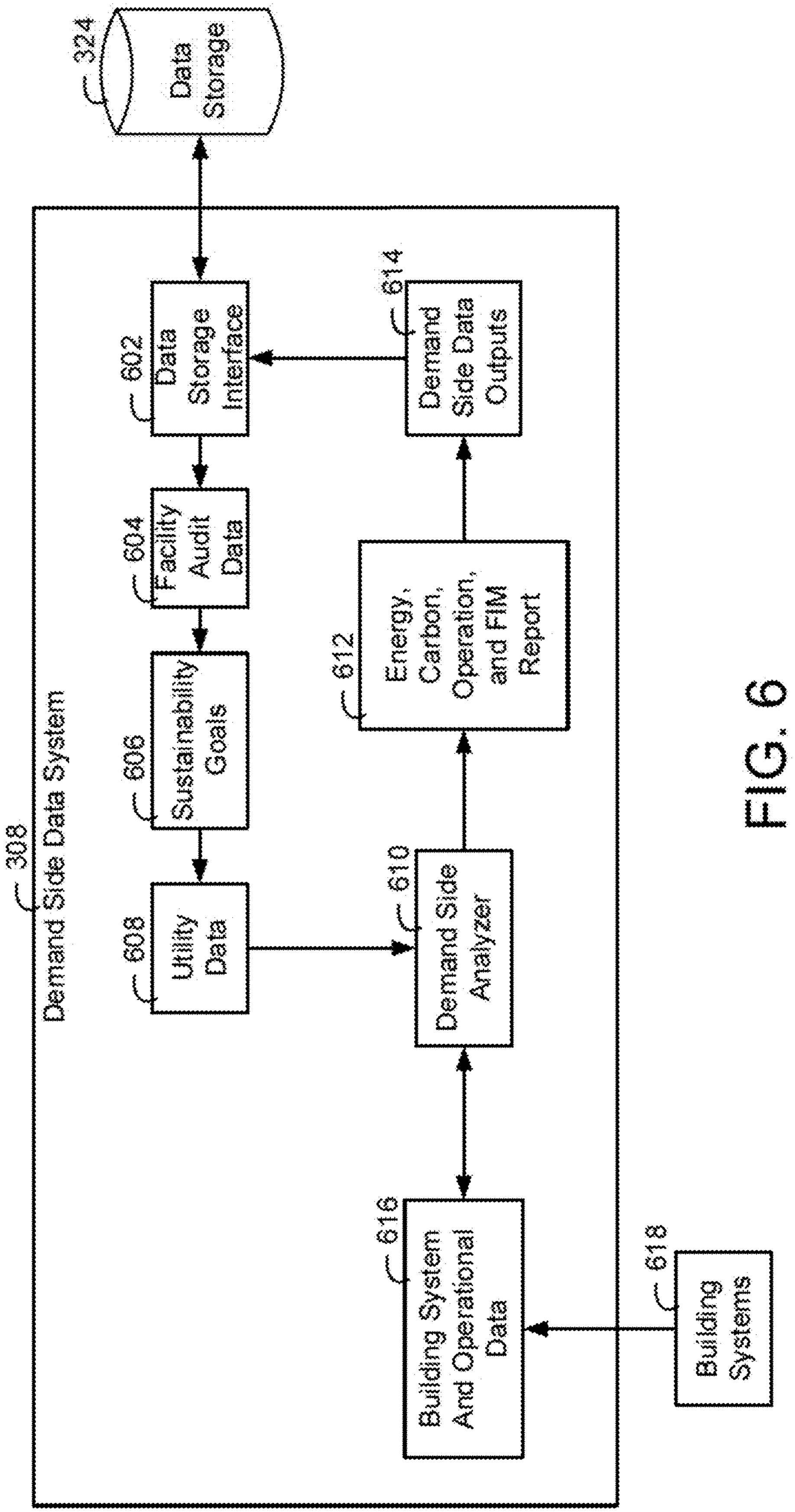
FIG. 6 is a block diagram of a demand side data system of the system of FIG. 3, the demand side data system configured to collect building system and operational data from a building and calculate energy metrics, carbon metrics, operational metrics, and facility improvement measures (FIMs) for the building, according to an exemplary embodiment.

Referring now to FIG. 6, a demand side data system 308 of the system 300, the demand side data system configured to collect building system and operational data from a building and calculate energy metrics, carbon metrics, operational metrics, and facility improvement measures (FIMs) for the building, according to an exemplary embodiment. The system 308 can retrieve facility audit data 604, sustainability goals 606, and/or utility data 608 from the data storage 324 via the data storage interface 602. The data storage interface 602 can be the same as, or similar to, the data storage interface 404. A demand side analyzer 610 can receive the data 602-608. Furthermore, the demand side analyzer 610 can receive building system and/or operational data 616 from the building systems 618. The building system and/or operational data 616 could be metadata for building systems, operating settings for the building systems, runtime data for the building systems, energy usage for the building systems 618, etc. The building systems 618 can be fire safety systems, environmental cooling systems, environmental heating systems, ventilation systems, lighting systems, etc. The building systems 618 can be the systems described with reference to FIGS. 1 and 2.

The demand side analyzer 610 can run an analysis based on the demand related data 602-608 and the building system and/or operational data 616. The analyzer 610 can generate the report 612. The report 612 can indicate an energy breakdown and/or carbon breakdown for demand related systems of the building, e.g., systems that consume energy. The report 612 can indicate an energy consumption level and/or a carbon emissions level for cooling systems of a building, heating systems of a building, lighting systems of the building, etc. The energy consumption level and/or carbon emission level can attribute a portion (e.g., a percentage) of total building energy consumption and/or carbon emissions to specific pieces of equipment, equipment subsystems, subsystem types, building operation modes (heating or cooling), etc.

The analyzer 610 can further identify facility improvement measures (FIMs) for improving and/or reducing energy usage and/or carbon emissions of the building. The FIMs could be replacing a boiler with a newer energy efficient boiler which would result in a particular reduction in energy consumption and/or carbon emission. Furthermore, the analyzer 610 can identify operational improvements, e.g., reducing a temperature setpoint by one degree Fahrenheit during heating over a particular time period to result in a particular energy reduction and/or carbon emissions production. The report 612 can include savings reports. The report 612 can be provided as a demand side data outputs 614 to the interface 602. The interface 602 can store the outputs 614 in the data storage 324. In some embodiments, if the demand side data system 308 is unable to pull data from the building systems 618, the building audit system 306 retrieves the data (e.g., via manual reporting, such as from a building manager, or via other methods).

Figure 7:
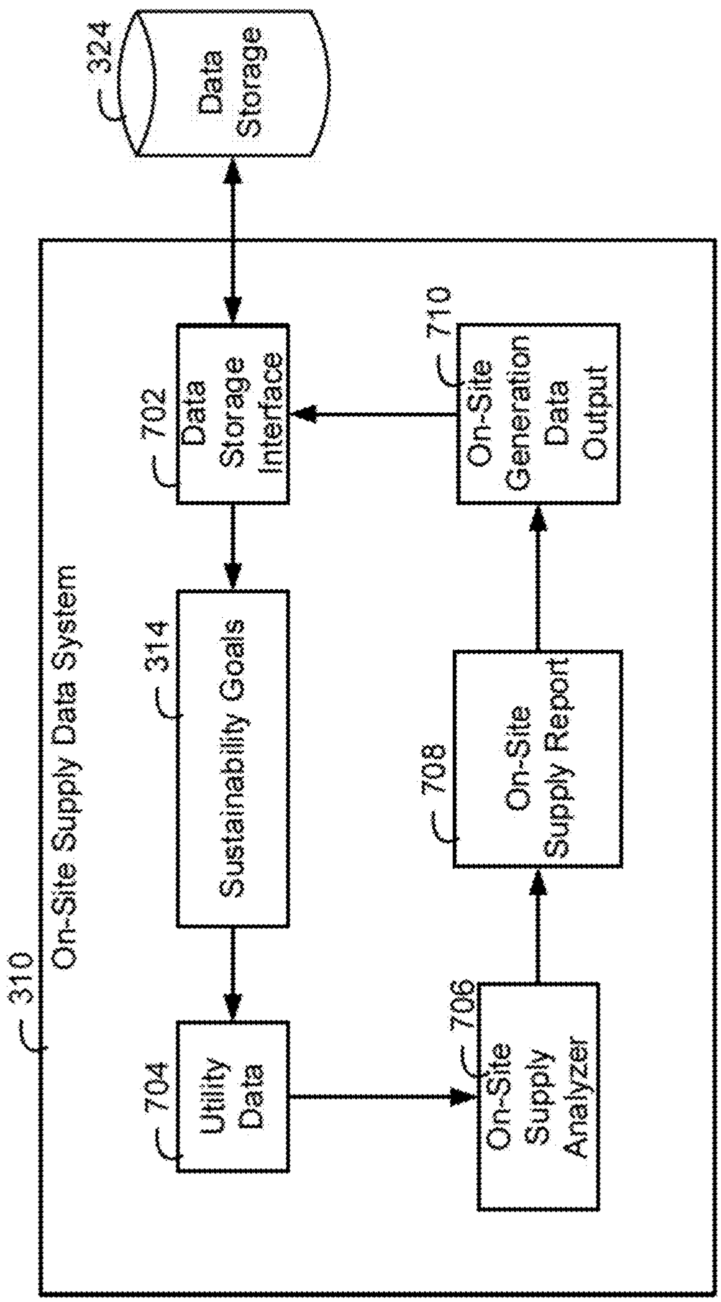
FIG. 7 is a block diagram of an on-site supply data system of the system of FIG. 3, the on-site supply configured to collect data from an on-site energy supply system for the building, according to an exemplary embodiment.

Referring now to FIG. 7, the on-site supply data system 310 is shown, the on-site supply data system 310 is configured to collect data regarding an on-site energy supply system for the building, according to an exemplary embodiment. The on-site supply data system 310 can include a data storage interface 702 configured to retrieve data from the data storage 324, e.g., the sustainability goals 314 and/or utility data 704 determined by the system 304. The interface 702 can be similar to or the same as the interface 404 described with reference to FIG. 4.

An on-site supply analyzer 706 can analyze the utility data 704 and/or the sustainability goals 314 to determine an on-site supply report 708 that can be stored as on-site generation data output 710 in the data storage 324 by the interface 702. The analyzer 706 can analyze the utility data 704 and/or the sustainability goals 314 to identify opportunities to reduce energy usage and/or carbon emissions through on-site energy supply systems, e.g., solar panels, wind power, hydro-electric dams, re-chargeable batteries, etc. The analyzer 708 can identify opportunities to shift power consumption from an energy grid to an on-site energy supply system.

The report 708 can include the results of an analysis on solar photovoltaic (PV) cells, fuel cells, energy storage, etc. The report 708 can further indicate a renewable energy report, e.g., reports on opportunities to shift energy consumption of the building to renewable energy sources that are on-site. The report 708 can further indicate cost savings for energy, e.g., if solar PV cells were installed in a building, how much financial savings in energy cost would result. Furthermore, the report 708 can indicate sustainability data, e.g., how much carbon savings or carbon production would result from consuming various amounts of energy from on-site PV cells, on-site wind turbines, etc.

Figure 8:
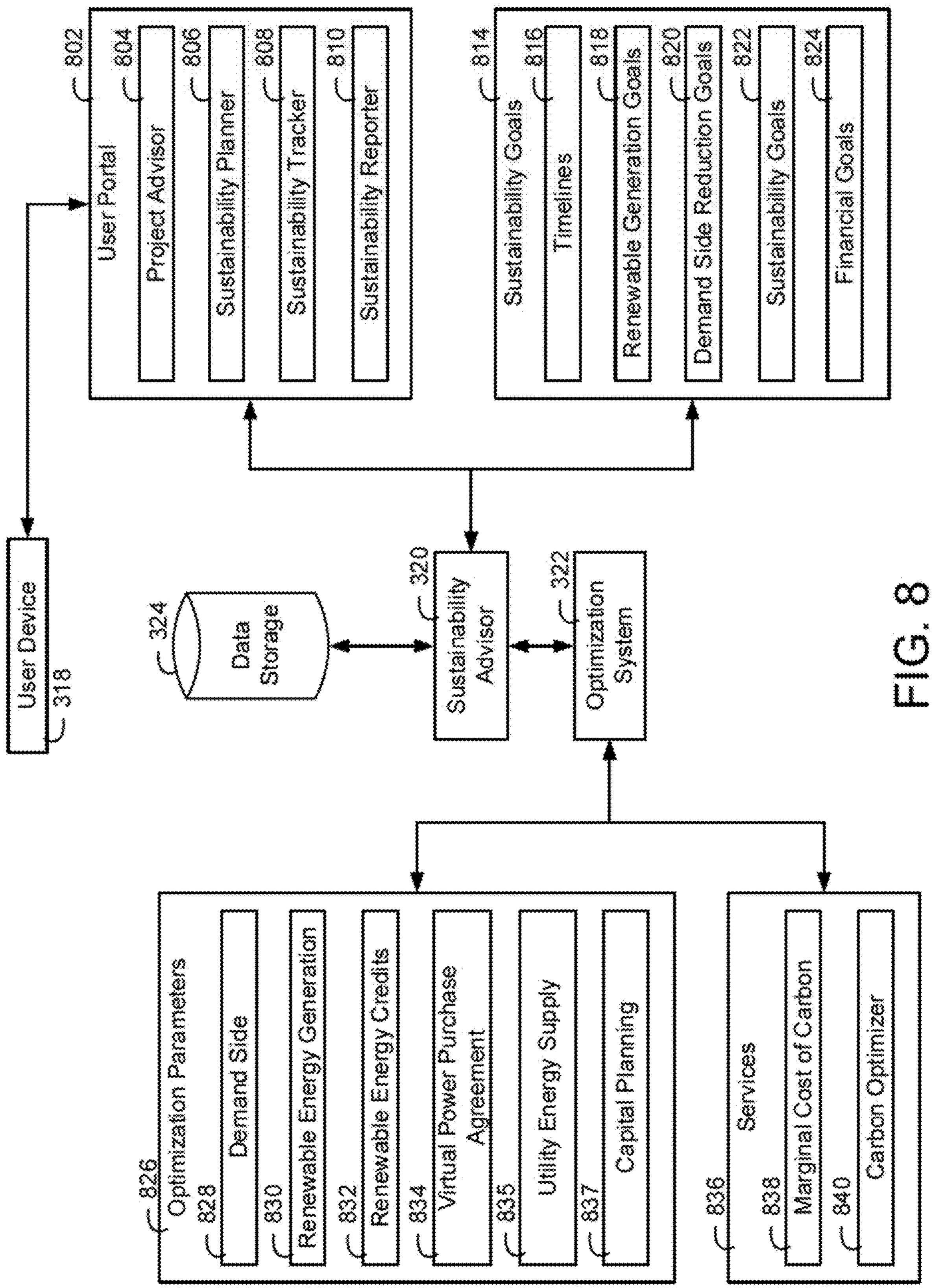
FIG. 8 is a block diagram of a sustainability advisor and an optimization system of the system of FIG. 3, the sustainability advisor configured to provide sustainability data to a user and receive input from the user and the optimization system configured to run sustainability optimizations for the building, according to an exemplary embodiment.

Referring now to FIG. 8, the sustainability advisor 320 and the optimization system 322 are shown, the sustainability advisor 320 is configured to provide sustainability data to a user and receive input from the user and the optimization system 322 is configured to run sustainability optimizations for the building, according to an exemplary embodiment. The sustainability advisor 320 is configured to retrieve data from the data storage 324 (e.g., the data described with reference to FIGS. 3-7) and cause the optimization system 322 to run optimizations based on the data. The sustainability advisor 320 can be configured to manage a user portal 802 which can provide various pieces of information to a user and receive input from the user.

The user portal 802 can interact with a user by causing the user device 318 to display various user interfaces with information regarding cost improvements, energy reduction improvements, and/or carbon emissions reduction improvements for the building. The information displayed in the user portal 802 can be based on the results of the optimizations run by the optimization system 322. The portal 802 can provide various reports and/or recommendations to the user (e.g., recommended FIMs, recommendations to purchase renewable energy credits (RECs), recommendations to adopt updated control strategies, etc.) for planning the construction, retrofit, and/or operation of a building to meet one or more sustainability goals.

The project advisor 804 can allow a user to review, define, and/or update a project. The project may be to plan sustainability for a particular building and/or building. The advisor 804 can allow a user to set and/or update their sustainability goals. Furthermore, the advisor 804 can allow a user to review their progress in meeting the sustainability goals for their project.

The sustainability planner 806 can provide a plan for meeting sustainability goals for a particular project. The plan generated by the sustainability planner 806 can be based on the optimizations run by the optimization system 322. In some embodiments, the plan generated by the sustainability planner 806 can be a plan for a time horizon, e.g., a thirty year plan, a twenty year plan, etc. The plan can provide the steps for meeting the sustainability goal of the user. The steps can indicate what equipment retrofits should be performed at a present time or at a specified time in the future, how many RECs should be purchased every year or every decade, what control schemes should be adopted, etc. As time passes, the sustainability planner 806 can update the sustainability plan based on new optimizations run by the optimization system 322. This can keep the plan on track to meet a goal as the environment or technology changes and allows the user to meet their goals in more cost effective manners. The planner 806 can generate plans based on the sustainability planning data 814.

The sustainability tracker 808 can track the progress of the building towards meeting various sustainability goals. The sustainability tracker 808 can, in some embodiments, retrieve operational building data from the data storage 324, energy bills from the data storage 324, receipts of REC purchases from the data storage 324, etc. The sustainability tracker 808 can identify carbon emissions levels for a building at various times in the past and/or at the present. The sustainability tracker 808 can identify a level of renewable energy consumed by the building at times in the past and/or at the present. Furthermore, the sustainability tracker 808 can identify a level of energy consumed by the building at times in the past and/or at the present. The sustainability tracker 808 can provide a user with a historical trend of the sustainability progress of the building towards the one or more sustainability goals.

The user portal 802 includes a sustainability reporter 810. The sustainability report generator 804 can generate various reports indicating sustainability information for the building. The report can indicate a construction plan, retrofit plan, and/or operational plan for a building, e.g., the amounts of energy to consume from various different energy sources, indications of RECs to purchase, indications of equipment retrofits, indications of physical building retrofits (e.g., energy efficient windows, energy efficient insulation, etc.), indications of new equipment installation (e.g., on-site PV cells, on-site wind turbines, etc.). The report generated by the generator 804 can indicate how the plan meets one or more sustainability, energy efficiency, and/or financial goals of the user. The reporter 810 can include a summary report of sustainability planning for the building. The reporter 810 can compile a report based on the data generated by the components 804-808.

The sustainability planning data 814 includes the planning data that can be used to run the optimization system 322. The planning data 814 can indicate the various goals and/or expectations of the user. The optimization run by the optimization system 322 can use the planning data 814 as constraints for an optimization, e.g., run an optimization that results in a plan that meets or exceeds the various goals and/or expectations. In some embodiments, the optimization can find a sustainability plan for the building that meets the various sustainability goals of the user at a minimum financial cost.

The sustainability planning data 814 can be or can be based on the sustainability goals 314. The timelines 816 can indicate the length of time that the user wants the building to meet various goals (e.g., the goals 818-824). The renewable generation goals 818 indicate a level of energy consumption by the building that the user wants to be generated from renewable energy sources (e.g., solar, wind, etc.). The demand side reduction goals 820 can indicate goals for the demand side systems, e.g., that the demand side systems be energy efficient (e.g., that lighting systems of the building include energy efficient light bulbs). The sustainability goals 822 can be a goal that the operation of the building creates a level of carbon emission, net zero emissions goals, etc. The financial goals 824 can indicate financial goals of the building, e.g., annual energy costs, monthly energy costs, etc.

The optimization parameters 826 include demand side parameters 828 related to the energy demand of a building. The demand side parameters 828 can indicate different types of building equipment retrofits, building equipment maintenance operations, new building equipment installation, building equipment replacement, etc. The demand side parameters 828 can indicate actions that can be taken to modify, change, and/or update the demand side equipment of the building. The parameters 828 can further be linked to renewable energy generation, carbon emissions, energy usage, etc.

The renewable energy generation 830 can indicate parameters for installing renewable energy generation equipment at the building. The parameters 830 can further indicate allocations of energy consumption between external power generation systems, e.g., coal power, hydroelectric power, PV cell systems, wind power systems, etc. The parameters 830 can be linked to various levels of carbon emissions, financial cost, etc.

The parameters 826 include renewable energy credits 832. The renewable energy credits 832 can be various different types of RECs that could be purchased for the building. The parameters can indicate carbon emissions reduction resulting from purchasing RECs and/or financial return from RECs sold by the building. For example, if the building includes on-site renewable energy generation, the building could sell RECs, in some embodiments. Furthermore, the parameters 826 include a virtual power purchase agreement 834 which can represent an agreed price for renewable energy generation. The parameters can further indicate capital planning 837, e.g., plans for replacing, purchasing, and/or repairing capital of the building (e.g., lighting of the building, conference rooms of the building, audio visual systems, insulation of the building, chillers for the building, AHUs for the building, etc.)

The optimization system 322 can include model services 836. The services 836 can include a marginal cost of carbon 838. The marginal cost of carbon 838 can indicate how much carbon emissions results from the next amount of energy consumed by the building. The marginal cost of carbon can be calculated for external utility services and/or on-site energy generation systems of the building. The marginal cost of carbon can be identified from the various energy bills and/or operational decisions of the building. The marginal cost of carbon can, in some embodiments, be based on the optimization parameters 826. The carbon optimizer 840 can run an optimization that identifies decisions for the parameters 826 that results in a particular carbon emissions level. The optimization can be run for a year, five years, ten years into the future, tec. The optimization can be run to slowly reduce the carbon emissions by a particular level every year so that a particular carbon emissions goal is met in the future. The optimization can be run based on the sustainability goals 814 such that the decisions for the parameters 826 are such that the goals 814 are met.

Figure 9:
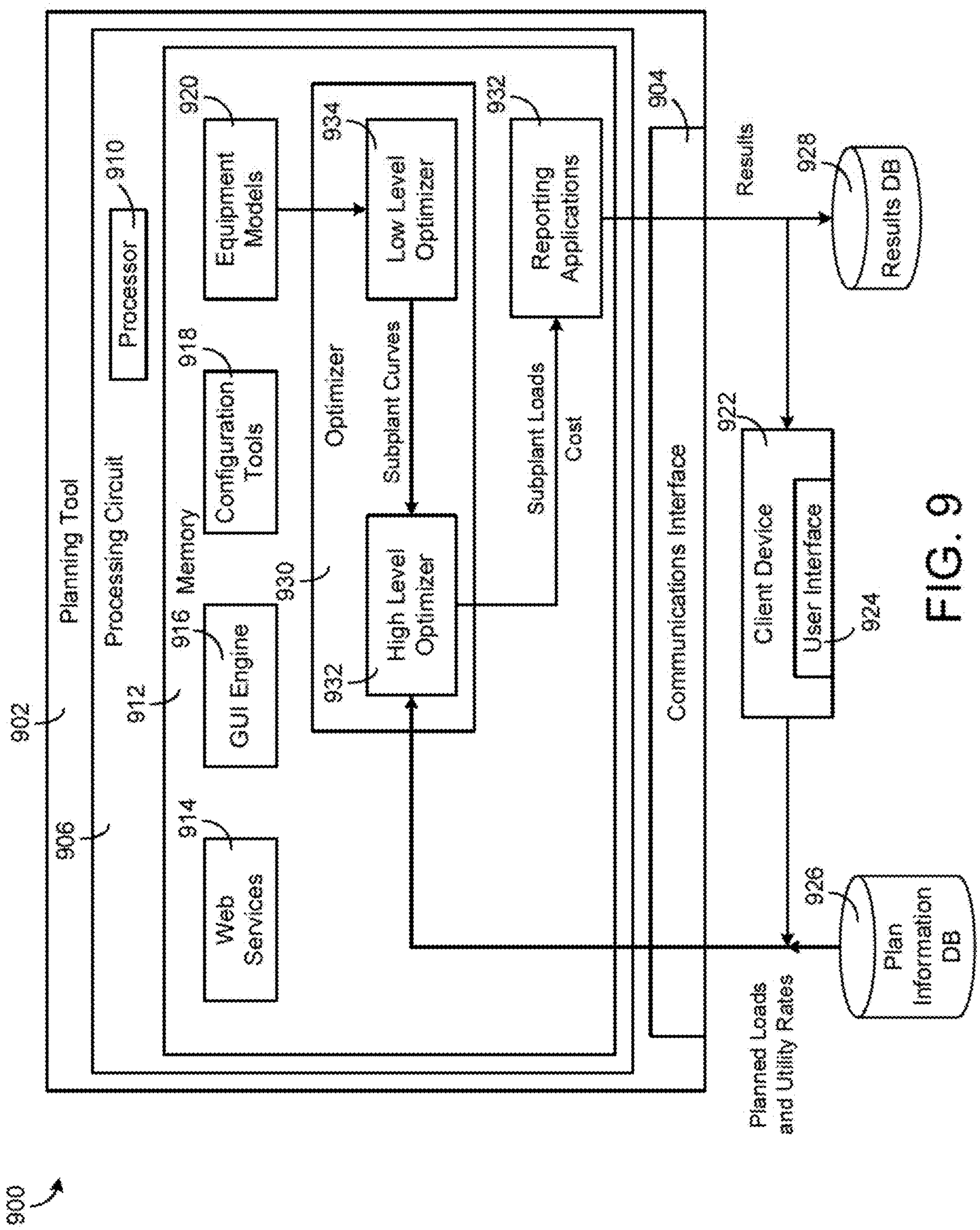
FIG. 9 is a block diagram of a planning tool which can be used to determine the benefits of investing in a battery asset and calculate various financial metrics associated with the investment, according to an exemplary embodiment.
Figure 10:
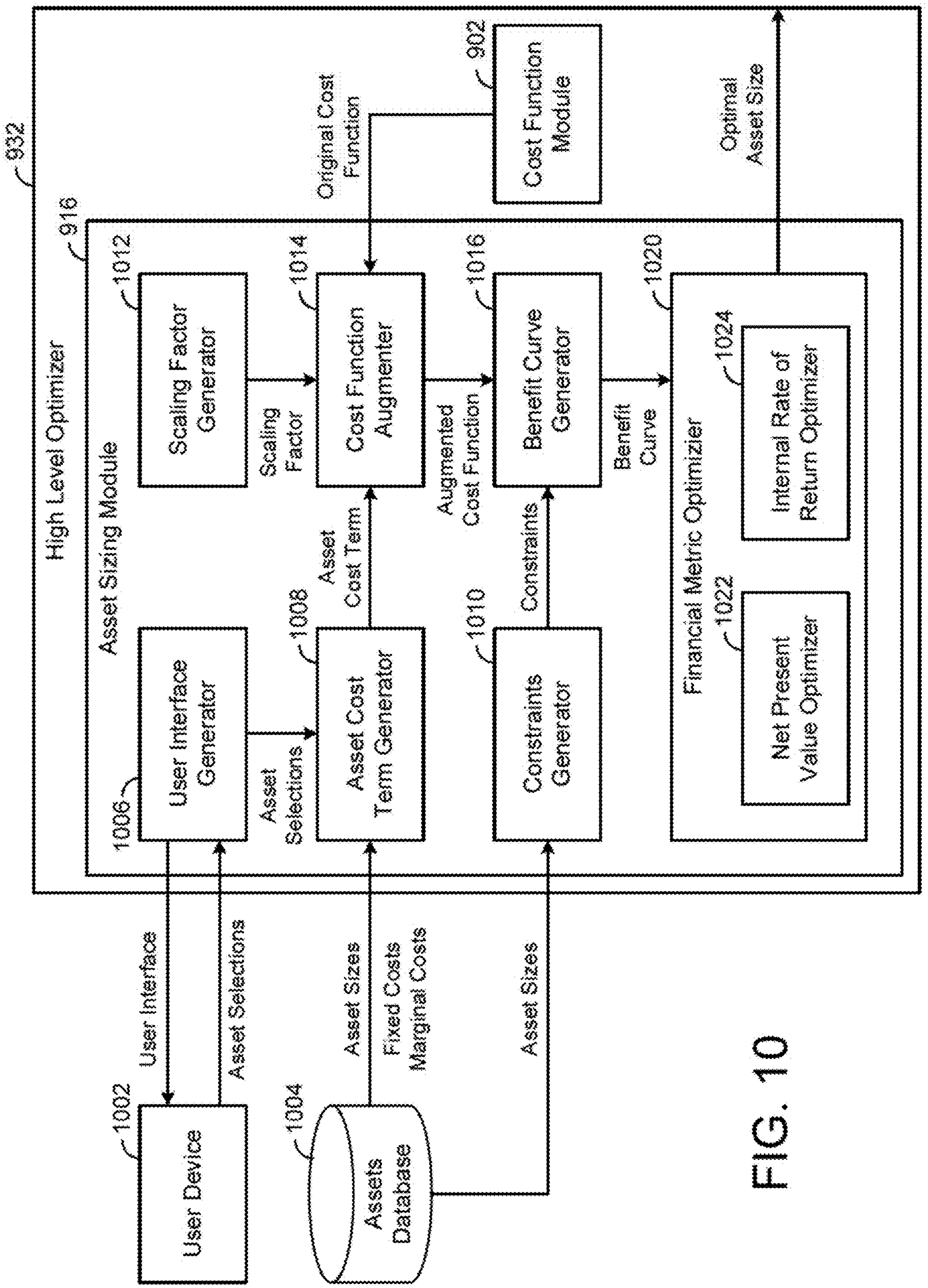
FIG. 10 is a block diagram illustrating the asset sizing module, according to an exemplary embodiment.

In some embodiments, the optimization run by the optimization system 322 can be based on the optimization described in FIGS. 9 and 10. The optimization can be run with the various linear programming techniques described in FIGS. 9 and 10. Furthermore, the optimization of the optimization system 322 can be based on, and/or can utilize, the techniques described in U.S. patent application Ser. No. 16/518,314 filed Jul. 22, 2019, the entirety of which is incorporated by reference herein.

Referring now to FIG. 9, a block diagram of a planning system 900 is shown, according to an exemplary embodiment. Planning system 900 may be configured to use optimizer 930 as part of a planning tool 902 to simulate the operation of a central plant over a predetermined time period (e.g., a day, a month, a week, a year, etc.) for planning, budgeting, and/or design considerations. The optimizer 930 can optimize for planning a building, e.g., identify construction decisions, retrofit decisions, control plans, etc. The optimizer 930 can run an optimization to minimize carbon emissions, minimize energy consumption, minimize energy cost, maximize renewable energy use, etc. In some embodiments, the optimizer 930 can consider building load in addition to sustainability related features. For example, optimizer 930 may use building loads and utility rates to determine an optimal resource allocation to minimize cost over a simulation period. However, planning tool 902 may not be responsible for real-time control of a building management system or central plant, in some embodiments, while in other embodiments planning tool 902 may provide real-time or near real-time control of a building management system or portions thereof to help achieve the particular goals. In some implementations, planning tool 902 may provide actionable insights or suggestions that, upon approval by a user, are automatically implemented by the building management system or automatically generate changes to a building plan (e.g., pre-construction building plan).

Planning tool 902 can be configured to determine the benefits of investing in a battery asset and the financial metrics associated with the investment. Such financial metrics can include, for example, the internal rate of return (IRR), net present value (NPV), and/or simple payback period (SPP). Planning tool 902 can also assist a user in determining the size of the battery which yields optimal financial metrics such as maximum NPV or a minimum SPP. In some embodiments, planning tool 902 allows a user to specify a battery size and automatically determines the benefits of the battery asset from participating in selected IBDR programs while performing PBDR. In some embodiments, planning tool 902 is configured to determine the battery size that minimizes SPP given the IBDR programs selected and the requirement of performing PBDR. In some embodiments, planning tool 902 is configured to determine the battery size that maximizes NPV given the IBDR programs selected and the requirement of performing PBDR.

In planning tool 902, high level optimizer 932 may receive planned loads and utility rates for the entire simulation period. The planned loads and utility rates may be defined by input received from a user via a client device 922 (e.g., user-defined, user selected, etc.) and/or retrieved from a plan information database 926. High level optimizer 932 uses the planned loads and utility rates in conjunction with subplant curves from low level optimizer 934 to determine an optimal resource allocation (i.e., an optimal dispatch schedule) for a portion of the simulation period. The low level optimizer 934 can receive equipment models 920, in some embodiments.

The portion of the simulation period over which high level optimizer 932 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 932 requests all of the subplant curves used in the simulation from low level optimizer 934 at the beginning of the simulation. Since the planned loads and environmental conditions are known for the entire simulation period, high level optimizer 932 may retrieve all of the relevant subplant curves at the beginning of the simulation. In some embodiments, low level optimizer 934 generates functions that map subplant production to equipment level production and resource use when the subplant curves are provided to high level optimizer 932. These subplant to equipment functions may be used to calculate the individual equipment production and resource use (e.g., in a post-processing module) based on the results of the simulation.

Still referring to FIG. 9, planning tool 902 is shown to include a communications interface 904 and a processing circuit 906. Communications interface 904 may include wired or wireless interfaces (e.g., jacks, antennas, transmitters, receivers, transceivers, wire terminals, etc.) for conducting data communications with various systems, devices, or networks. For example, communications interface 904 may include an Ethernet card and port for sending and receiving data via an Ethernet-based communications network and/or a WiFi transceiver for communicating via a wireless communications network. Communications interface 904 may be configured to communicate via local area networks or wide area networks (e.g., the Internet, a building WAN, etc.) and may use a variety of communications protocols (e.g., BACnet, IP, LON, etc.).

Communications interface 904 may be a network interface configured to facilitate electronic data communications between planning tool 902 and various external systems or devices (e.g., client device 922, results database 928, plan information database 926, etc.). For example, planning tool 902 may receive planned loads and utility rates from client device 922 and/or plan information database 926 via communications interface 904. Planning tool 902 may use communications interface 904 to output results of the simulation to client device 922 and/or to store the results in results database 928.

Still referring to FIG. 9, processing circuit 906 is shown to include a processor 910 and memory 912. Processor 910 may be a general purpose or specific purpose processor, an application specific integrated circuit (ASIC), one or more field programmable gate arrays (FPGAs), a group of processing components, or other suitable processing components. Processor 910 may be configured to execute computer code or instructions stored in memory 912 or received from other computer readable media (e.g., CDROM, network storage, a remote server, etc.).

Memory 912 may include one or more devices (e.g., memory units, memory devices, storage devices, etc.) for storing data and/or computer code for completing and/or facilitating the various processes described in the present disclosure. Memory 912 may include random access memory (RAM), read-only memory (ROM), hard drive storage, temporary storage, non-volatile memory, flash memory, optical memory, or any other suitable memory for storing software objects and/or computer instructions. Memory 912 may include database components, object code components, script components, or any other type of information structure for supporting the various activities and information structures described in the present disclosure. Memory 912 may be communicably connected to processor 910 via processing circuit 906 and may include computer code for executing (e.g., by processor 910) one or more processes described herein.

Still referring to FIG. 9, memory 912 is shown to include a GUI engine 916, web services 914, and configuration tools 918. In an exemplary embodiment, GUI engine 916 includes a graphical user interface component configured to provide graphical user interfaces to a user for selecting or defining plan information for the simulation (e.g., planned loads, utility rates, environmental conditions, etc.). Web services 914 may allow a user to interact with planning tool 902 via a web portal and/or from a remote system or device (e.g., an enterprise control application).

Configuration tools 918 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 918 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 926) and adapt it or enable it for use in the simulation.

Still referring to FIG. 9, memory 912 is shown to include optimizer 930. Optimizer 930 may use the planned loads and utility rates to determine an optimal resource allocation over a prediction window. With each iteration of the optimization process, optimizer 930 may shift the prediction window forward and apply the optimal resource allocation for the portion of the simulation period no longer in the prediction window. Optimizer 930 may use the new plan information at the end of the prediction window to perform the next iteration of the optimization process. Optimizer 930 may output the applied resource allocation to reporting applications 932 for presentation to a client device 922 (e.g., via user interface 924) or storage in results database 928.

Still referring to FIG. 9, memory 912 is shown to include reporting applications 932. Reporting applications 932 may receive the optimized resource allocations from optimizer 930 and, in some embodiments, costs associated with the optimized resource allocations. Reporting applications 932 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation.

Referring now to FIG. 10, a block diagram illustrating asset sizing module 916 in greater detail is shown, according to an exemplary embodiment. Asset sizing module 916 can be configured to determine the optimal sizes of various assets in a building, group of buildings, or a central plant. As described above, assets can include individual pieces of equipment (e.g., boilers, chillers, heat recovery chillers, steam generators, electrical generators, thermal energy storage tanks, batteries, etc.), groups of equipment, or entire subplants of a central plant. Asset sizes can include a maximum loading of the asset (e.g., maximum power, maximum charge/discharge rate) and/or a maximum capacity of the asset (e.g., maximum stored electric energy, maximum fluid storage, etc.).

In some embodiments, asset sizing module 916 includes a user interface generator 1006. User interface generator 1006 can be configured to generate a user interface for interacting with asset sizing module 916. The user interface may be provided to a user device 1002 (e.g., a computer workstation, a laptop, a tablet, a smartphone, etc.) and presented via a local display of user device 1002. In some embodiments, the user interface prompts a user to select one or more assets or types of assets to be sized. The selected assets can include assets currently in a building or central plant (e.g., existing assets the user is considering upgrading or replacing) or new assets not currently in the building or central plant (e.g., new assets the user is considering purchasing). For example, if the user is considering adding thermal energy storage or electrical energy storage to a building or central plant, the user may select "thermal energy storage" or "battery" from a list of potential assets to size/evaluate. User interface generator 1006 can identify any assets selected via the user interface and provide an indication of the selected assets to asset cost term generator 1008.

Asset cost term generator 1008 can be configured to generate one or more cost terms representing the purchase costs of the assets being sized. In some embodiments, asset cost term generator 1008 generates the following two asset cost terms:

$$c_f^T v + c_s^T s_a$$

where $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions in vector v and asset size decisions in vector $s_a$ can be treated as decision variables to be optimized along with other decision variables x in the augmented cost function $J_a(x)$, described in greater detail below.

It should be noted that the values of the binary decision variables in vector v and the continuous decision variables in vector $s_a$ indicate potential asset purchases and asset sizes which can be evaluated by asset sizing module 916 to determine whether such purchases/sizes optimize a given financial metric. The values of these decision variables can be adjusted by asset sizing module 916 as part of an optimization process and do not necessarily reflect actual purchases or a current set of assets installed in a building, set of buildings, or central plant. Throughout this disclosure, asset sizing module 916 is described as "purchasing" various assets or asset sizes. However, it should be understood that these purchases are merely hypothetical. For example, asset sizing module 916 can "purchase" an asset by setting the binary decision variable $v_j$ for the asset to a value of $v_j=1$. This indicates that the asset is considered purchased within a particular hypothetical scenario and the cost of the asset is included in the augmented cost function $J_a(x)$. Similarly, asset sizing module 916 can choose to not purchase an asset by setting the binary decision variable $v_j$ for the asset to a value of $v_j=0$. This indicates that the asset is considered not purchased within a particular hypothetical scenario and the cost of the asset is not included in the augmented cost function $J_a(x)$.

The additional cost terms $c_f^T v$ and $c_s^T s_a$ can be used to account for the purchase costs of any number of new assets. For example, if only a single asset is being sized, the vector $c_f$ may include a single fixed cost (i.e., the fixed cost of buying any size of the asset being considered) and v may include a single binary decision variable indicating whether the asset is purchased or not purchased (i.e., whether the fixed cost is incurred). The vector $c_s$ may include a single marginal cost element and $s_a$ may include a single continuous decision variable indicating the size of the asset to purchase. If the asset has both a maximum loading and a maximum capacity (i.e., the asset is a storage asset), the vector $c_s$ may include a first marginal cost per unit loading and a second marginal cost per unit capacity. Similarly, the vector $s_a$ may include a first continuous decision variable indicating the maximum loading size to purchase and a second continuous decision variable indicating the maximum capacity size to purchase.

If multiple assets are being sized, the vectors $c_f$, v, $c_s$, and $s_a$ may include elements for each asset. For example, the vector $c_f$ may include a fixed purchase cost for each asset being sized and v may include a binary decision variable indicating whether each asset is purchased. The vector $c_s$ may include a marginal cost element for each asset being considered and $s_a$ may include a continuous decision variable indicating the size of each asset to purchase. For any asset that has both a maximum loading and a maximum capacity, the vector $c_s$ may include multiple marginal cost elements (e.g., a marginal cost per unit loading size and a marginal cost per unit capacity size) and the vector $s_a$ may include multiple continuous decision variables (e.g., a maximum loading size to purchase and a maximum capacity size to purchase). By accounting for the purchase costs of multiple assets in terms of their respective sizes, the cost terms $c_f^T v$ and $c_s^T s_a$ allow high level optimizer 932 to optimize multiple asset sizes concurrently.

Still referring to FIG. 10, asset sizing module 916 is shown to include a constraints generator 1010. Constraints generator 1010 can be configured to generate or update the constraints on the optimization problem. As discussed above, the constraints prevent high level optimizer 932 from allocating a load to an asset that exceeds the asset's maximum loading. For example, the constraints may prevent high level optimizer 932 from allocating a cooling load to a chiller that exceeds the chiller's maximum cooling load or assigning a power setpoint to a battery that exceeds the battery's maximum charge/discharge rate. The constraints may also prevent high level optimizer 932 from allocating resources in a way that causes a storage asset to exceed its maximum capacity or deplete below its minimum capacity. For example, the constraints may prevent high level optimizer 932 from charging a battery or thermal energy storage tank above its maximum capacity or discharging below its minimum stored electric energy (e.g., below zero).

When asset sizes are fixed, the loading constraints can be written as follows:

$$x_{j,i,load} \leq x_{j,load_{max}} \quad \begin{matrix} \forall\, j = 1 \ldots N_a \\ \forall\, i = k \ldots k+h-1 \end{matrix}$$

where $x_{j,i,load}$ is the load on asset j at time step i over the horizon, $x_{j,load_{max}}$ is the fixed maximum load of the asset j, and Na is the total number of assets. Similarly, the capacity constraints can be written as follows:

$$0 \leq x_{j,i,cap} \leq x_{j,cap_{max}} \quad \begin{matrix} \forall\, j = 1 \ldots N_a \\ \forall\, i = k \ldots k+h-1 \end{matrix}$$

where $x_{j,i,cap}$ is the capacity of asset j at time step i over the horizon and $x_{j,cap_{max}}$ is the fixed maximum capacity of the asset j. However, these constraints assume that the maximum load $x_{j,load_{max}}$ and maximum capacity $x_{j,cap_{max}}$ of an asset is fixed. When asset sizes are treated as optimization variables, the maximum load and capacity of an asset may be a function of the asset size purchased in the optimization problem (i.e., the size of the asset defined by the values of the binary and continuous decision variables in vectors v and $s_a$).

Constraints generator 1010 can be configured to update the loading constraints to accommodate a variable maximum loading for each asset being sized. In some embodiments, constraints generator 1010 updates the loading constraints to limit the maximum load of an asset to be less than or equal to the total size of the asset purchased in the optimization problem. For example, constraints generator 1010 can translate the loading constraints into the following:

$$\begin{matrix} x_{j,i,load} \leq s_{a_{j,load}} \\ s_{a_{j,load}} \leq M_j v_j \end{matrix} \quad \forall\, j = 1 \ldots N_a$$

where $s_{a_{j,load}}$ is the loading size of asset j (i.e., the jth load size element of the continuous variable vector $s_a$), $v_j$ is the binary decision variable indicating whether asset j is purchased (i.e., the jth element of the binary variable vector v), and $M_j$ is a sufficiently large number. In some embodiments, the number $M_j$ is set to the largest size of asset j that can be purchased. The first inequality in this set of constraints ensures that the load on an asset $x_{j,i,load}$ is not greater than the size of the asset $s_{a_{j,load}}$ that is purchased. The second inequality forces the optimization to pay for the fixed cost of an asset before increasing the load size of the asset. In other words, asset j must be purchased (i.e., $v_j$=1) before the load size $s_{a_{j,load}}$ of asset j can be increased to a non-zero value.

Similarly, constraints generator 1010 can be configured to update the capacity constraints to accommodate a variable maximum capacity for each storage asset being sized. In some embodiments, constraints generator 1010 updates the capacity constraints to limit the capacity of an asset between zero and the total capacity of the asset purchased in the optimization problem. For example, constraints generator 1010 can translate the capacity constraints into the following:

$$\begin{matrix} 0 \leq x_{j,i,cap} \leq s_{a_{j,cap}} \\ s_{a_{j,cap}} \leq M_j v_j \end{matrix} \quad \forall\, j = 1 \ldots N_a$$

where $s_{a_{j,cap}}$ is the capacity size of asset j (i.e., the jth capacity size element of the continuous variable vector $s_a$), $v_j$ is the binary decision variable indicating whether asset j is purchased (i.e., the jth element of the binary variable vector v), and $M_j$ is a sufficiently large number. In some embodiments, the number $M_j$ is set to the largest size of asset j that can be purchased. The first inequality in this set of constraints ensures that the capacity of an asset $x_{j,i,cap}$ at any time step i is between zero and the capacity size of the asset $s_{a_{j,cap}}$ that is purchased. The second inequality forces the optimization to pay for the fixed cost of an asset before increasing the capacity size of the asset. In other words, asset j must be purchased (i.e., $v_j$=1) before the capacity size $s_{a_{j,cap}}$ of asset j can be increased to a non-zero value.

The constraints generated or updated by constraints generator 1010 may be imposed on the optimization problem along with the other constraints generated by high level optimizer 932. In some embodiments, the loading constraints generated by constraints generator 1010 replace the power constraints generated by power constraints module 904. Similarly, the capacity constraints generated by constraints generator 1010 may replace the capacity constraints generated by capacity constraints module 906. However, the asset loading constraints and capacity constraints generated by constraints generator 1010 may be imposed in combination with the switching constraints generated by switching constraints module 908, the demand charge constraints generated by demand charge module 910, and any other constraints imposed by high level optimizer 932.

Still referring to FIG. 10, asset sizing module 916 is shown to include a scaling factor generator 1012. The cost of purchasing an asset is typically paid over the duration of a payback period, referred to herein as a simple payback period (SPP). However, the original cost function J(x) may only capture operational costs and benefits over the optimization period h, which is often much shorter than the SPP. In order to combine the asset purchase costs $c_f^T$ v and $c_s^T$ $s_a$ with the original cost function J(x), it may be necessary to place the costs on the same time scale.

In some embodiments, scaling factor generator 1012 generates a scaling factor for the asset cost terms $c_f^T$ v and $c_s^T$ $s_a$. The scaling factor can be used to scale the asset purchase costs $c_f^T$ and $c_s^T$ $s_a$ to the duration of the optimization period h. For example, scaling factor generator 1012 can multiply the terms $c_f^T$ v and $c_s^T$ $s_a$ by the ratio $$\frac{h}{SPP}$$

as shown in the following equation.

$$C_{scaled} = \frac{h}{8760 \cdot SPP}\left(c_f^T v + c_s^T s_a\right)$$

where $C_{scaled}$ is the purchase cost of the assets scaled to the optimization period, h is the duration of the optimization period in hours, SPP is the duration of the payback period in years, and 8760 is the number of hours in a year.

In other embodiments, scaling factor generator 1012 generates a scaling factor for the original cost function J(x). The scaling factor can be used to extrapolate the original cost function J(x) to the duration of the simple payback period SPP. For example, scaling factor generator 1012 can multiply the original cost function J(x) by the ratio $$\frac{SPP}{h}$$

as shown in the following equation:

$$J(x)_{scaled} = \frac{8760 \cdot SPP}{h} J(x)$$

where $J(x)_{scaled}$ is the scaled cost function extrapolated to the duration of the simple payback period SPP, h is the duration of the optimization period in hours, SPP is the duration of the payback period in years, and 8760 is the number of hours in a year.

Still referring to FIG. 10, asset sizing module 916 is shown to include a cost function augmenter 1014. Cost function augmenter 1014 can be configured to augment the original cost function J(x) with the scaled purchase cost of the assets $C_{scaled}$. The result is an augmented cost function $J_a(x)$ as shown in the following equation:

$$J_a(x) = J(x) + \frac{h}{8760 \cdot SPP}\left(c_f^T v + c_s^T s_a\right)$$

where h is the duration of the optimization period in hours, SPP is the duration of the payback period in years, and 8760 is the number of hours in a year.

High level optimizer 932 can perform an optimization process to determine the optimal values of each of the binary decision variables in the vector v and each of the continuous decision variables in the vector $s_a$. In some embodiments, high level optimizer 932 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 932 can determine the optimal assets to purchase and the optimal sizes to purchase by identifying the optimal values of the binary decision variables in the vector v and the continuous decision variables in the vector $s_a$.

Still referring to FIG. 10, asset sizing module 916 is shown to include a benefit curve generator 1016. Benefit curve generator 1016 can be configured to generate a benefit curve based on the augmented cost function $J_a(x)$. In some embodiments, the benefit curve indicates the relationship between the initial investment cost $C_0$ of an asset (i.e., the cost of purchasing the asset) and the annual benefit C derived from the asset. For example, the benefit curve may express the initial investment cost $C_0$ as a function of the annual benefit C, as shown in the following equation:

$$C_0 = f(C)$$

where both the initial investment cost $C_0$ and the annual benefit C are functions of the asset size. Several examples of benefit curves which can be generated by benefit curve generator 1016 are shown in FIGS. 12-15 (discussed in greater detail below).

In some embodiments, the initial investment cost $C_0$ is the term $c_f^T v + c_s^T s_a$ in the augmented cost function $J_a(x)$. The benefit of an asset over the optimization horizon h may correspond to the term J(x) in the augmented cost function $J_a(x)$ and may be represented by the variable $C_h$. In some embodiments, the variable $C_h$ represents the difference between a first value of J(x) when the asset is not included in the optimization and a second value of J(x) when the asset is included in the optimization. The annual benefit C can be found by extrapolating the benefit over the horizon $C_h$ to a full year. For example, the benefit over the horizon $C_h$ can be scaled to a full year as shown in the following equation:

$$C = \frac{8760}{h} C_h$$

where h is the duration of the optimization horizon in hours and 8760 is the number of hours in a year.

Increasing the size of an asset increases both its initial cost $C_0$ and the annual benefit C derived from the asset. However, the benefit C of an asset will diminish beyond a certain asset size or initial asset cost $C_0$. In other words, choosing an asset with a larger size will not yield any increased benefit. The benefit curve indicates the relationship between $C_0$ and C and can be used to find the asset size that optimizes a given financial metric (e.g., SPP, NPV, IRR, etc.). Several examples of such an optimization are described in detail below. In some embodiments, benefit curve generator 1016 provides the benefit curve to financial metric optimizer 1020 for use in optimizing a financial metric.

Still referring to FIG. 10, asset sizing module 916 is shown to include a financial metric optimizer 1020. Financial metric optimizer 1020 can be configured to find an asset size that optimizes a given financial metric. The financial metric may be net present value (NPV), internal rate of return (IRR), simple payback period (SPP), or any other financial metric which can be optimized as a function of asset size. In some embodiments, the financial metric to be optimized is selected by a user. For example, the user interface generated by user interface generator 1006 may prompt the user to select the financial metric to be optimized. In other embodiments, asset sizing module 916 may automatically determine the financial metric to be optimized or may optimize multiple financial metrics concurrently (e.g., running parallel optimization processes).

Sustainability Manager

As described herein, the system 300 can include the sustainability advisor 320 and the optimization system 322. In some embodiments a sustainability manager can perform similar functionality to that of the system 300. In some embodiments, the system 300 and/or components thereof can perform similar functionality to that of the sustainability manager. In some embodiments, the system 900 and/or components thereof can perform similar functionality to that of the sustainability manager.

The sustainability manager can display a user interface including a sustainability manager dashboard. The sustainability dashboard can include an energy manager dashboard, a utility manager dashboard, a sustainability dashboard, a goals and targets dashboard, and/or an improvements measures dashboard, in some embodiments.

In some embodiments, the sustainability manager can display a user interface to a user. The user can set one or more goals that pertain to at least one of a business, a company, a corporation, an office, a residential property (e.g., a house, an apartment, and a condo), an entity, an organization and/or a building. For example, the user can set one or more goals for a business. The business can have or include at least one location. The business can be a collection of locations and/or a portfolio that includes the locations. The locations can include at least one building. The goals can be established at least one level of the business. In some embodiments, the goals can be established at least one of the business level (e.g., goals for the entire business), the location level (e.g., a certain location and/or campus for the business), and/or the building level (e.g., a single building of the business). The business level can be or include a business level, a collection of locations included in the business which create the business level and/or a collection of buildings included in the business. The goals established at the business level can be or include at least one of portfolio goals, company goals, an array of business goals, an assortment of business goals and/or a collection of goals that pertain to subsets of the business (e.g., a first subset pertains to goals of a first location included in the business and a second subset pertains to goals of a second location included in the business and the first subset and the second subset are combined to create the business goals). The business goals can include one or more goal categories. For example, the business goal categories can be energy consumption, emissions, waste, or water. The user can select a category, a metric (e.g., emissions, total emissions or emission intensity), a baseline year, a target year and a target value associated with a baseline value, in some embodiments. The target value can be or include at least one target sustainability level. The baseline value can be or include at least one baseline sustainability performance that pertains to the business, a location of the business or a building (e.g., building 10). The sustainability manager can use data associated with the baseline year to establish a baseline value. The sustainability manager can use the baseline value and the target value to determine a % reduction metric.

In some embodiments, after the business goal has been established the sustainability manager can generate recommendations for one or more locations associated with the business. In some embodiments, the recommendations include a location target value that is associated with the business goal category. The sustainability manager can generate the recommendations by determining a reduction in contributions towards one or more goal categories of the business goals for a specific location. The sustainability manager can determine that if the location target value is reached that the business goal will be achieved. The sustainability manager can receive input from a user to approve and/or adjust the recommendations, in some embodiments. The adjustment in the recommendations may result in an adjusted business goal.

The sustainability manager can generate recommendations for one or more buildings that are associated with one or more locations, in some implementations. In some embodiments, the recommendations are a building target value that is associated with the business goal and/or the location target value. In some embodiments, the building target values can be used to achieve the location target value. For example, the sustainability manager can determine that a target value for one or more buildings can result in the location target value being reached. The sustainability manager may use the buildings total contribution to the location target value to determine a priority. In some embodiments, the user can adjust the building target values that can result in a change in the location target values and/or the business goal.

The sustainability manager can generate recommendations for one or more emission sources that are associated with one or more buildings, in some implementations. In some embodiments, the recommendations are an emissions source target value that is associated with the business goal, the location target value and/or the building target value. In some embodiments, the emission source target values can be used to achieve the buildings target value. For example, the sustainability manager can determine that a target value for one or more emission sources can result in the building target value being reached. The sustainability manager may use the buildings total contribution to the location target value to determine a priority. The user can adjust the building target values which can result in a change in the location target values and/or the business goal.

In some embodiments, the user interface provided by the sustainability manager can allow for a user to track the progress of the business goal, the one or more location target values, or the one or more building target values and be provided with information that can be used to adjust the progress of the business goal. For example, the sustainability manager can display a user interface that includes a graphical representation of the energy consumption of the business. The sustainability manager can determine the current energy consumption trend and compare the current energy consumption trend with the target value, in some embodiments. The sustainability manager can determine that the current trends are either on track or off track with the business goals.

In some embodiments, the sustainability manager can receive an indication from the user. The indication can be an indication to adjust the business goal, the one or more location target values, the one or more building target values, and/or the one or more emission source target values. In some embodiments, an adjustment in the business goal can result in adjusted location target values, adjusted building target values and/or adjusted emission source target values. In some embodiments, an adjustment in the location target values can result in an adjusted business goal, adjusted building target values and/or adjusted emission source target values. In some embodiments, an adjustment in the building target values can result in an adjusted business goal, an adjustment in the location target values and/or adjusted emission source target values. In some embodiments, an adjustment in the emission source target values can result in an adjusted business goal, an adjustment in the location target values and/or an adjustment in the building target values.

In some embodiments, the sustainability manager can perform similar functionality to the optimization system 322. For example, the sustainability manager can provide a plan for meeting the business goal. The plan generated by the sustainability manager can be based on optimizations run by the sustainability manager. In some embodiments, the plan generated by the sustainability manager can be a plan for a time horizon, e.g., a thirty year plan, a twenty year plan, etc. The plan can provide the steps for meeting the business goal of the user. The steps can indicate what equipment retrofits should be performed at a present time or at a specified time in the future, how many RECs should be purchased every year or every decade, what control schemes should be adopted, etc. As time passes, the sustainability manager can update the plan based on new optimizations. This can keep the plan on track to meet the business goal as the environment or technology changes and allows the user to meet their goals in more cost effective manners.

In some embodiments, the sustainability manager can use the indication to adjust either the business goal, the one or more location target values, the one or more building target values, or the one or more emission source target values to adjust the associated target values. In some embodiments, the sustainability manager can determine that the adjustments in the associated target values are not included in a plan for meeting the business goal. In some embodiments, the sustainability manager can adjust the plan for meeting the business goal. In some embodiments, the sustainability manager can use the adjusted plan to update actions that can be taken to achieve the business goal.

In some embodiments, the sustainability manager can generate one or more rankings for at least one of the business, one or more locations associated with the business, and/or one or more buildings associated with the locations and/or the business. In some embodiments, the sustainability manager can generate the rankings by using the baseline metrics for either the business, the locations and/or the buildings and comparing the baseline metrics to a predetermined standard. In some embodiments, the sustainability manager can generate the rankings by using the business goals and/or the target values and comparing the business goals and/or the target values to the predetermined standard. In some embodiments, the sustainability manager can display the rankings by using a user interface.

In some embodiments, the sustainability manager can rank individual locations and/or buildings associated with the business amongst other locations and/or buildings that are associated with the business. In some embodiments, the ranking can be based on the baseline metrics for the locations and/or the buildings. In some embodiments, the sustainability manager can display the ranks of each location and/or buildings by using a user interface.

In some embodiments, the sustainability manager can assign a target emission value to one or more tenants that are associated with a building. In some embodiments, the sustainability manager can generate rankings for the tenants using either a baseline metric for the tenants or the target emission value for the tenants.

In some embodiments, the improvement measures dashboard associated with the sustainability manager can generate one or more lists. In some embodiments, the lists can include facility improvement measures (FIMs) that can be taken at either the business level, the location level and/or the building level. The lists can also include an emissions reduction that can be associated with the FIMs. In some embodiments, the sustainability manager can generate one or more reduction plans that can implement the FIMs. The reduction plans can include the FIMs that can be taken, the reduction in emissions associated with the reduction plans and expected reduction completion value. In some embodiments, the sustainability manager can use the business goal to generate the one or more reductions plans.

In some embodiments, the sustainability manager can generate a prediction of success. The prediction of success can be associated with the business goals, the location target values and/or the building target values. In some embodiments, the prediction of success can be a percent likelihood that the business goal, the location target values and/or the building target values will be reached in the target year value. In some embodiments, the sustainability manager can associated the prediction of success with the one or more reduction plans.

The sustainability manager can receive operational data that pertains to at least one of the business, the locations included within the business and/or the buildings included in the business. For example, the sustainability manager can receive operational data for a set of one or more buildings. The operational data can be current and/or historical operational data. For example, the operational data can be an average of the operational data over a certain amount of time (e.g., a day, a week, a month, a year, a decade). The sustainability manager can, using the operational data, determine a baseline sustainability performance. The baseline sustainability performance can be or include an amount of carbon emissions, energy consumption, greenhouse gas emissions, natural gas consumption, diesel consumption, butane consumption, among other metrics or emission sources that can contribute to the emissions and/or sustainability of the buildings. For example, the sustainability manager can establish, for the buildings, a baseline carbon emissions value (e.g., how much carbon the building emits and/or produces).

The sustainability manager can, responsive to determining the baseline sustainability performance, establish a sustainability goal to improve the sustainability of the set of buildings from the baseline sustainability performance. The sustainability goal can include at least one target sustainability level and at least one timeline to achieve the target sustainability level. For example, the sustainability goal can be to reduce carbon emissions by 50%, the target sustainability level would then be 50% of the baseline sustainability performance. The timeline can be or include how long it can take to reach the sustainability goal. For example, the timeline can be 10 years from the establishment of the sustainability goal. The timeline can also be a target date. For example, the timeline can be to reach a certain carbon emission level and/or reduction by a certain point in time.

The sustainability manager can generate, using the baseline sustainability performance and the sustainability goal, a plurality of control actions. The plurality of control actions can be for a plurality of pieces of equipment (e.g. devices and or equipment included in building subsystems 228). For example, the control actions can be or include controlling when and for what duration certain pieces of equipment run. The sustainability manager can, responsive to generating the control actions for the pieces of building equipment, control the pieces of building equipment using the control actions. The sustainability manager can perform similar functionality to other systems or devices described herein to control the plurality of pieces of building equipment. For example, the sustainability manager can perform similar functionality to that of the integrated control layer 218.

The sustainability goals described herein can be or include goals to improve a sustainability level of a building. For example, the sustainability goals can include a goal to improve the sustainability level of the building 10. The sustainability levels of the building 10 can be impacted by a plurality of sustainability characteristics of the building 10. The sustainability characteristics can be, include and/or pertain at least one of carbon emissions, greenhouse gas emissions, energy consumption, water consumption, waste production, electricity consumption, electricity generation, diesel consumption, butane consumption, sustainability energy sources, renewable energy sources, and/or among other characteristics of the building 10 that can impact the sustainability of the building 10.

The sustainability manager can, using the baseline sustainability performance of the building 10 and the sustainability goal of the building 10, determine target characteristic levels for the sustainability characteristics to achieve the target sustainability level within the timeline included in the sustainability goal. The target characteristic levels can achieve the target sustainability levels in the aggregate. The target characteristic levels can be or include at least one of a value, a range of values, a percentage, a ratio and/or a proportion. For example, the target characteristic level can be to have solar generated power account for 20% of energy consumption for the building 10. The target characteristic level can also be to have the building 10 reduce water production by 100 gallons each week.

The sustainability manager can, using the target characteristic levels, generate a second plurality of control actions. The second plurality of control actions can move operation of the building 10 towards the target characteristic levels. For example, the second plurality of control actions can include or result in the building 10 consuming a reduce amount of energy from a power grid while also increasing the amount of energy that is consumed by solar generated power. The sustainability manager can also generate a first control action for a first set of the pieces of building equipment and can also generate a second control action for a second set of the pieces of building equipment. The first control actions can pertain to a first target characteristic level of the target characteristic levels and the second control actions can pertain to a second target characteristic level of the target characteristic levels. For example, the first control actions can pertain to HVAC systems within and/or that service a first building 10 and the second control actions can pertain to solar powered generation systems of a second building 10. The first control actions and the second control actions can both contribute the buildings 10 moving towards and/or reaching the sustainability goals of the buildings 10.

Figure 11:
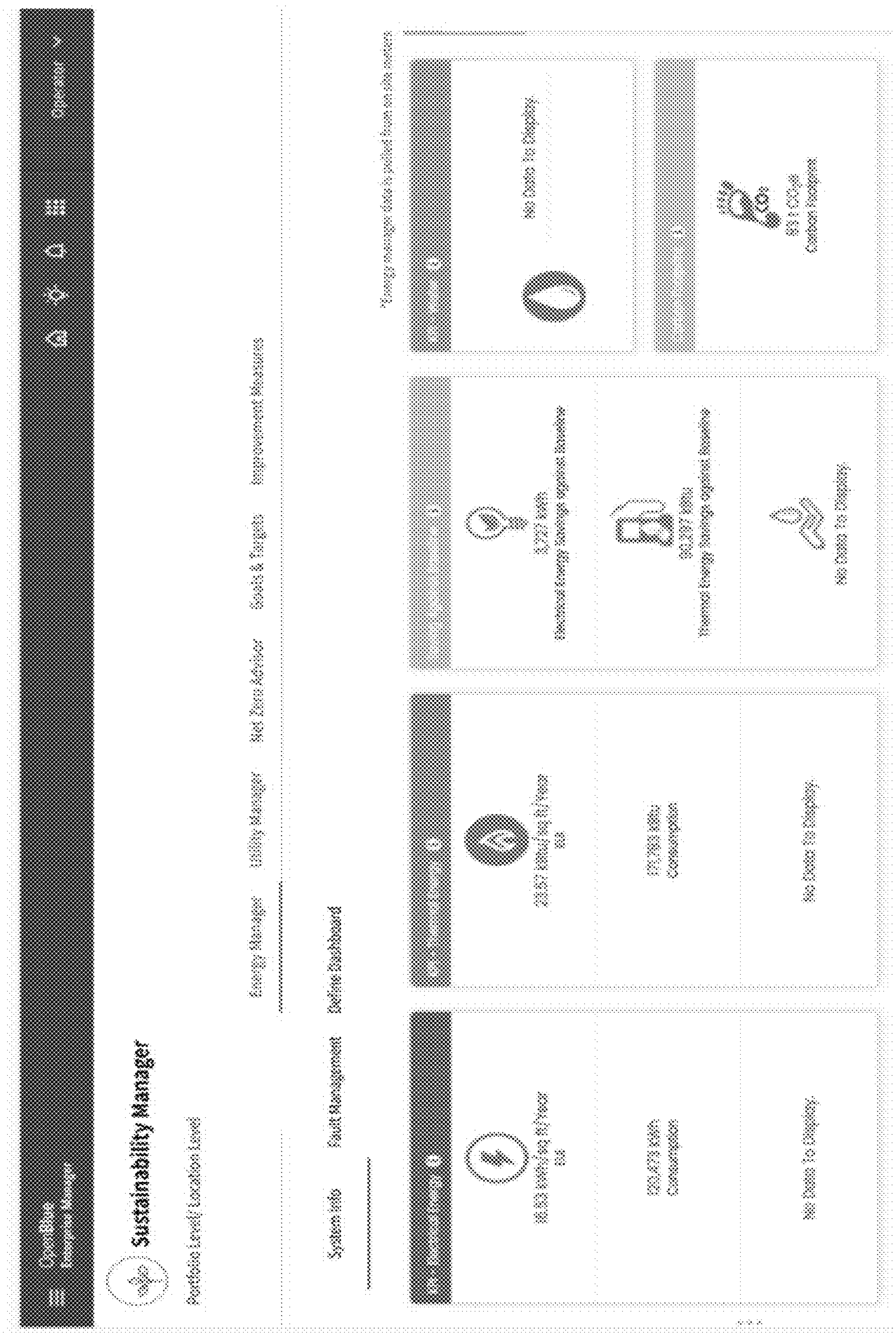
FIG. 11 is a user interface displaying an energy manager dashboard, according to an exemplary embodiment.

Referring now to FIG. 11, a user interface is displayed. The user interface includes an energy manager dashboard. The energy manager dashboard can include a system info tab, a fault management tab, and a define dashboard tab. The system info tab can be selected by a user. In some embodiments, when the system info tab is selected, data associated with the energy manager can be displayed. The data can include electrical energy data, thermal energy data, water data and energy against baseline data, a carbon footprint. The electrical energy data can include a consumption value. The thermal energy data can include a consumption value. In some embodiments, the sustainability manager can generate the data displayed in FIG. 11 by performing similar functions to on-site supply data system 310. In some embodiments, the system info can be at a business level or a location level. In some embodiments, the business level can include data that is associated with one or more locations (e.g., multiple buildings or sites, such as an enterprise level view showing multiple buildings (e.g., all buildings) within an enterprise, within a particular geographic location (e.g., city), etc. In some embodiments the location level can include data that is associated with one location. A location can include one or more buildings (e.g., a campus).

Figure 12:
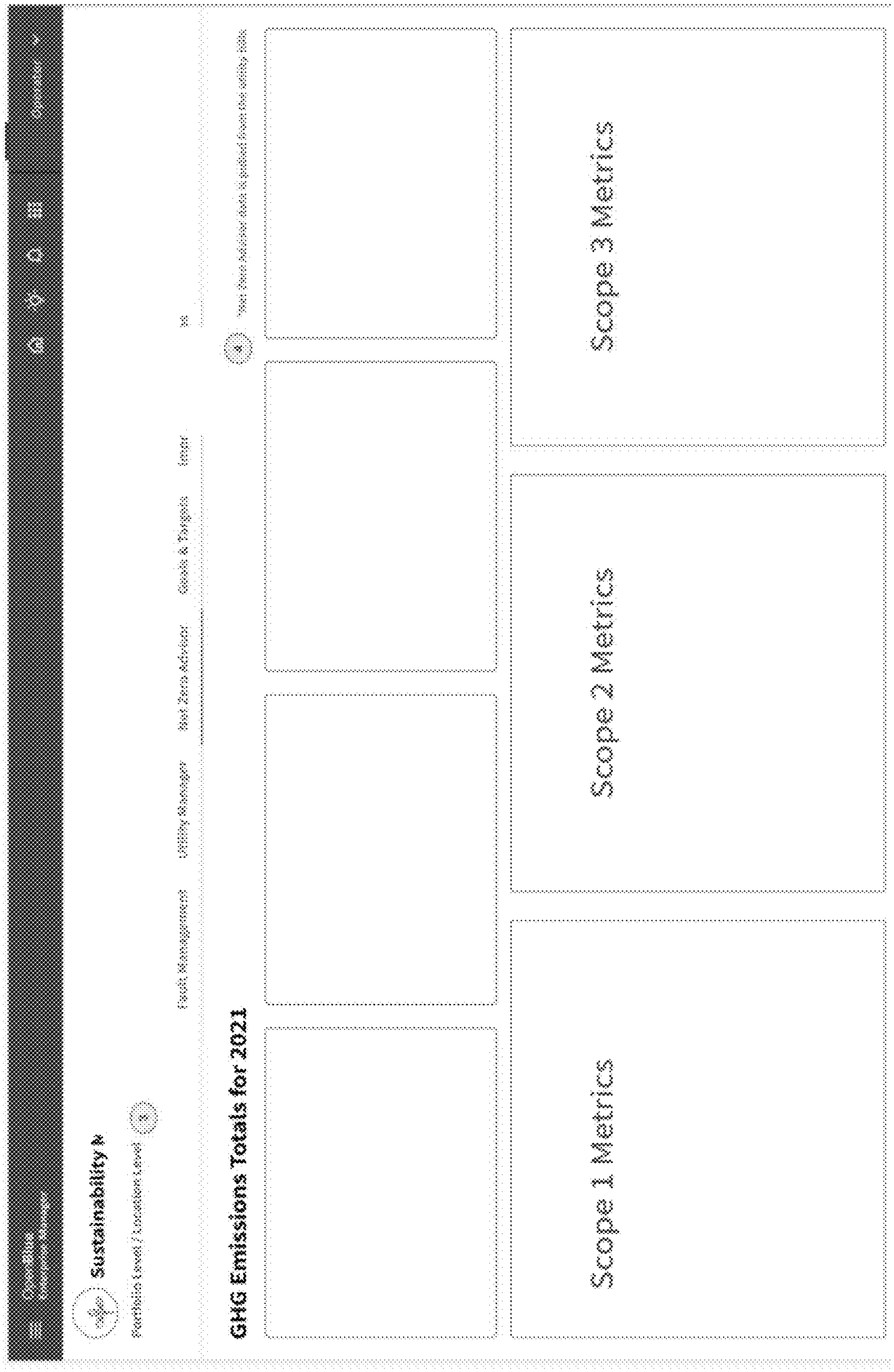
FIG. 12 is a user interface displaying a sustainability dashboard, according to an exemplary embodiment.

Referring now to FIG. 12, a user interface is displayed. The user interface includes a sustainability (e.g., net zero advisor) dashboard. The sustainability dashboard displayed in FIG. 12 can display that a user has not selected a scope metric.

Figure 13:
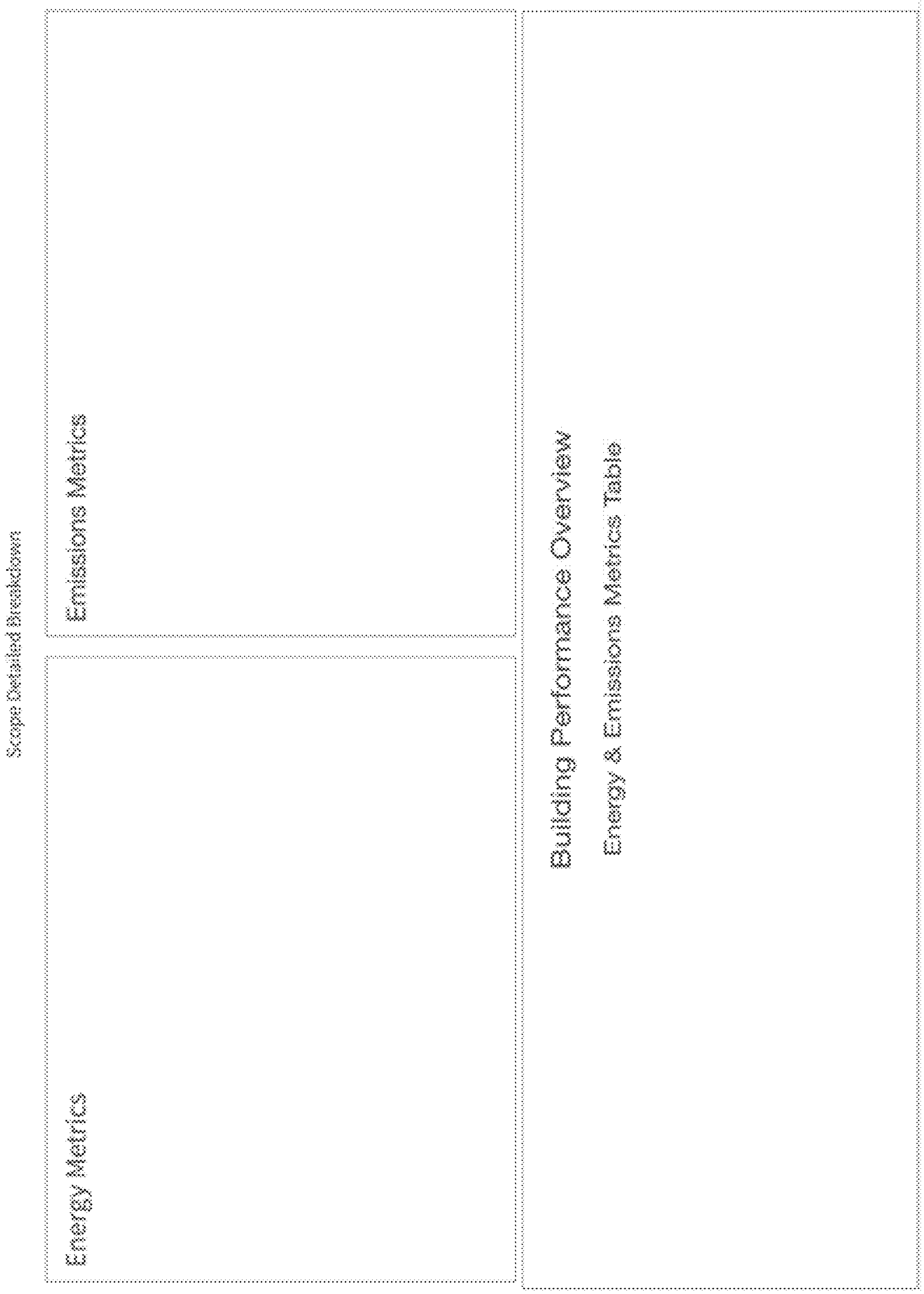
FIG. 13 is a user interface displaying a sustainability dashboard, according to an exemplary embodiment.

Referring now to FIG. 13, a user interface is displayed. The user interface includes a sustainability dashboard. The sustainability dashboard displayed in FIG. 13 can display that a user has not selected an energy metric or an emissions metric. Similarly, the sustainability dashboard displayed in FIG. 13 can display that a building performance overview has not been determined given that an energy metric or an emissions metric has not been selected by a user. In some embodiments, the FIG. 12 user interface and the FIG. 13 user interface can be included within a single user interface (e.g., the user interfaces are combined).

Figure 14:
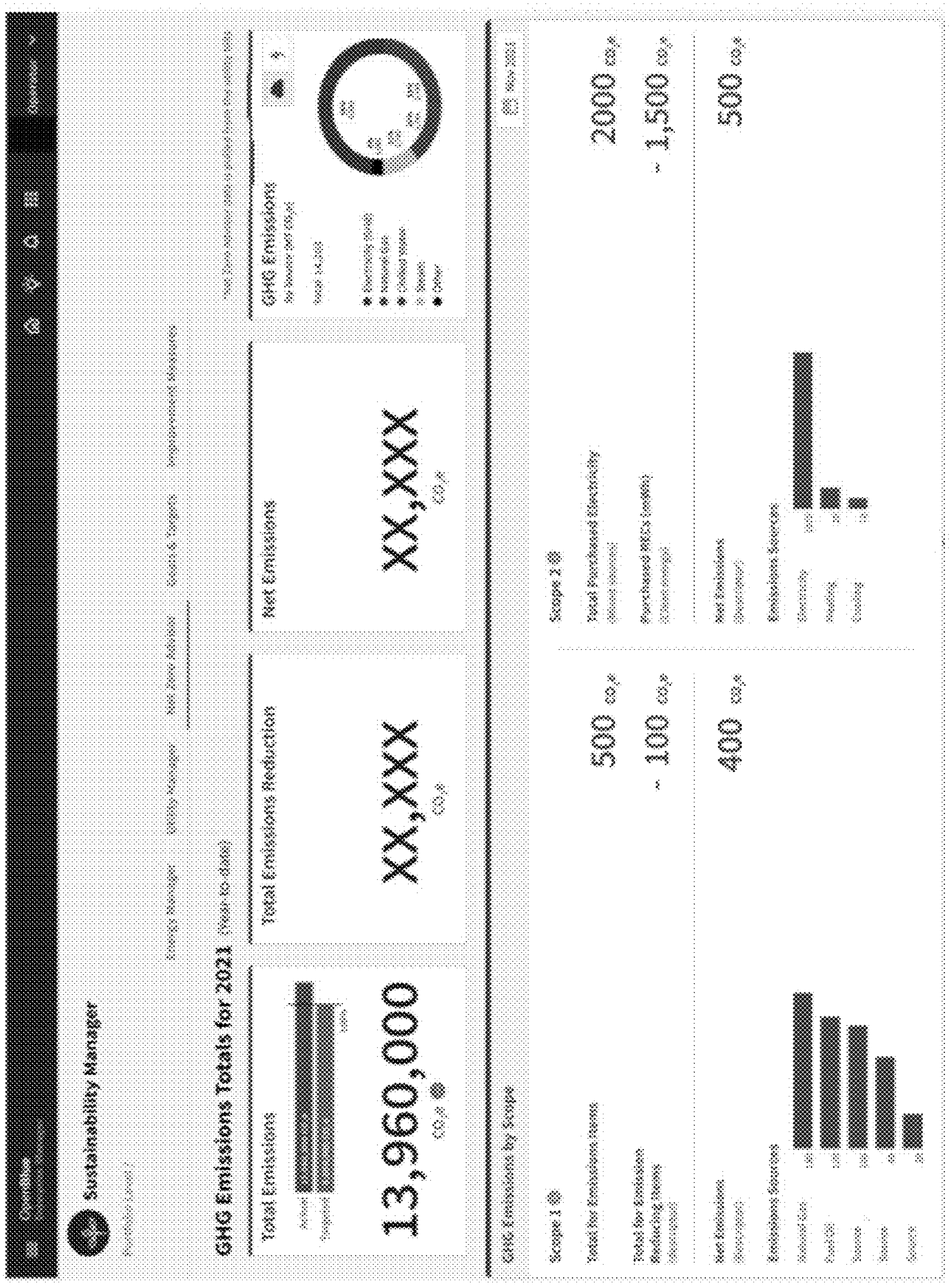
FIG. 14 is a user interface displaying a sustainability dashboard, according to an exemplary embodiment.

Referring now to FIG. 14, a user interface is displayed. The user interface includes a sustainability dashboard. The sustainability dashboard can include data associated with a GHG emissions total for a specific year. The GHG emissions total can include a total emissions, a total emissions reduction and a net emissions. The total emissions can be from a business level (e.g., one or more locations).

The user interface displayed in FIG. 14 can include information about GHG emissions by scope. The information that is displayed in FIG. 14 is at a business level. In FIG. 14 a scope 1 and a scope 2 are displayed. In some embodiments, the scope 1 can be associated with a total for emissions items. In some embodiments, the emission items can include one or more sources. For example, natural gas and fuel oil. In some embodiments, the scope 2 can be associated with total purchased energy and purchased RECs. The GHG emissions by scope can include a net emissions value. The net emission value can be associated with difference between total emissions and an emission reduction. For example, a net emission can be determined by a difference between total purchased electricity and purchased RECs.

Figure 15:
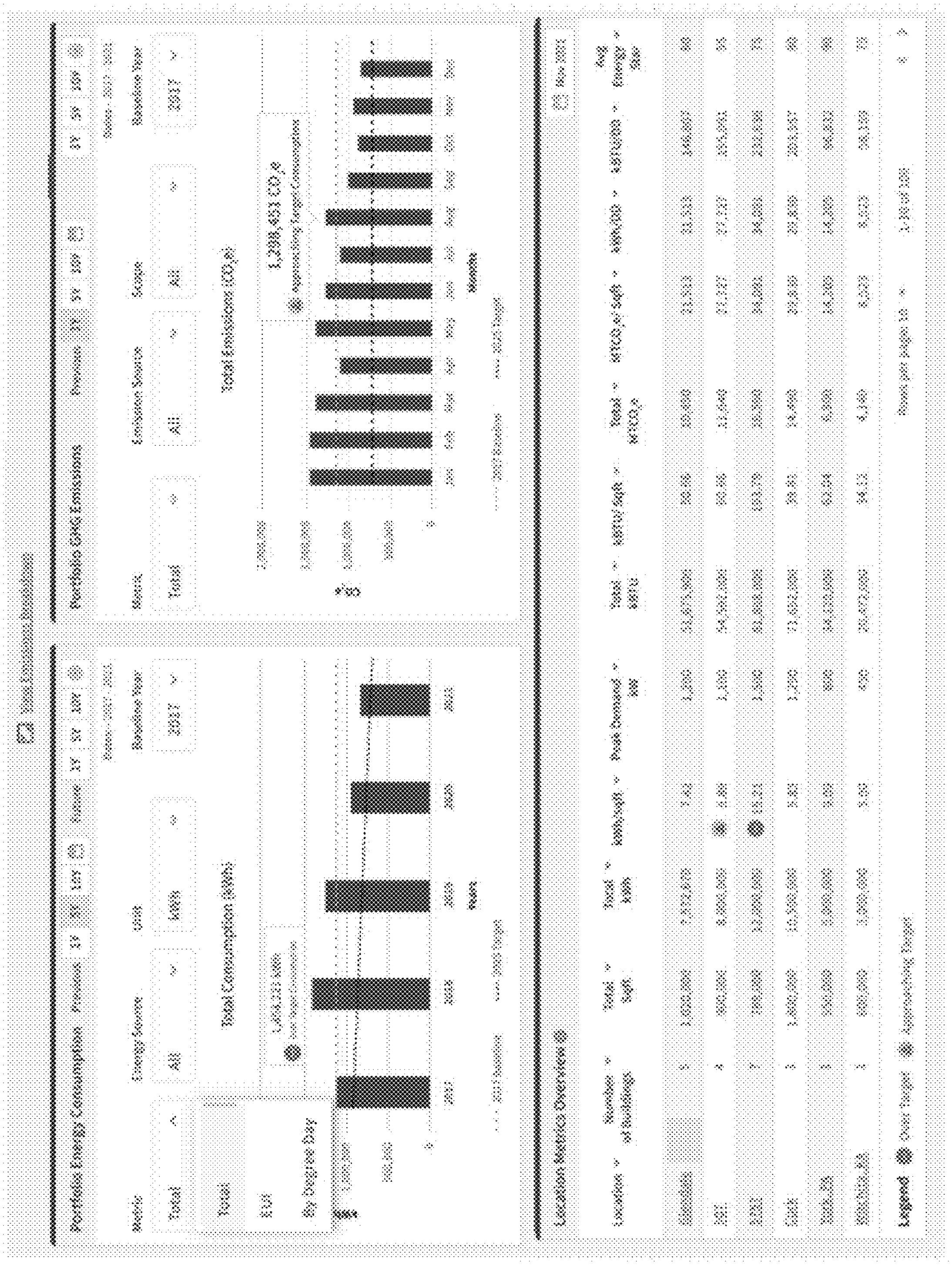
FIG. 15 is a user interface displaying a sustainability dashboard, according to an exemplary embodiment.

Referring now to FIG. 15, a user interface is displayed. The user interface includes a sustainability dashboard. The net zero dashboard can include a graphical representation of a business energy consumption, a business CHG emissions and location metrics overview. The business energy consumption can display previous data and/or future predicted data. In some embodiments, the sustainability manage can perform similar functionality to the optimization system 322 to predict future energy consumption. The user can select the metric tab to change to total metric, EUI metric or by degree day metric. The user can also select the energy source, a unit for the energy source and a baseline year. In some embodiments, the sustainability manager can determine the baseline data by performing similar functionality to the analyzer 408. The additional previous year data can be determined by previous usage data.

In some embodiments, various data discussed herein may be stored in, retrieved from, or processed in the context of digital twins. In some such embodiments, the digital twins may be provided within an infrastructure such as those described in U.S. patent application Ser. No. 17/134,661 filed Dec. 28, 2020, 63/289,499 filed Dec. 14, 2021, and Ser. No. 17/537,046 filed Nov. 29, 2021, the entireties of each of which are incorporated herein by reference. In some embodiments, various data discussed herein may be processed at (e.g., processed using models executed at) a cloud or other off-premises computing system/device or group of systems/devices, an edge or other on-premises system/device or group of systems/devices, or a hybrid thereof in which some processing occurs off-premises and some occurs on-premises. In some example implementations, the data may be processed using systems and/or methods such as those described in U.S. patent application Ser. No. 17/710,458 filed Mar. 31, 2022, which is incorporated herein by reference in its entirety.

In some embodiments, the location metrics overview displayed in FIG. 15 can include information associated to one or more locations associated with a business. A location can include one or more buildings. The information can include a total square footage associated with the location, one or more emissions metrics associated with the location and an emission metric scaled by the square footage of the location. The locations metrics overview can also include alerts that a location is over a particular target and/or is approaching a particular target. In some embodiments, the FIG. 14 user interface and the FIG. 15 user interface can be included within a single user interface.

Figure 16:
FIG. 16 is a user interface displaying a sustainability dashboard, according to an exemplary embodiment.

Referring now to FIG. 16, a user interface is displayed. The user interface includes a sustainability dashboard. The user interface includes information that is associated with a particular building that is associated with a location and a business. The information displayed in FIG. 16 can be similar to the information displayed in FIG. 14 but at a building level.

Figure 17:
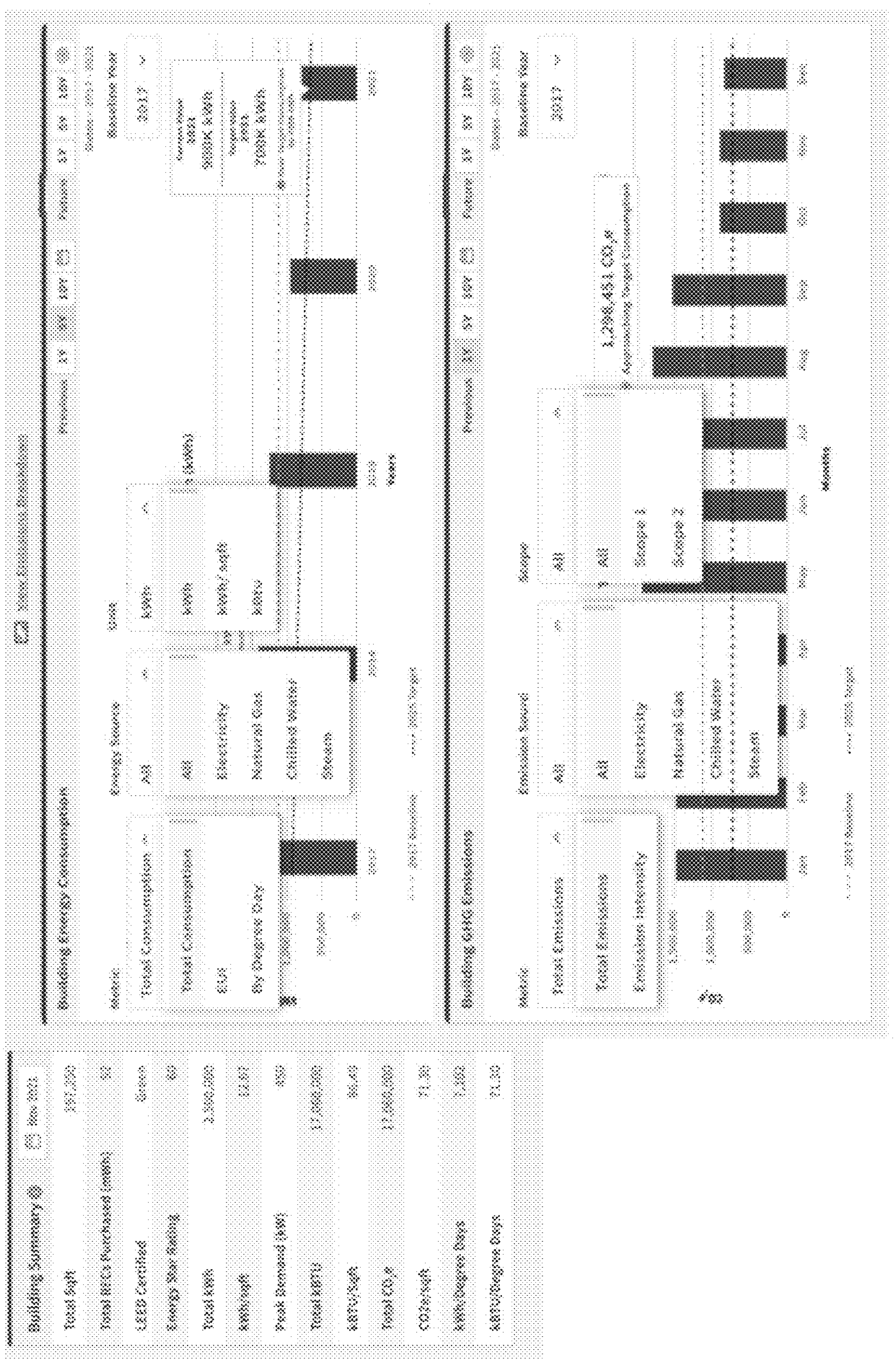
FIG. 17 is a user interface displaying a sustainability dashboard, according to an exemplary embodiment.

Referring now to FIG. 17, a user interface is displayed. The user interface includes a sustainability dashboard. The user interface includes information that is associated with a particular building that is associated with a location and a business. The information displayed in FIG. 17 can be similar to the information displayed in FIG. 15 but at a building level.

Figure 18:
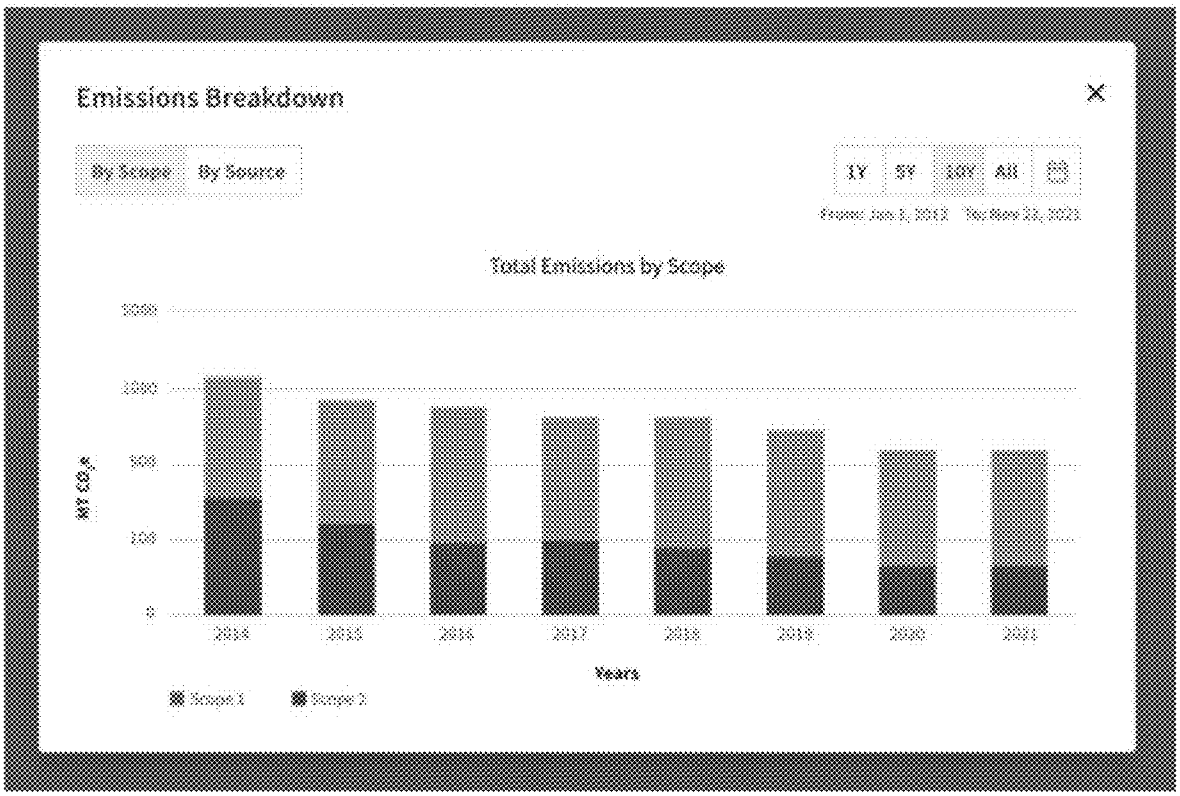
FIG. 18 is user interface displaying an emissions breakdown associated with a sustainability dashboard, according to an exemplary embodiment.

Referring now to FIG. 18, a user interface is displayed. The user interface can be an emissions breakdown window that is associated with the information displayed in FIG. 14, 15, 16 or 17. The user can open the emissions window displayed in the FIG. 18 user interface by selecting the emissions breakdown tab in FIG. 15 or 17. The emissions breakdown window can include total emissions by scope. The emissions breakdown window can include one or more years. This emissions breakdown window can present the total emissions by scope for one or more years. The emissions information from the one or more years can be used to develop trends. The sustainability model can use the trends to update optimization recommendations.

Figure 19:
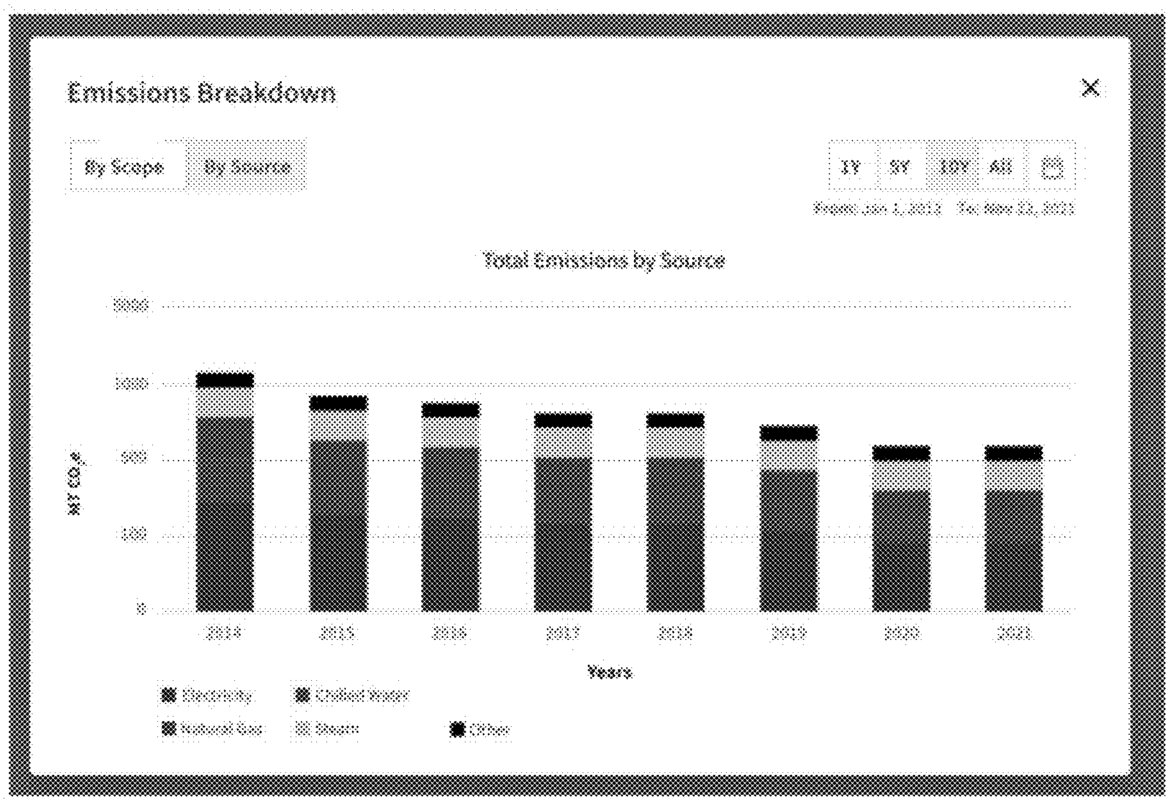
FIG. 19 is user interface displaying an emissions breakdown associated with a sustainability dashboard, according to an exemplary embodiment.

Referring now to FIG. 19, a user interface is displayed. The user interface can be an emissions breakdown window that is associated with the information displayed in FIG. 14, 15, 16 or 17. The user can open the emissions window displayed in the FIG. 19 user interface by selecting the emissions breakdown tab in FIG. 15 or 17. The emissions breakdown window can include total emissions by source. The emissions breakdown window can include one or more years. The emissions window can allow the user to view the contribution an emission source has towards the total emissions.

In some embodiments, the emissions breakdown windows displayed in FIG. 18 and FIG. 19 can be included in one user interface. Similarly, the user can switch between the emissions breakdown windows displayed in FIGS. 18 and 19 by selecting the by source tab or the by scope tab.

Figure 20:
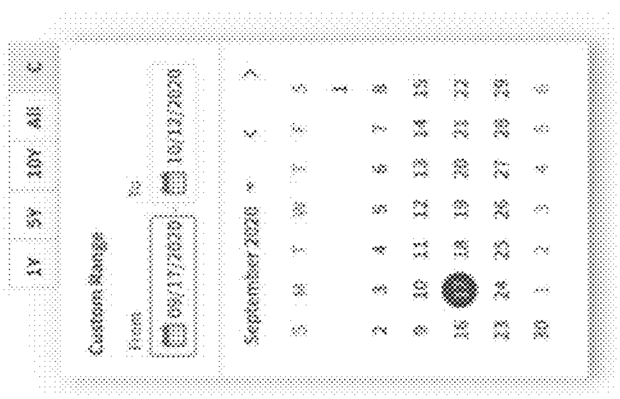
FIG. 20 is a user interface displaying a range selection dashboard, according to an exemplary embodiment.

Referring now to FIG. 20, a user interface is displayed. The user interface can include a custom range window. The Custom range window be reached by selecting the C tab within FIG. 20. The user can use to the custom range window to selecting a certain range. The user may use the custom range window when the user is interested in information is a particular time window.

Figure 21:
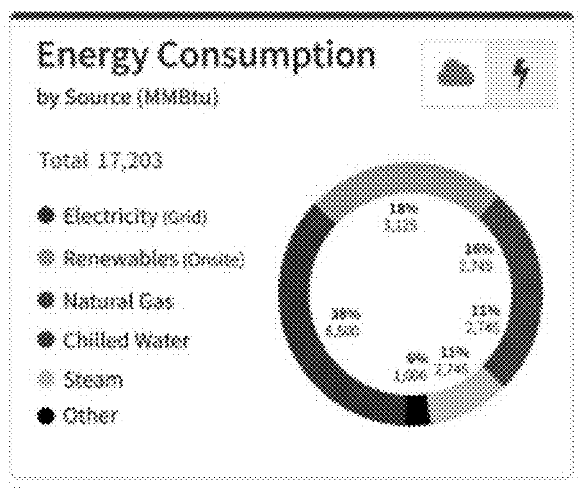
FIG. 21 is a user interface displaying a chart associated with energy consumption, according to an exemplary embodiment.

Referring now to FIG. 21, a user interface is displayed. The user interface includes a chart associated with energy consumption. The chart can include information that is associated by source. For example, the energy consumption sources can be at least one or electricity, renewables, natural gas, chilled water, steam or other. The chart present a percentage breakdown of each source. The percentage breakdown can inform the user as to the contribution of each source to the total energy consumption. The energy consumption can be based off of a predetermined range or the customer can use the FIG. 20 custom range window to select a range.

Figure 22:
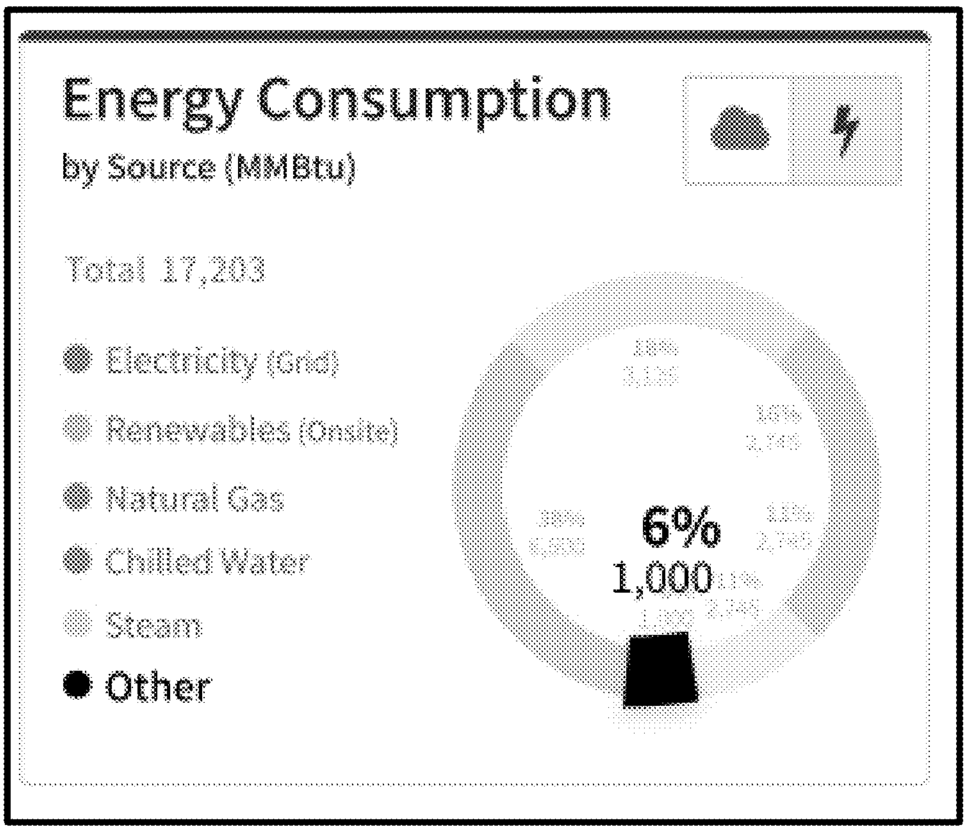
FIG. 22 is a user interface displaying a chart associated with energy consumption, according to an exemplary embodiment.

Referring now to FIG. 22, a user interface is displayed. The user interface includes the FIG. 21 chart and the user can select one or more source metrics. When one of the source metrics is selected the information associated with the source is enlarged. In some embodiments, the FIG. 22 user interface can display a chart that is not associated with the FIG. 21 chart.

Figure 23:
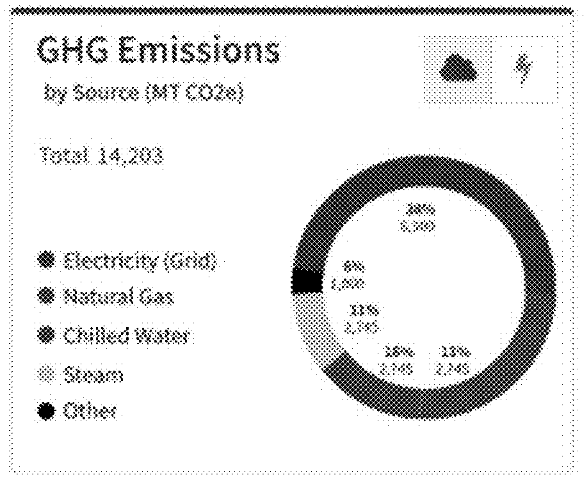
FIG. 23 is a user interface displaying a chart associate with greenhouse gas (GHG) emissions, according to an exemplary embodiment.

Referring now to FIG. 23, a user interface is displayed. The user interface includes a chart associated with GHG emissions. The chart can include information that is associated by source. For example, the GHG emission sources can be at least one of electricity, renewables, natural gas, chilled water, steam or other. The chart can present a percentage breakdown of each source. The percentage breakdown can inform the user as to the contribution of each source to the total GHG emissions. The GHG emissions can be based off of a predetermined range or the customer can use the FIG. 20 custom range window to select a range.

Figure 24:
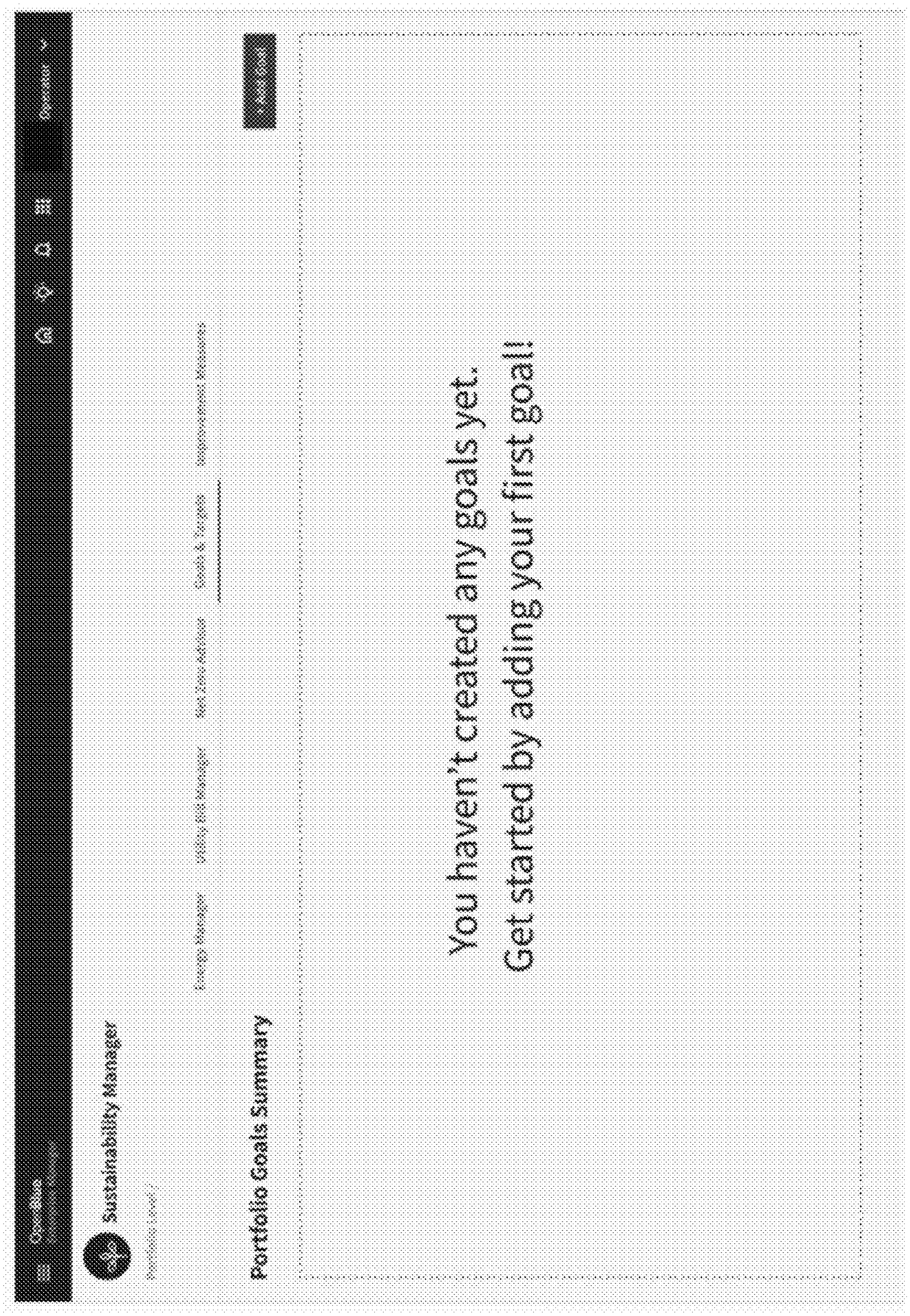
FIG. 24 is a user interface displaying a goals and targets dashboard, according to an exemplary embodiment.

Referring to FIG. 24, a user interface is displayed. The user interface includes a goals and targets dashboard. The goals and targets dashboard can notify the user that a business goal has not been created. A business goal can be a goal to reduce total emissions within a certain amount of time. The user can add a business goal by selecting the add goal tab. In some embodiments the user can reach the goals and targets dashboard by selecting the goals and targets tab.

Figure 25:
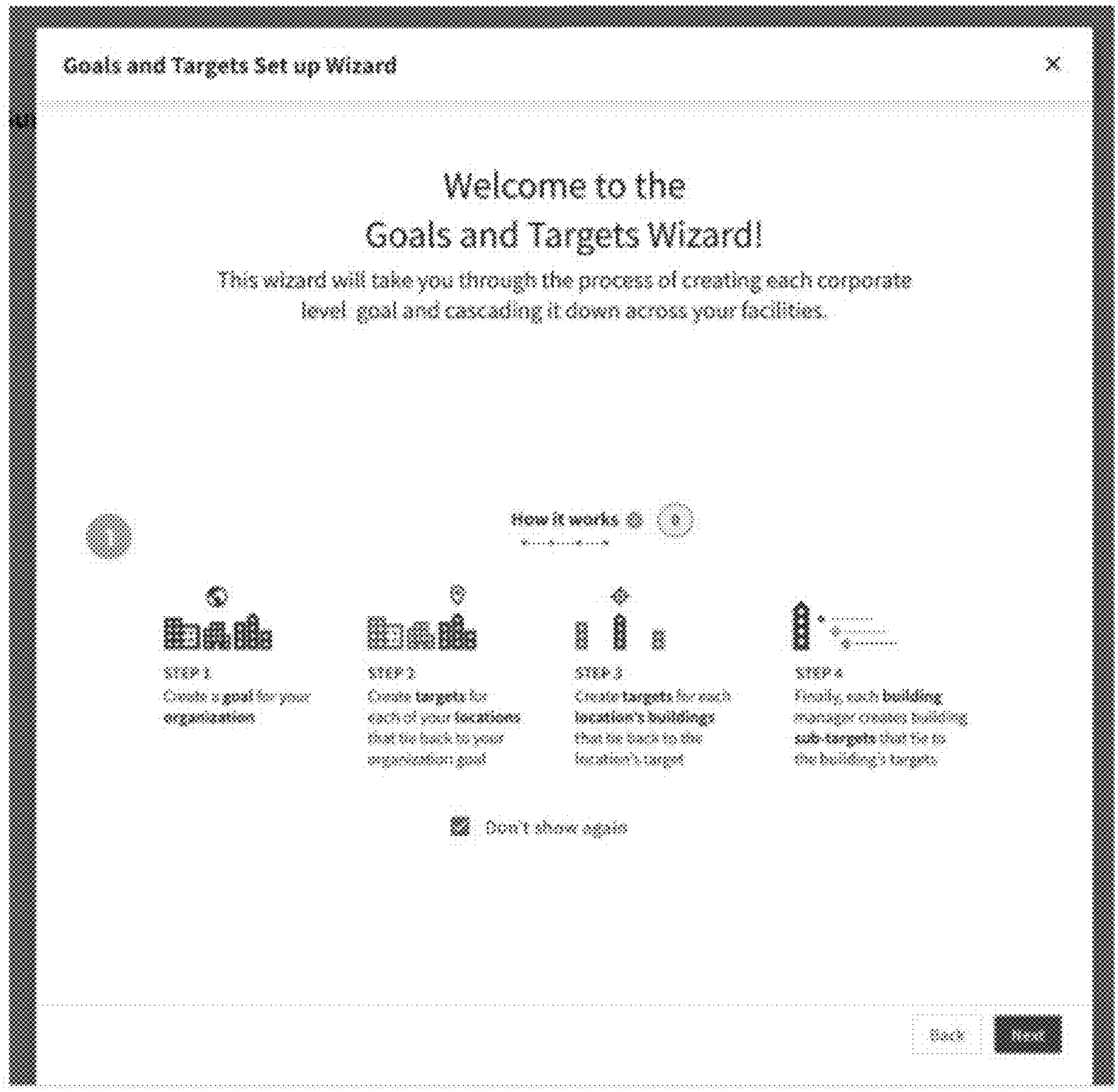
FIG. 25 is a user interface displaying a setup window associated with a goals and targets dashboard, according to an exemplary embodiment.

Referring to FIG. 25, a user interface is displayed. The user interface includes a setup window. In some embodiments, the user can be directed to the setup window by selecting the add goal tab in FIG. 24. The setup window can be used by the user to establish one or more goals and/or one or more targets. In some embodiments, the user can select the next tab to be directed to a window that the user can use to establish a goal.

Figure 26:
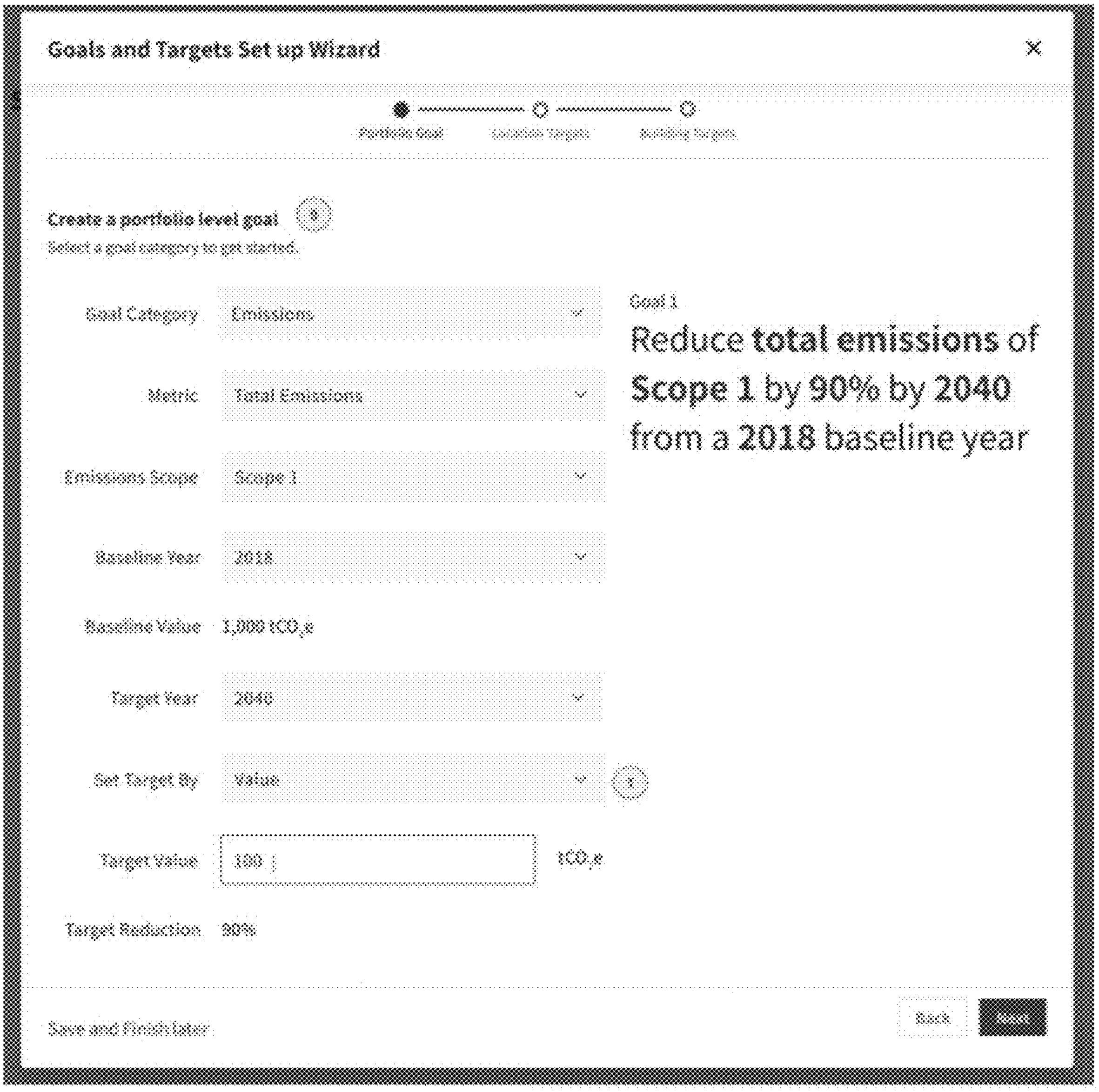
FIG. 26 is user interface displaying a business goal window associated with a goals and targets dashboard, according to an exemplary embodiment.

Referring to FIG. 26, a user interface is displayed. The user interface includes a window that allows a user to establish a business level goal. In some embodiments, the user can reach the FIG. 26 window by selecting the next tab in the FIG. 25 window. In some embodiments, the user can select one or more options. The user can select a goal category, a metric, an emissions scope, a baseline year, a baseline value, a target year, a set target, a target value and a target reduction. For example, the user can select emissions as the goal category, total emissions as the metric, scope 1 as the emissions scope, the year 2018 as the baseline year, the year 2040 as the target year, a set target as value and a target value of 100. Based on the selection of 2018 as the baseline year the corresponding total emissions value will be displayed. Based on the target value of 100 a total reduction percentage of 90% can be displayed. Upon entering the information a goal 1 can be established. For example, the baseline value of 1,000 and the set target value of 100 can be used to determine that in order to reach a set target value of 100 the % reduction must be 90%. The sustainability model can use the set target value and the set target year to generate recommendations that can be taken to assist in reaching the business goal by the set target year.

Figure 27:
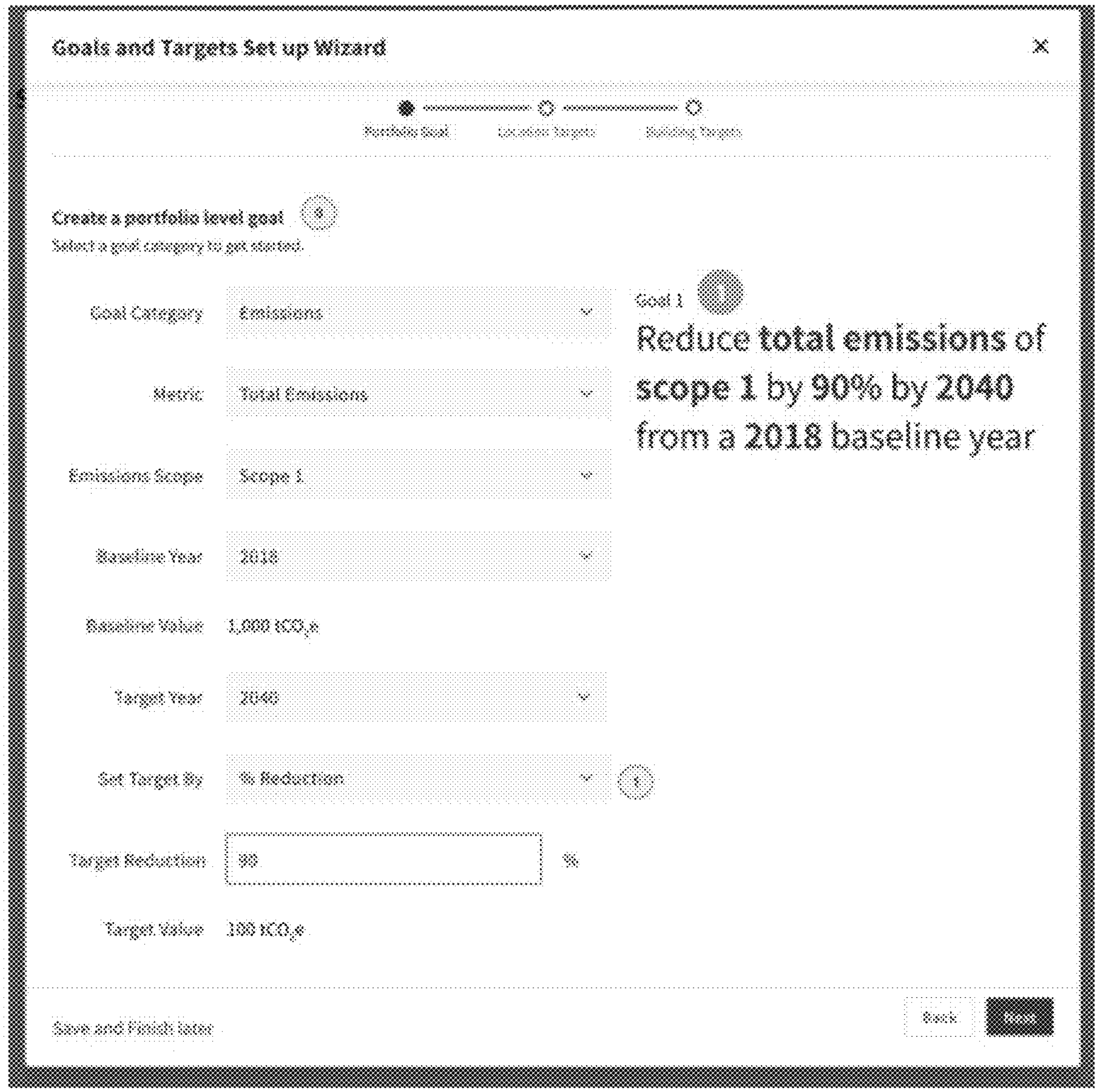
FIG. 27 is a user interface displaying a business goal window associated with a goals and targets dashboard, according to an exemplary embodiment.

Referring to FIG. 27, a user interface is displayed. The user interface includes a window that allows a user to establish a business level goal. In some embodiments, the user can reach the FIG. 27 window by selecting the next tab in the FIG. 25 window. In some embodiments, the user can select one or more options. The user can select a goal category, a metric, an emissions scope, a baseline year, a baseline value, a target year, a set target, a target value and a target reduction. For example, the user can select emissions as the goal category, total emissions as the metric, scope 1 as the emissions scope, the year 2018 as the baseline year, the year 2040 as the target year, a set target as percent reduction and a target value of 90%. Based on the selection of 2018 as the baseline year the corresponding total emissions value will be displayed. Based on the target value of 90% a target value of 100 can be displayed. Upon entering the information a goal 1 can be established. For example, the baseline value of 1,000 and the set target reduction of 90% can be used by the sustainability manager to determine that in order to reach a 90% reduction the business goal target value must be 100. The sustainability model can use the set target value and the set target year to generate recommendations that can be taken to assist in reaching the business goal by the set target year.

Figure 28:
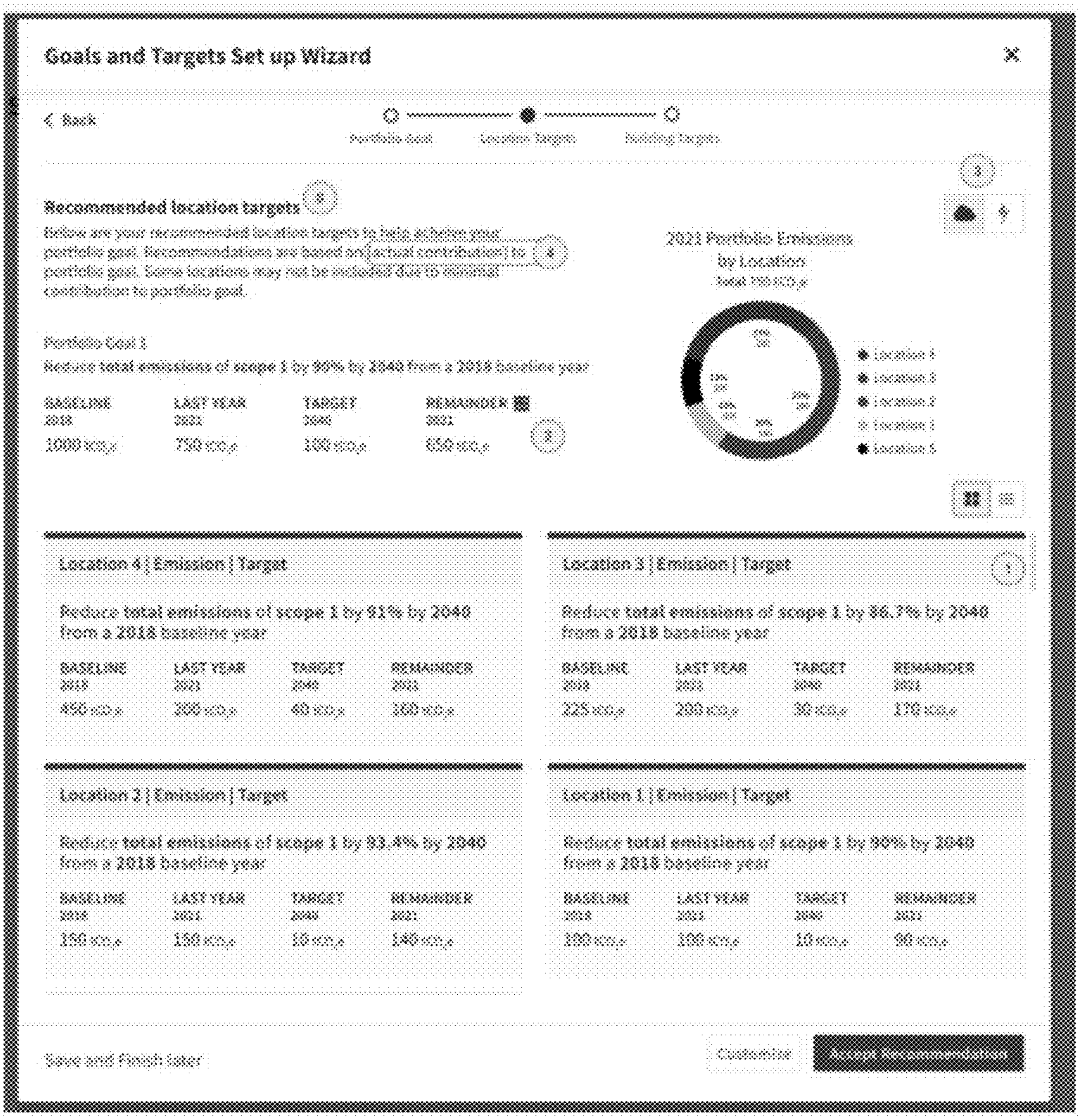
FIG. 28 is a user interface displaying a location targets window associated with a goals and targets dashboard, according to an exemplary embodiment.

Referring to FIG. 28, a user interface is displayed. The user interface can include a location targets window. The user can be directed to the FIG. 28 window by selecting the next tab in FIG. 26 or 27. In some embodiments, the sustainability manager can generate one or more recommendations for one or more locations associated with a business. The sustainability manager can use a business goal to generate the recommendations. The recommendations can include an emissions target for one or more locations. In some embodiments the business goal can be the business goal established in FIG. 26 or 27.

In some embodiments, the sustainability manager can use the business goal to determine an associated location target. The associated location target can be an emission value. The sustainability manager can determine that when one or more locations associated with a business reach the location target that the business goal will also be reached. The location target for a location can be based on the locations overall contribution to the overall business emission values.

The sustainability manager can generate the recommendations by performing similar functionality to the sustainability planner 806. In some embodiments, the sustainability manager can determine an emission reduction value for one or more locations. The emission reduction values can be associated with the overall contribution a location has with the business emissions value.

Figure 29:
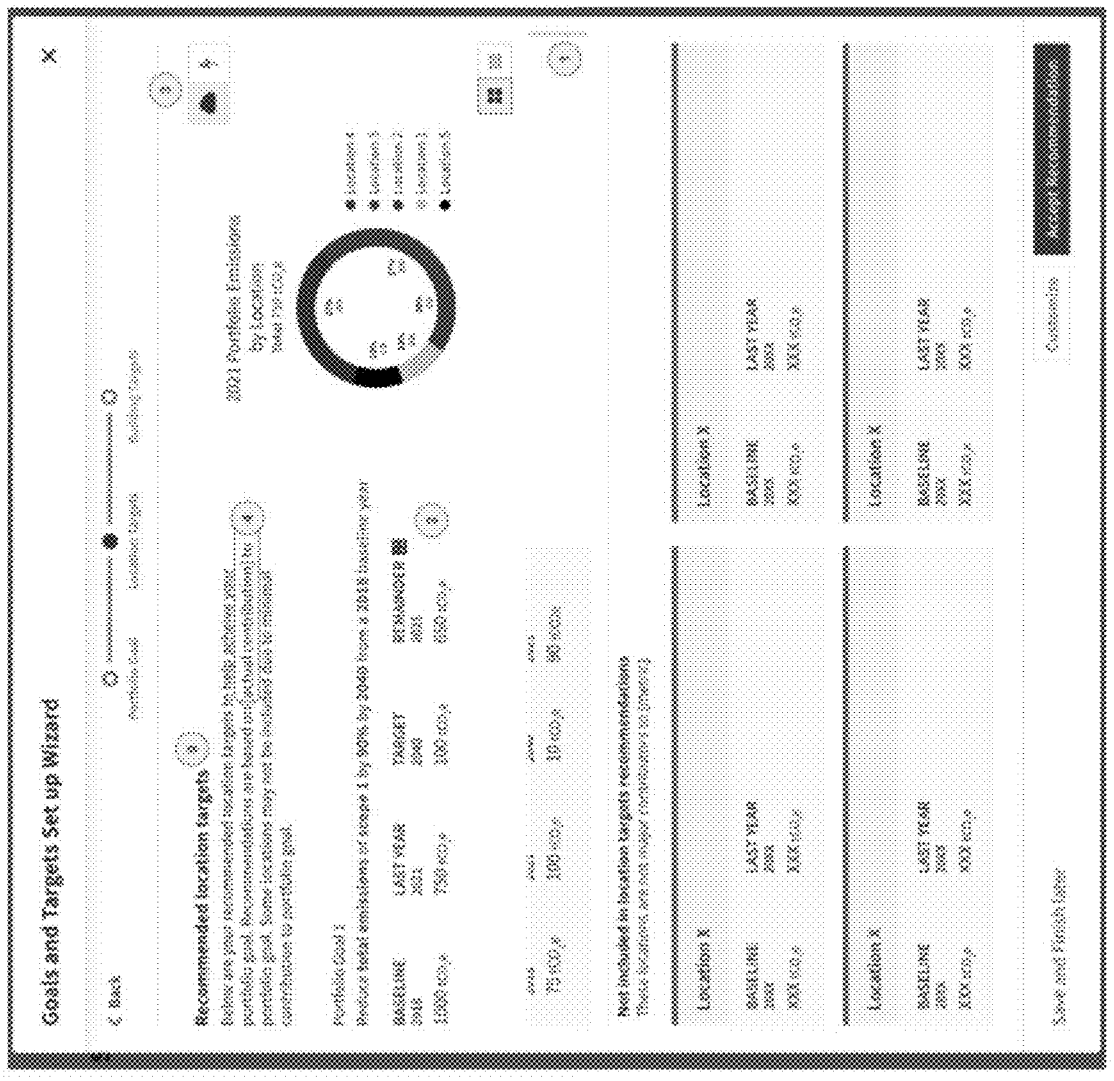
FIG. 29 is a user interface displaying a location targets window associated with a goals and targets dashboard, according to an exemplary embodiment.

Referring to FIG. 29, a user interface is displayed. The user interface can include a locations target window. The sustainability generator can determine that one or more locations are not major contributors to the business emissions value. In some embodiments, the sustainability generator can determine that a location target recommendation will not be included. In some embodiments the FIG. 28 window and the FIG. 29 window can be included in a single user interface. In some embodiments the business goal can be the business goal establish in FIG. 26 or 27.

Figure 30:
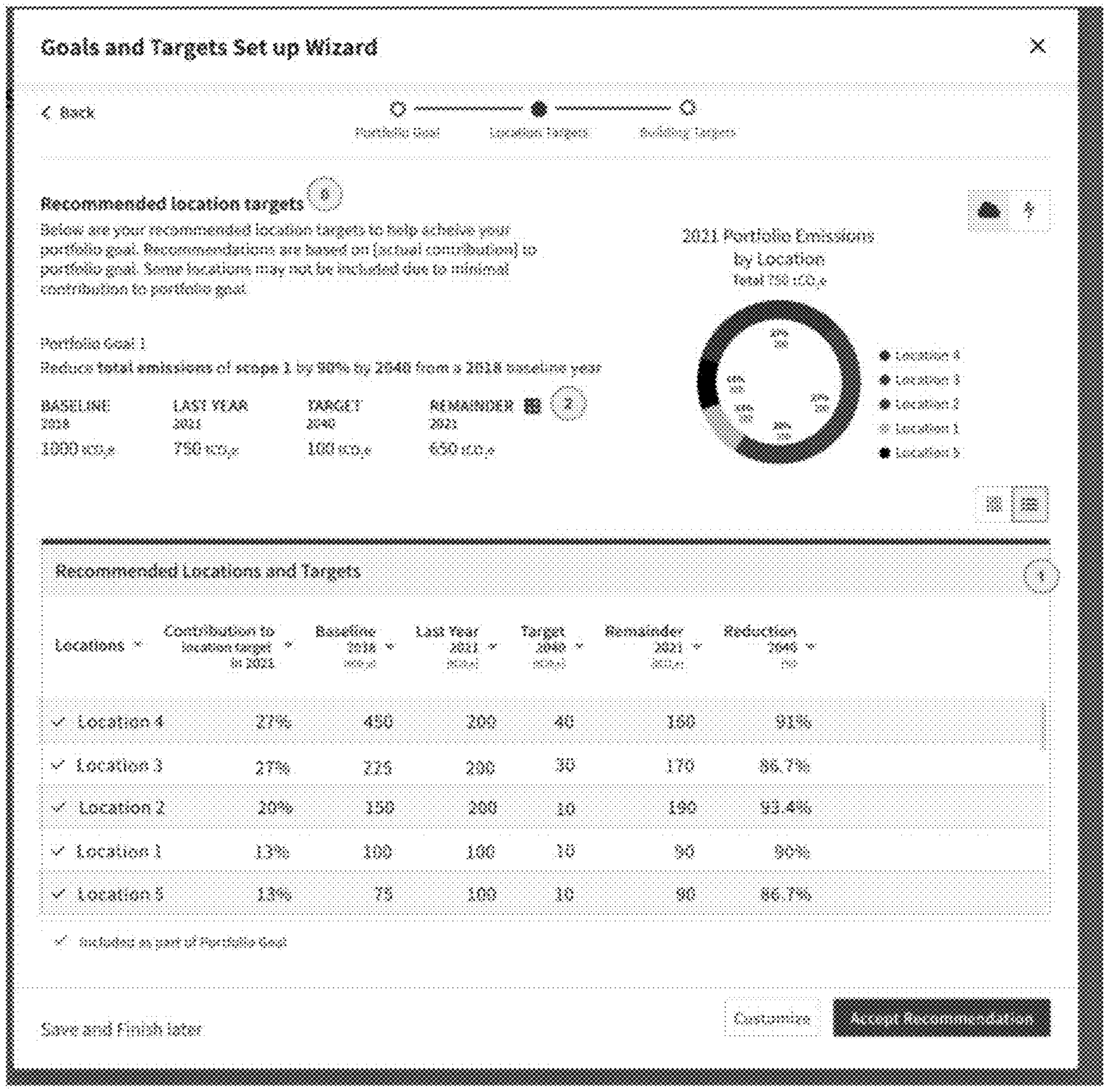
FIG. 30 is a user interface displaying a location targets window associated with a goals and targets dashboard, according to an exemplary embodiment.

Referring now to FIG. 30, a user interface is displayed. The user interface can include a locations target window. In some embodiments, the user can be directed to the FIG. 30 window by selecting the list tab in FIG. 28 or 29. In some embodiments, the information that is displayed in FIG. 30 can be the same as the information displayed in FIG. 29. In some embodiments the business goal can be the business goal establish in FIG. 26 or 27.

In some embodiments, the information displayed by the user interface in FIG. 30 can include a locations contribution percentage, a baseline emission value, a previous year emission value, a target emission value, a remainder emission value and a reduction % for the location.

Figure 31:
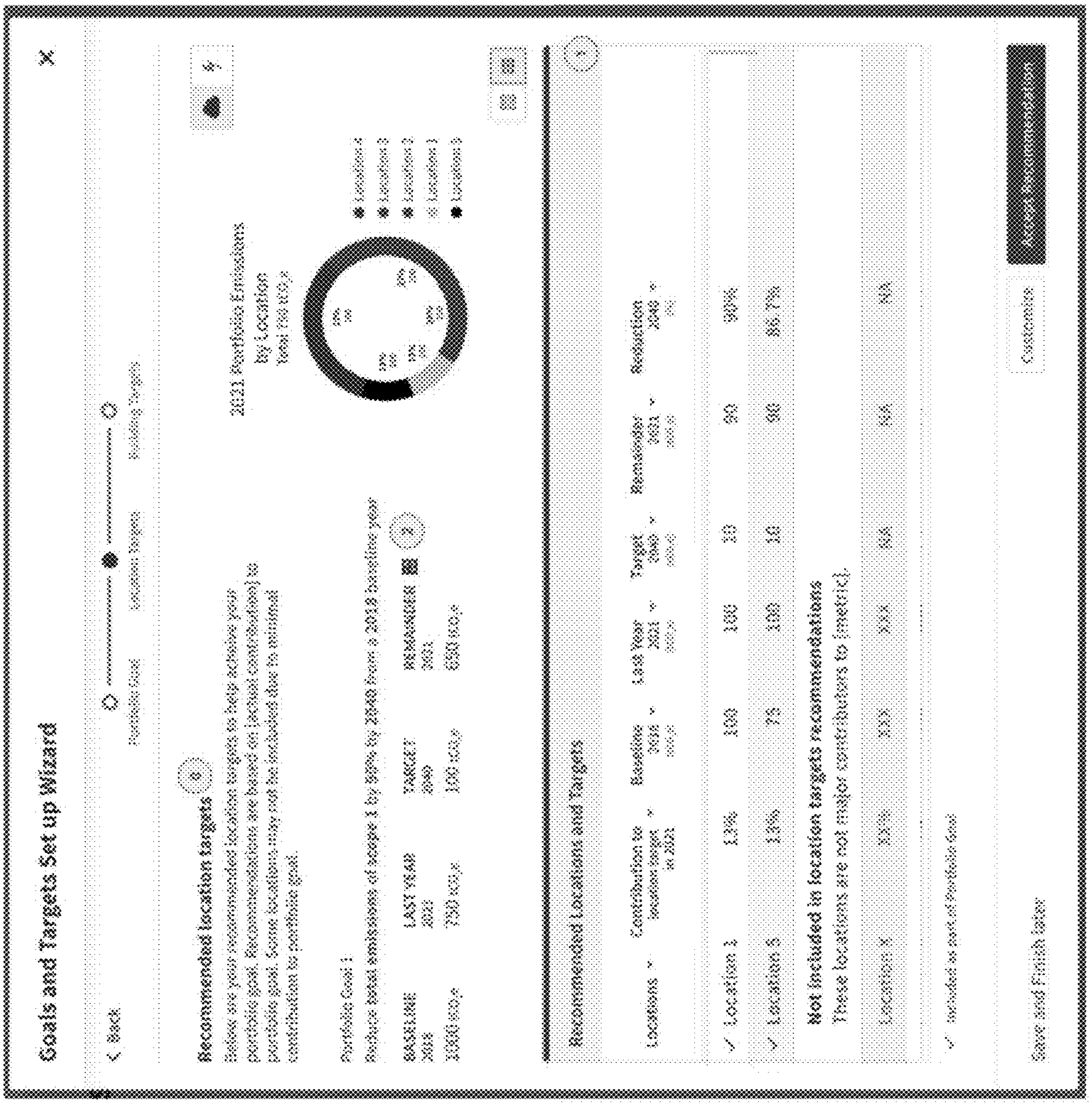
FIG. 31 is a user interface displaying a location targets window associated with a goals and targets dashboard, according to an exemplary embodiment.

Referring now to FIG. 31, a user interface is displayed. The user interface can include a locations target window. In some embodiments, the user can view the locations that have target recommendations as well as locations that do not have target recommendations. In some embodiments the FIG. 30 window and the FIG. 31 window can be included in a single user interface. In some embodiments the business goal can be the business goal establish in FIG. 26 or 27.

Figure 32:
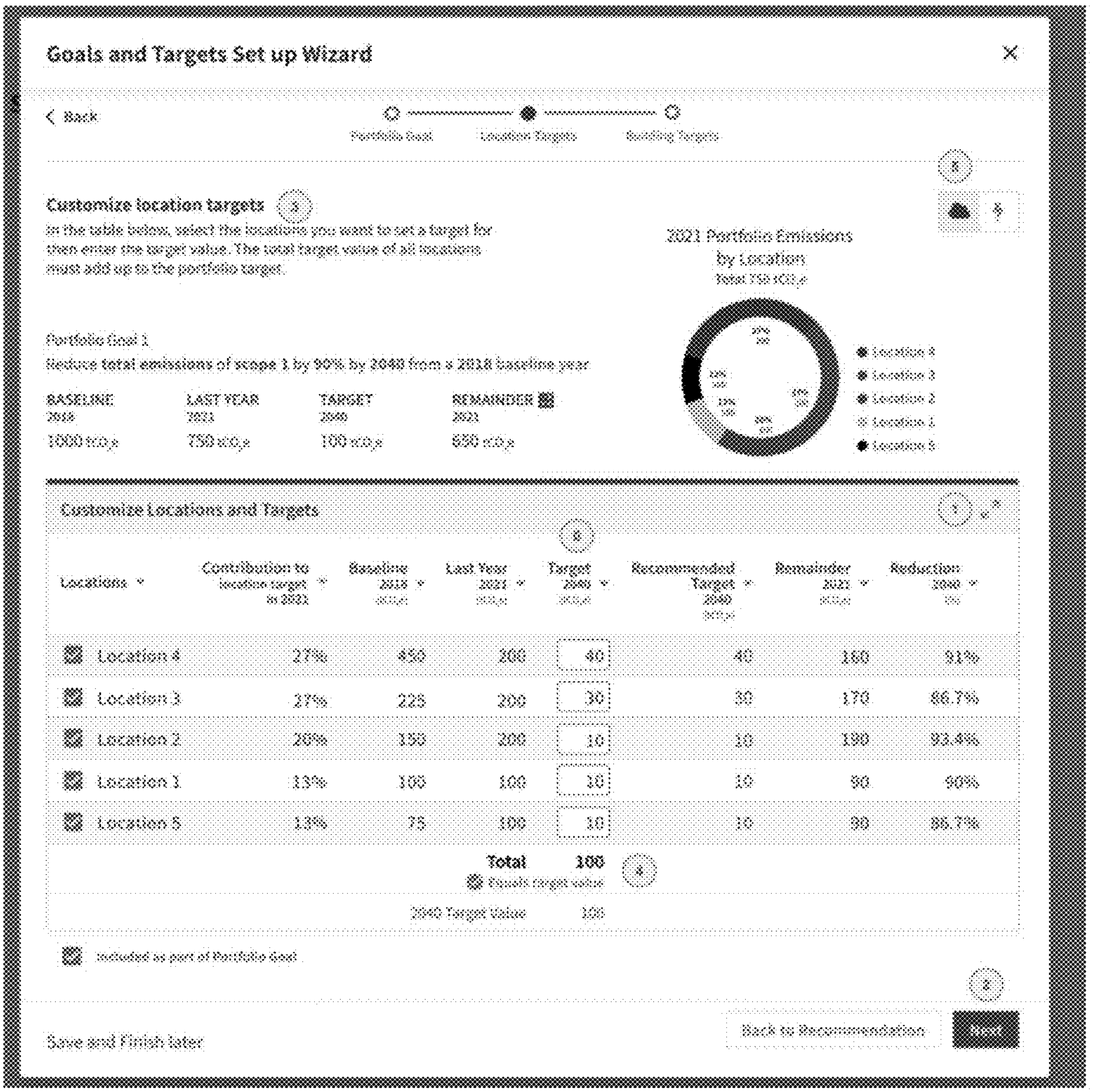
FIG. 32 is a user interface displaying a location targets window associated with a goals and targets dashboard, according to an exemplary embodiment.

Referring now to FIG. 32, a user interface is displayed. The user interface includes a location targets window. In some embodiments, the user can adjust the target value by selecting the target dropdown. In some embodiments, the user can adjust the target values displayed in FIGS. 28-31. In some embodiments, the business goal can be adjusted using the inputs received by the user. In some embodiments the business goal can be the business goal establish in FIG. 26 or 27.

Figure 33:
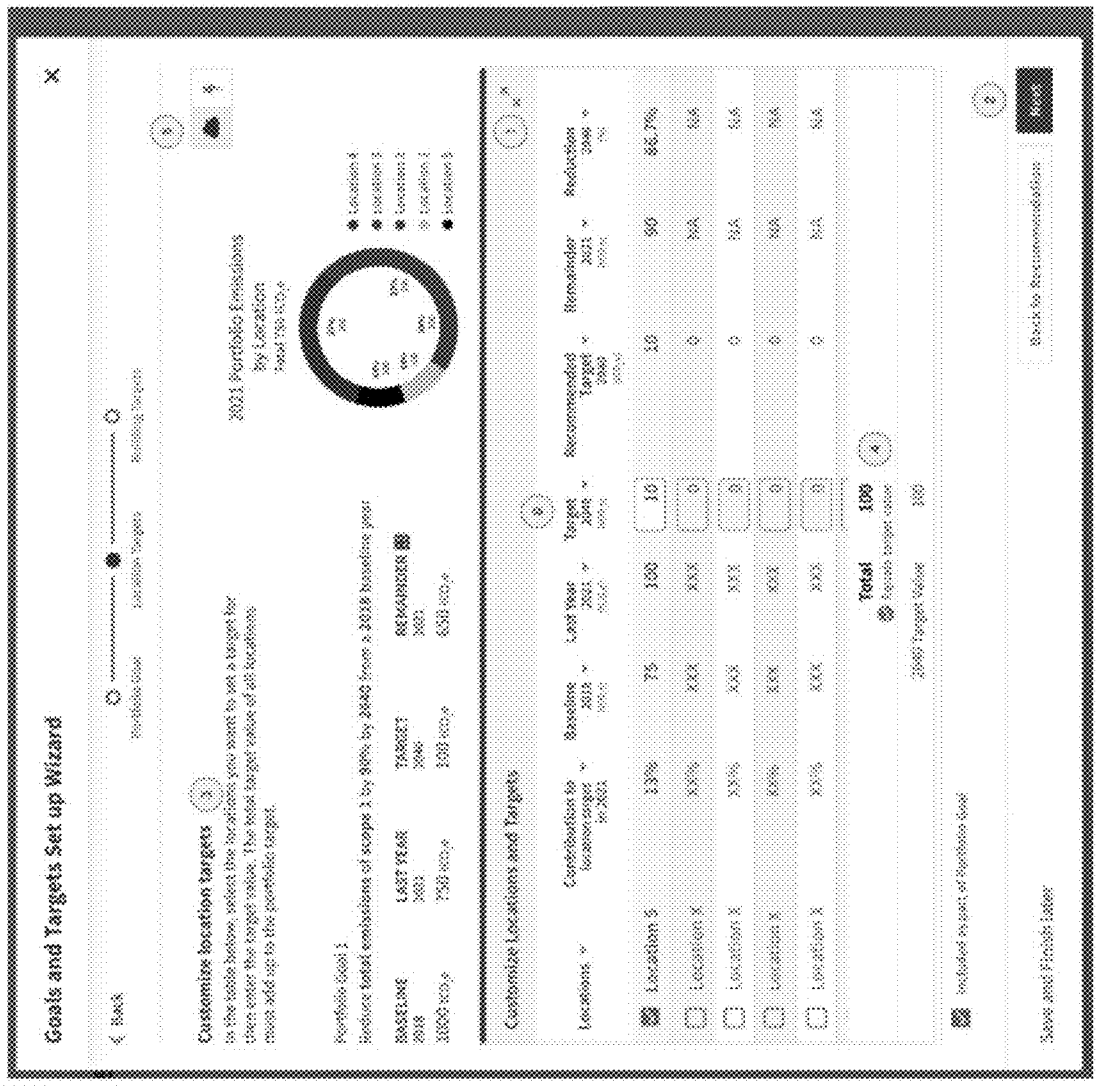
FIG. 33 is a user interface displaying a location targets window associated with a goals and targets dashboard, according to an exemplary embodiment.

Referring now to FIG. 33, a user interface is displayed. The user interface includes a location target window. The user can select if a location will be included in the location recommendation by selecting the include as part of portfolio tab associated with each location. In some embodiments, one or more locations associated with a business can be excluded from the location target recommendation. In some embodiments the business goal can be the business goal establish in FIG. 26 or 27. In some embodiments, FIG. 32 window and FIG. 33 can be included in one user interface.

Figure 34:
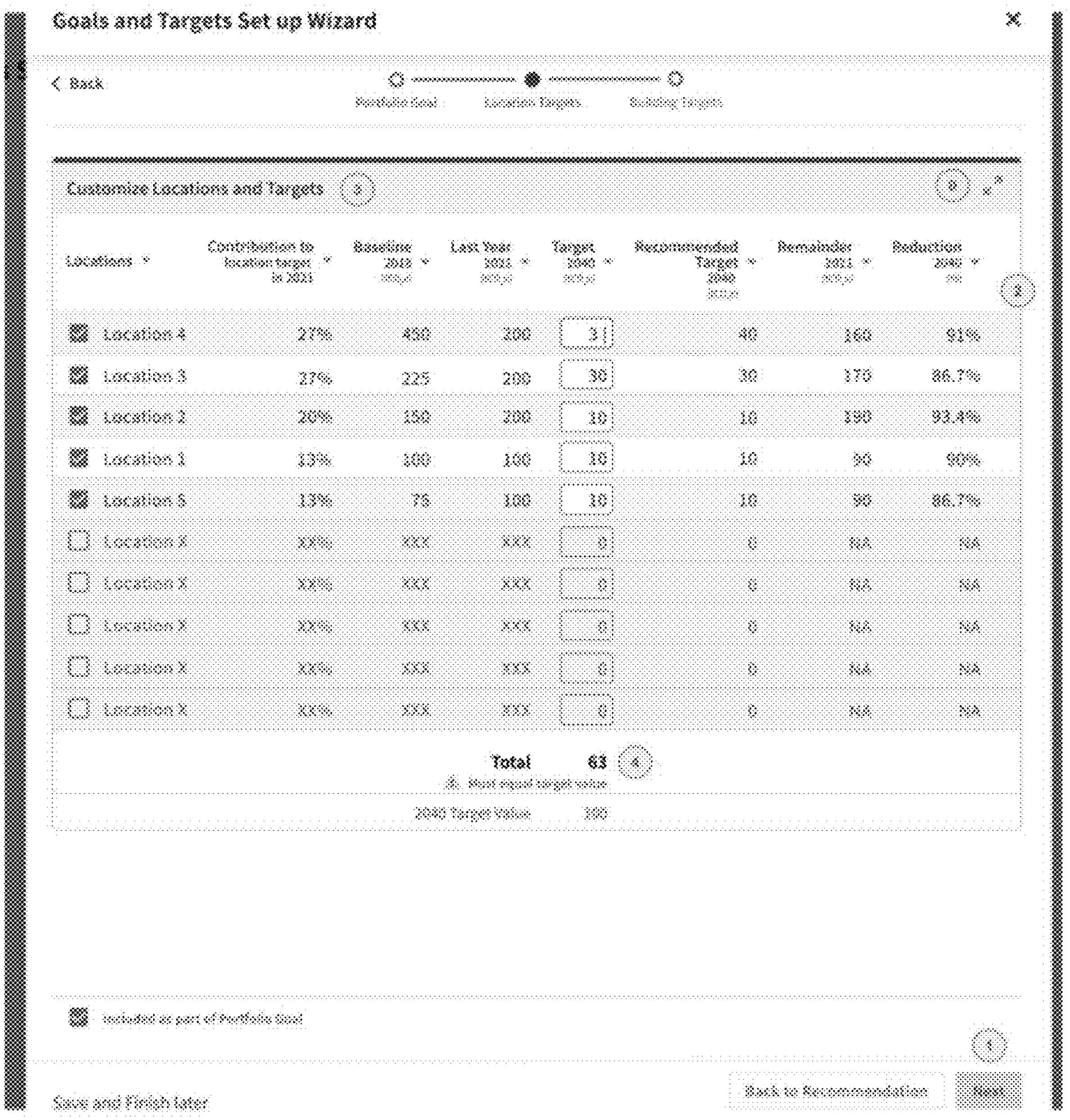
FIG. 34 is a user interface displaying a location targets window associated with a goals and targets dashboard, according to an exemplary embodiment.

Referring to FIG. 34, a user interface is displayed. The user interface includes a location target window. In some embodiments, the user can perform similar actions as in FIG. 32 or 33. In some embodiments, the location recommendations displayed in FIG. 34 can be associated with the business goal used to generate the recommendations in FIG. 33. In some embodiments the location recommendations can be based on a new business goal. In some embodiments the business goal can be the business goal establish in FIG. 26 or 27.

Figure 35:
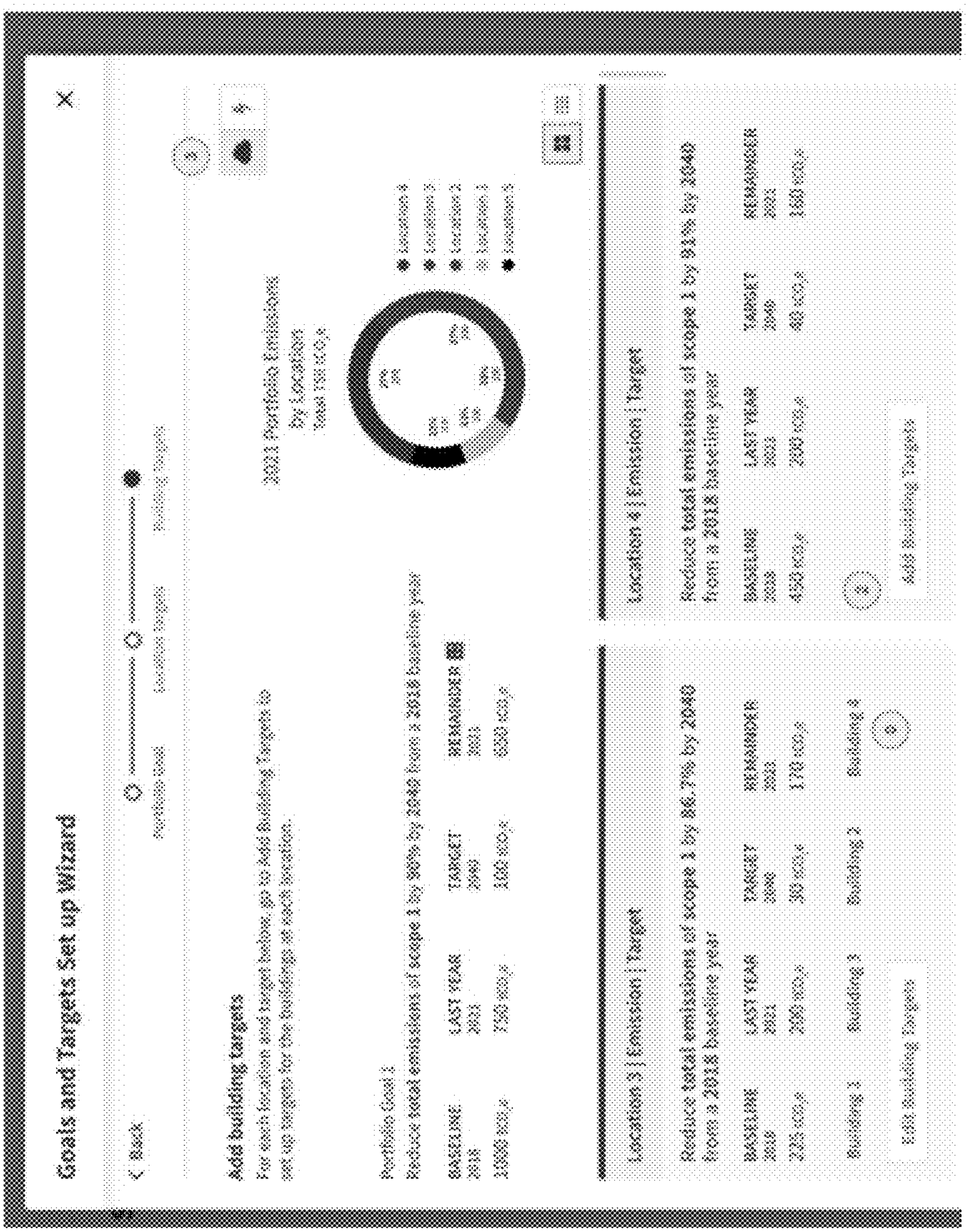
FIG. 35 is a user interface displaying a building targets window associated with a goals and targets dashboard, according to an exemplary embodiment.

Referring to FIG. 35, a user interface is displayed. The user interface includes a building targets window. As describe herein a location can have one or more buildings. The sustainability manager can use the location recommendations to generate one or more building targets for the one or more buildings associated with a location. In some embodiments, the sustainability manager can use the location recommendations from FIGS. 28-34 to generate the building recommendations. The user can edit and/or add building targets by selecting the edit building targets tab or the add building targets tab. In some embodiments, the business goal can be the business goal in FIG. 26 or 27.

Figure 36:
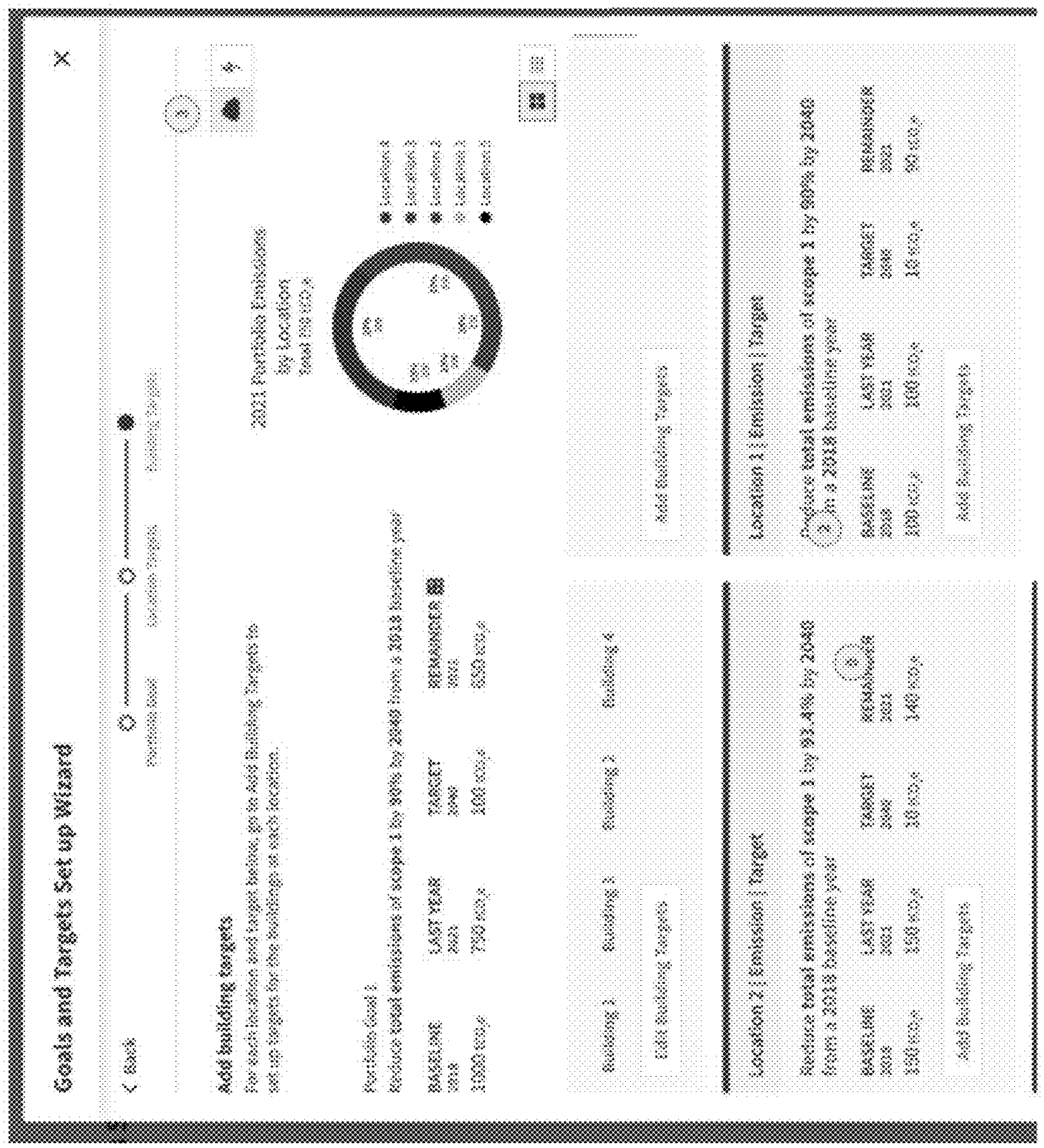
FIG. 36 is a user interface displaying a building targets window associated with a goals and targets dashboard, according to an exemplary embodiment.

Referring to FIG. 36, a user interface is displayed. The user interface includes a building targets window. The building targets window can include one or more buildings associated with a location. In some embodiments, the sustainability manager can use the location recommendations from FIGS. 28-34 to generate the building recommendations. The user can edit and/or add building targets by selecting the edit building targets tab or the add building targets tab. The FIG. 36 window and the FIG. 35 window can be included in one user interface. In some embodiments, the business goal can be the business goal in FIG. 26 or 27.

Figure 37:
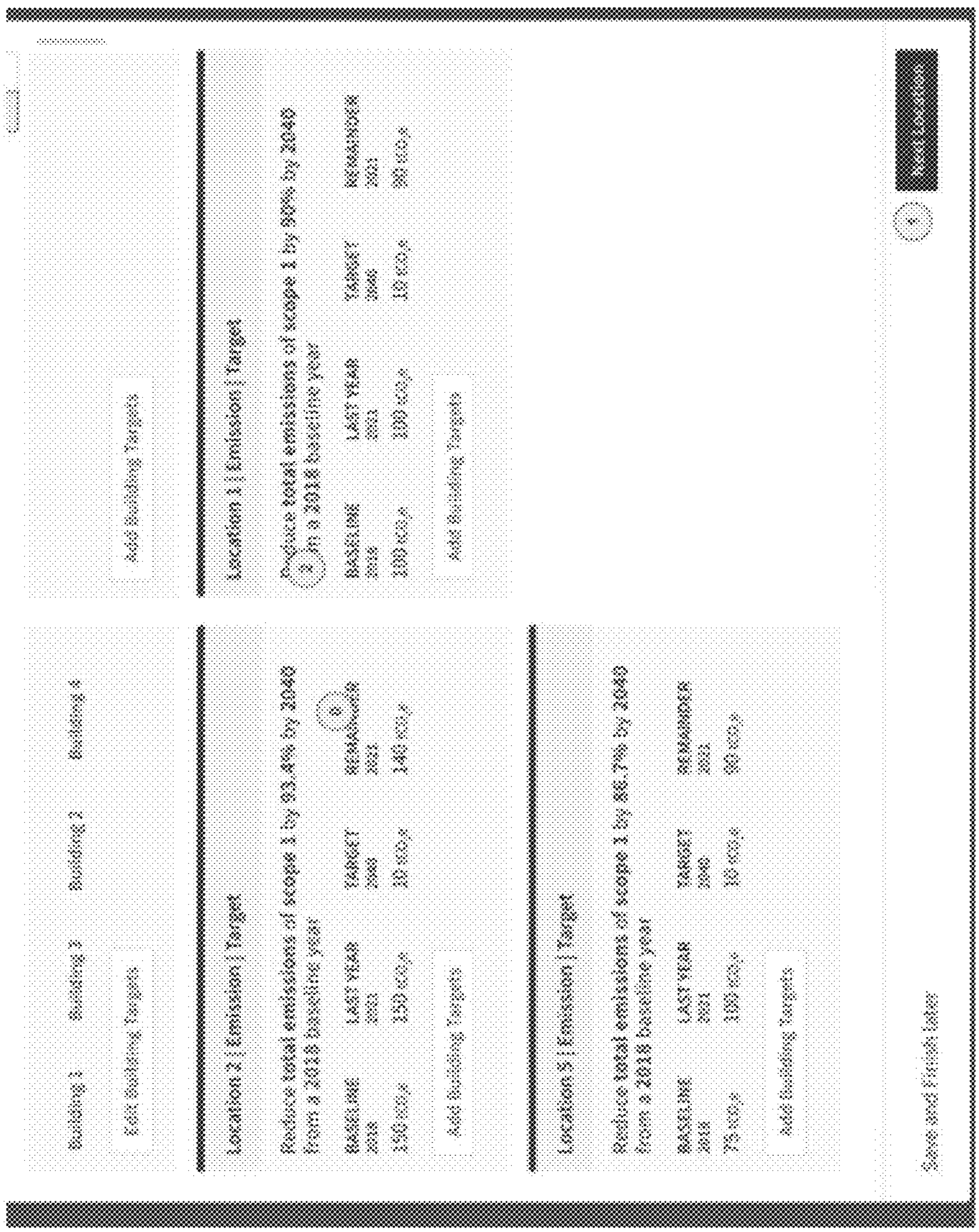
FIG. 37 is a user interface displaying a building targets window associated with a goals and targets dashboard, according to an exemplary embodiment.

Referring to FIG. 37, a user interface is displayed. The user interface includes a building targets window. The building targets window can include one or more buildings associated with a location. In some embodiments, the sustainability manager can use the location recommendations from FIGS. 28-34 to generate the building recommendations. The user can edit and/or add building targets by selecting the edit building targets tab or the add building targets tab. The FIG. 36 window, the FIG. 35 window and the FIG. 37 window can be included in one user interface. The user can move to the next location by selecting the next location tab. In some embodiments, the business goal can be the business goal in FIG. 26 or 27.

Figure 38:
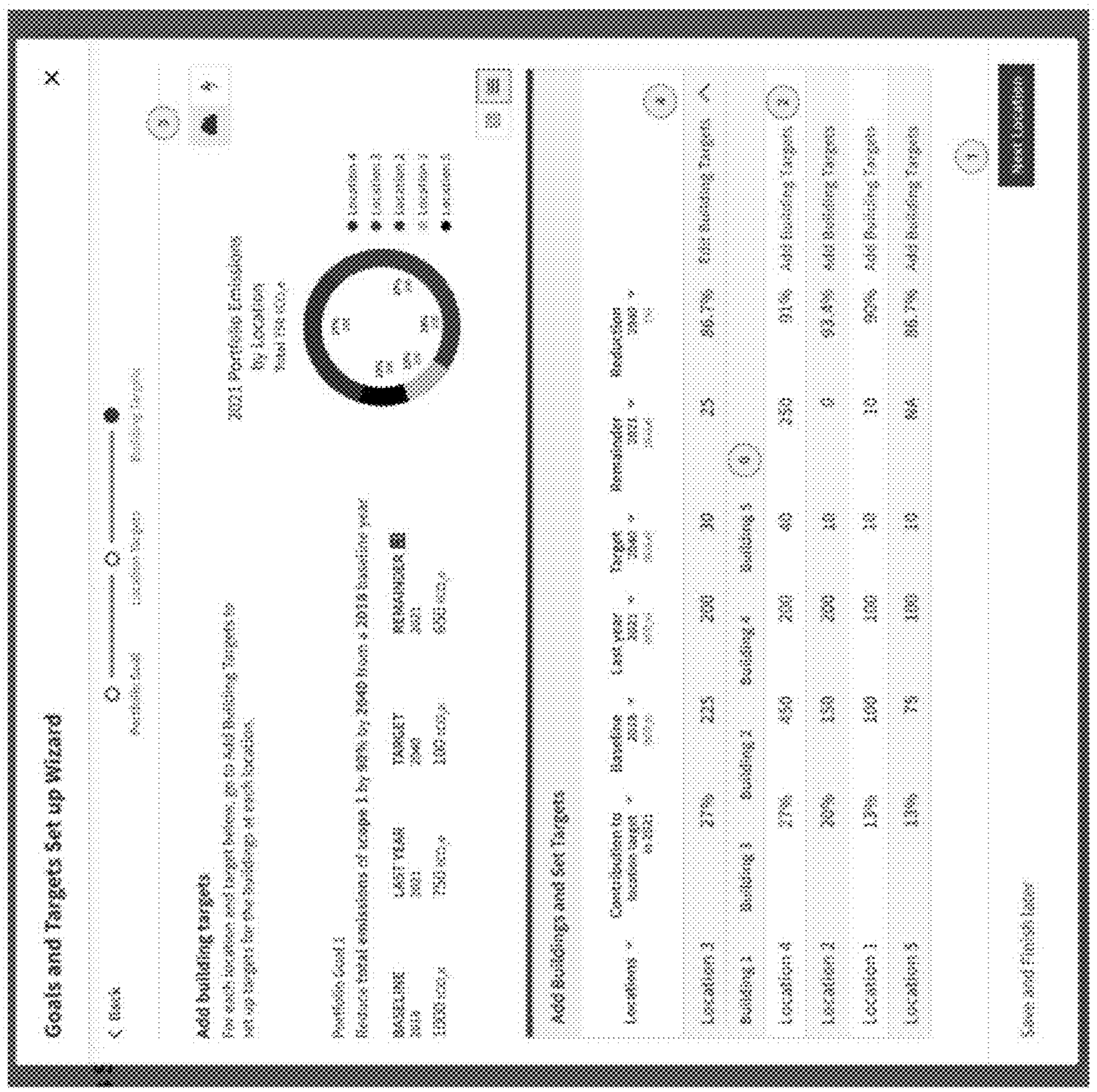
FIG. 38 is a user interface displaying a building targets window associated with a goals and targets dashboard, according to an exemplary embodiment.

Referring to FIG. 38, a user interface is displayed. The user interface includes a buildings target window. The buildings target window can include a list view of one or more locations. The locations can include one or more buildings. The user can edit and/or add building targets by selecting the edit building targets tab or the add building targets tab. The user can move to the next location by selecting the next location tab. In some embodiments, the business goal can be the business goal in FIG. 26 or 27.

Figure 39:
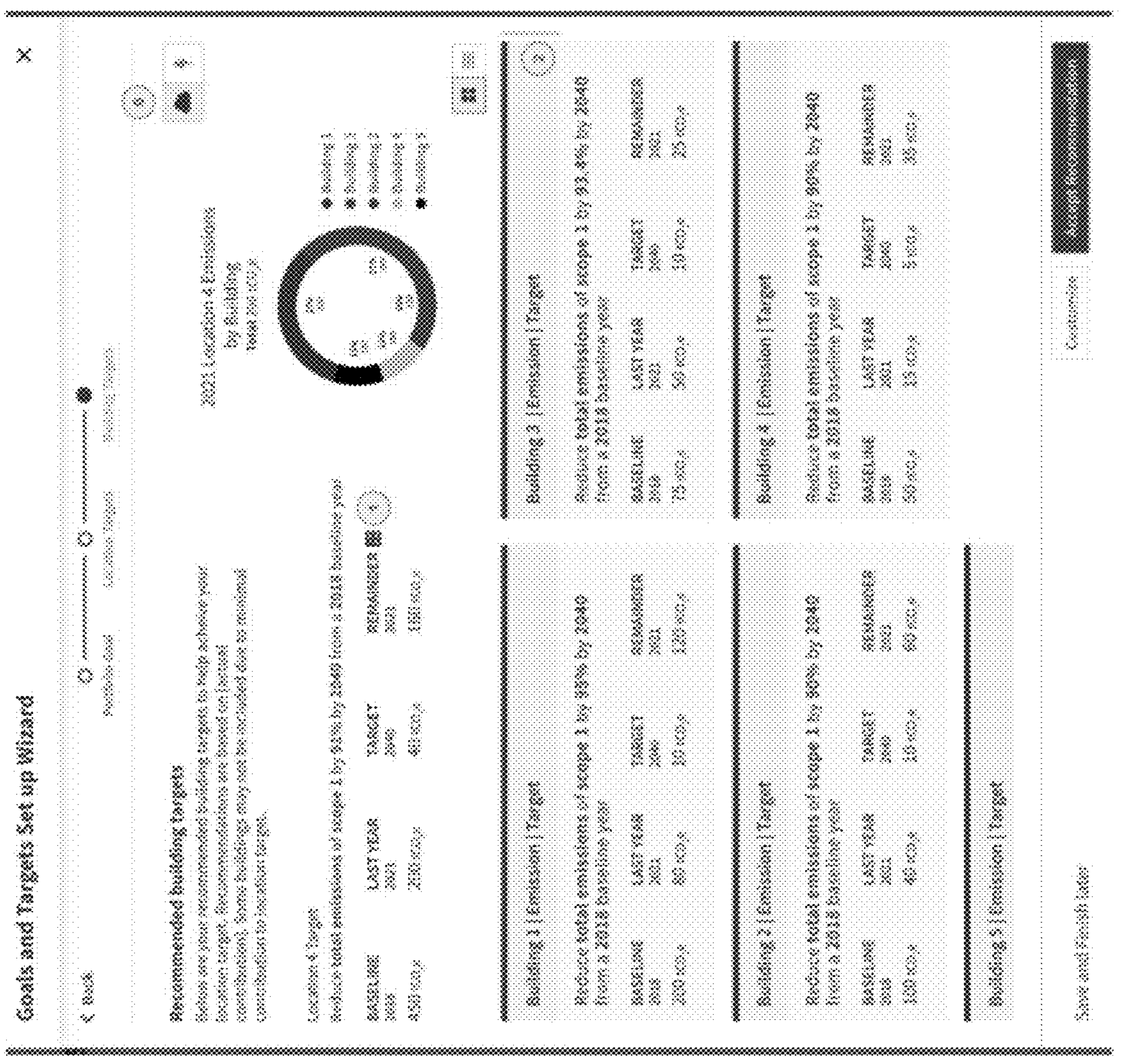
FIG. 39 is a user interface displaying a building targets window associated with a goals and targets dashboard, according to an exemplary embodiment.

Referring to FIG. 39, a user interface is displayed. The user interface includes a building target window. The building target window can include a location and the buildings associated with the location. The user can view the location target recommendation and the corresponding recommendations for the buildings associated with the location. The user can accept the recommendations by selecting the accept recommendations tab. the user can customize the recommendations by selecting the customize tab. In some embodiments, the building recommendations can be based on the business goal in FIG. 26 or 27.

Figure 40:
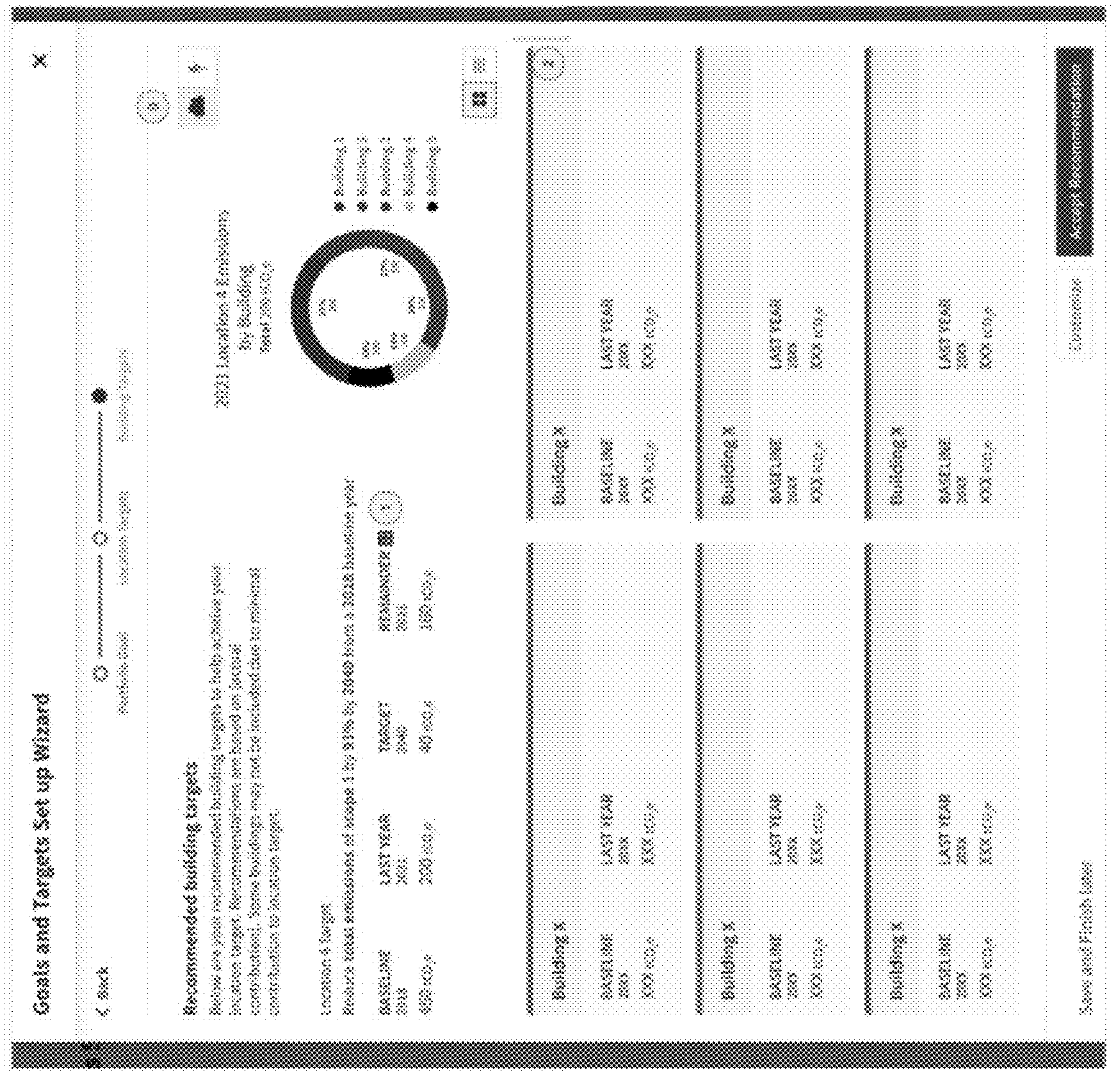
FIG. 40 is a user interface displaying a building targets window associated with a goals and targets dashboard, according to an exemplary embodiment.

Referring to FIG. 40, a user interface is displayed. The user interface includes a building target window. The building target window can include a location and the buildings associated with the location. The user can view the location target recommendation and the corresponding recommendations for the buildings associated with the location. In some embodiments, the user can view the buildings that are not included in the location recommendation. The user can accept the recommendations by selecting the accept recommendations tab. the user can customize the recommendations by selecting the customize tab. In some embodiments, the FIG. 39 window and FIG. 40 window can be included in one user interface. In some embodiments, the building recommendations can be based on the business goal in FIG. 26 or 27.

Figure 41:
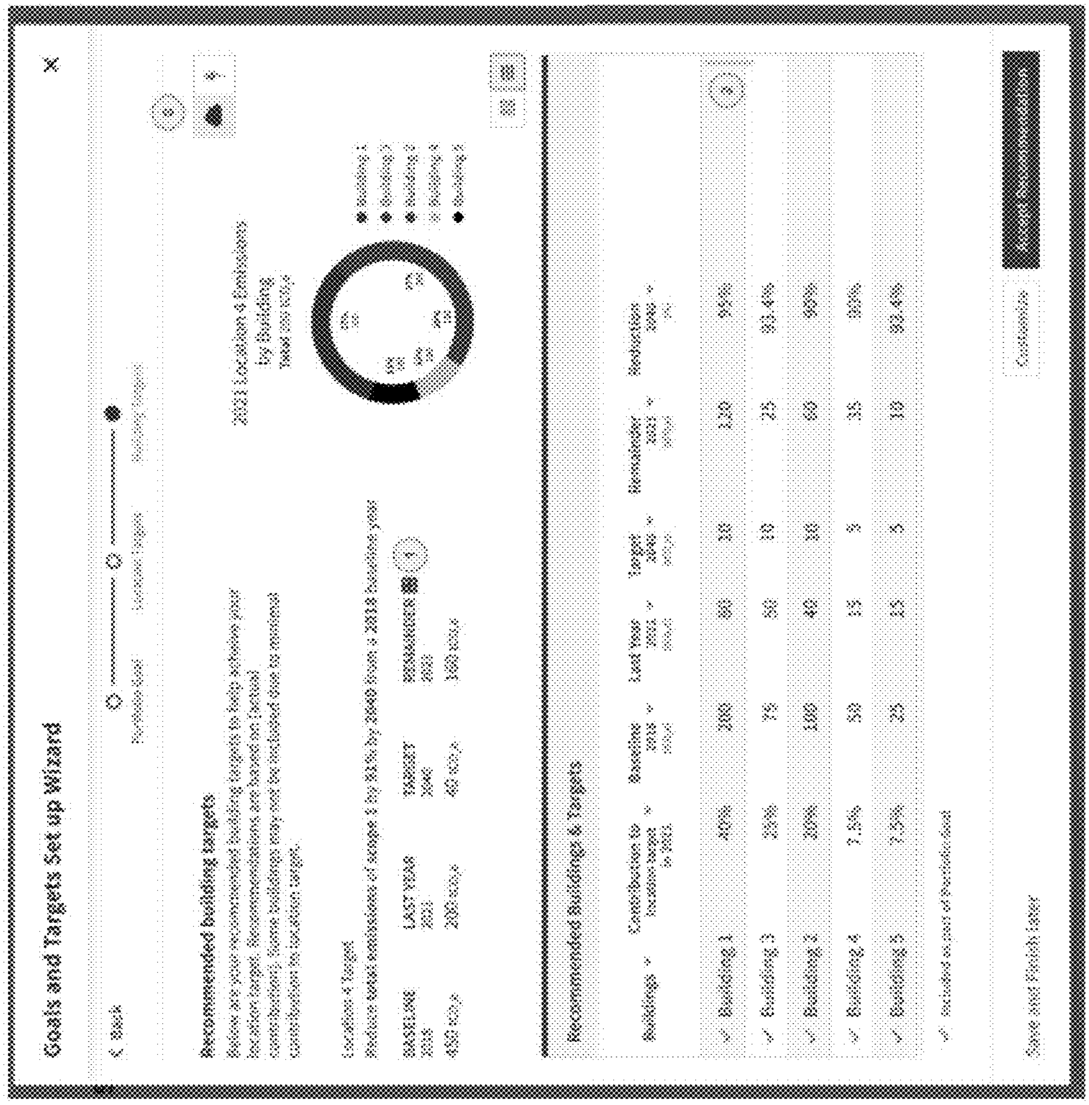
FIG. 41 is a user interface displaying a building targets window associated with a goals and targets dashboard, according to an exemplary embodiment.

Referring to FIG. 41, a user interface is displayed. The user interface can include a buildings target window. The buildings target window can include a list view of one or more buildings associated with a location. The user can view the location target recommendation and the corresponding recommendations for the buildings associated with the location. The user can accept the recommendations by selecting the accept recommendations tab. The user can customize the recommendations by selecting the customize tab. In some embodiments, the building recommendations can be based on the business goal in FIG. 26 or 27.

Figure 42:
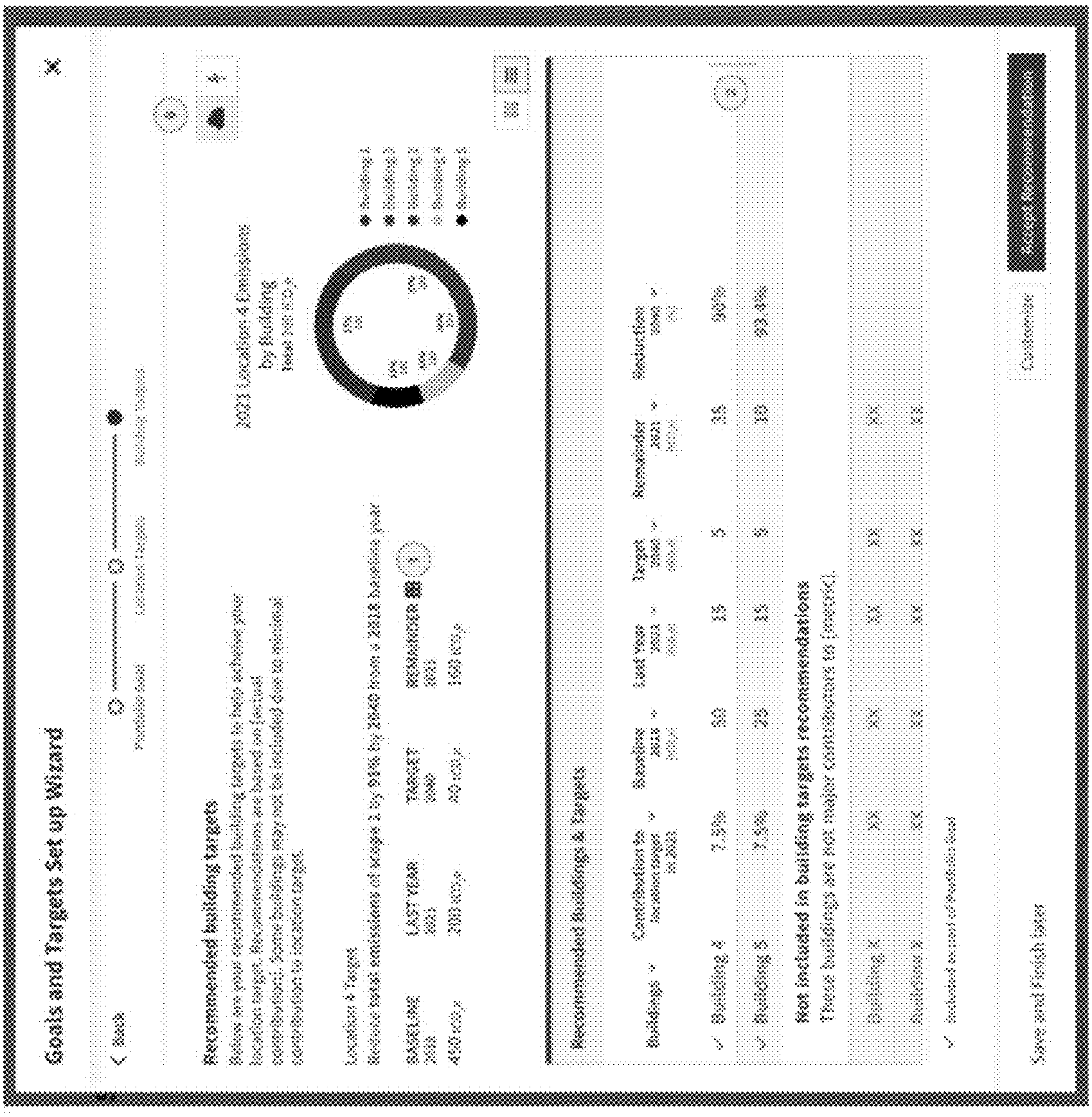
FIG. 42 is a user interface displaying a building targets window associated with a goals and targets dashboard, according to an exemplary embodiment.

Referring to FIG. 42, a user interface is displayed. The user interface can include a buildings target window. The buildings target window can include a list view of one or more buildings associated with a location. The user can view the location target recommendation and the corresponding recommendations for the buildings associated with the location. In some embodiments, the user can view the buildings that are not included in the location recommendation. The user can accept the recommendations by selecting the accept recommendations tab. the user can customize the recommendations by selecting the customize tab. In some embodiments, the FIG. 41 window and the FIG. 42 window can be included in one user interface. In some embodiments, the building recommendations can be based on the business goal in FIG. 26 or 27.

Figure 43:
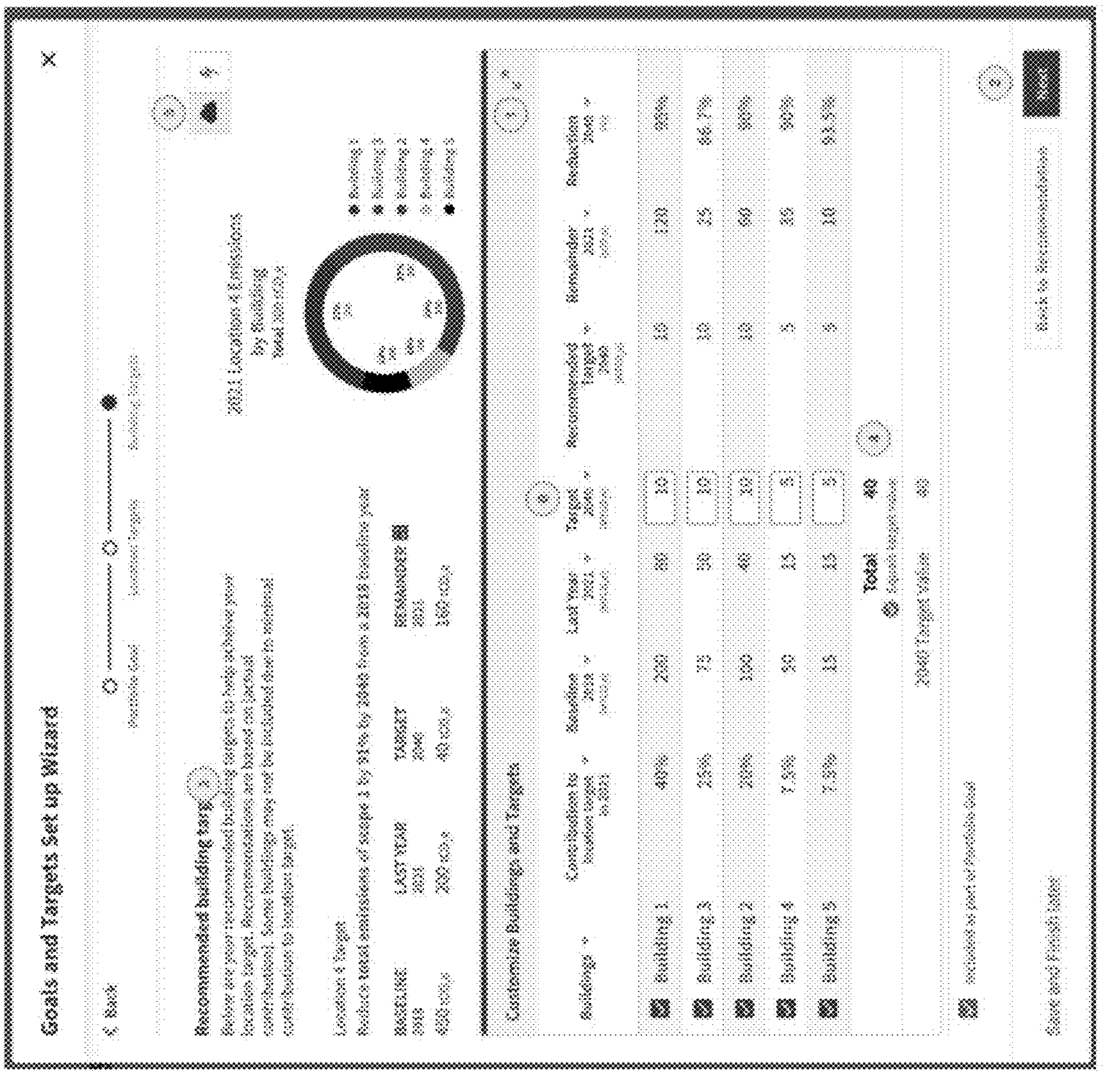
FIG. 43 is a user interface displaying a building targets window associated with a goals and targets dashboard, according to an exemplary embodiment.

Referring to FIG. 43, a user interface is displayed. The user interface can include a buildings target window. In some embodiments, the user can be directed to the FIG. 43 window by selecting the customize tab on FIGS. 39-42. In some embodiments, the user can adjust the target value for the buildings. The sustainability manager can update the location recommendation and the business goal using the inputs received by the user in FIG. 43.

Figure 44:
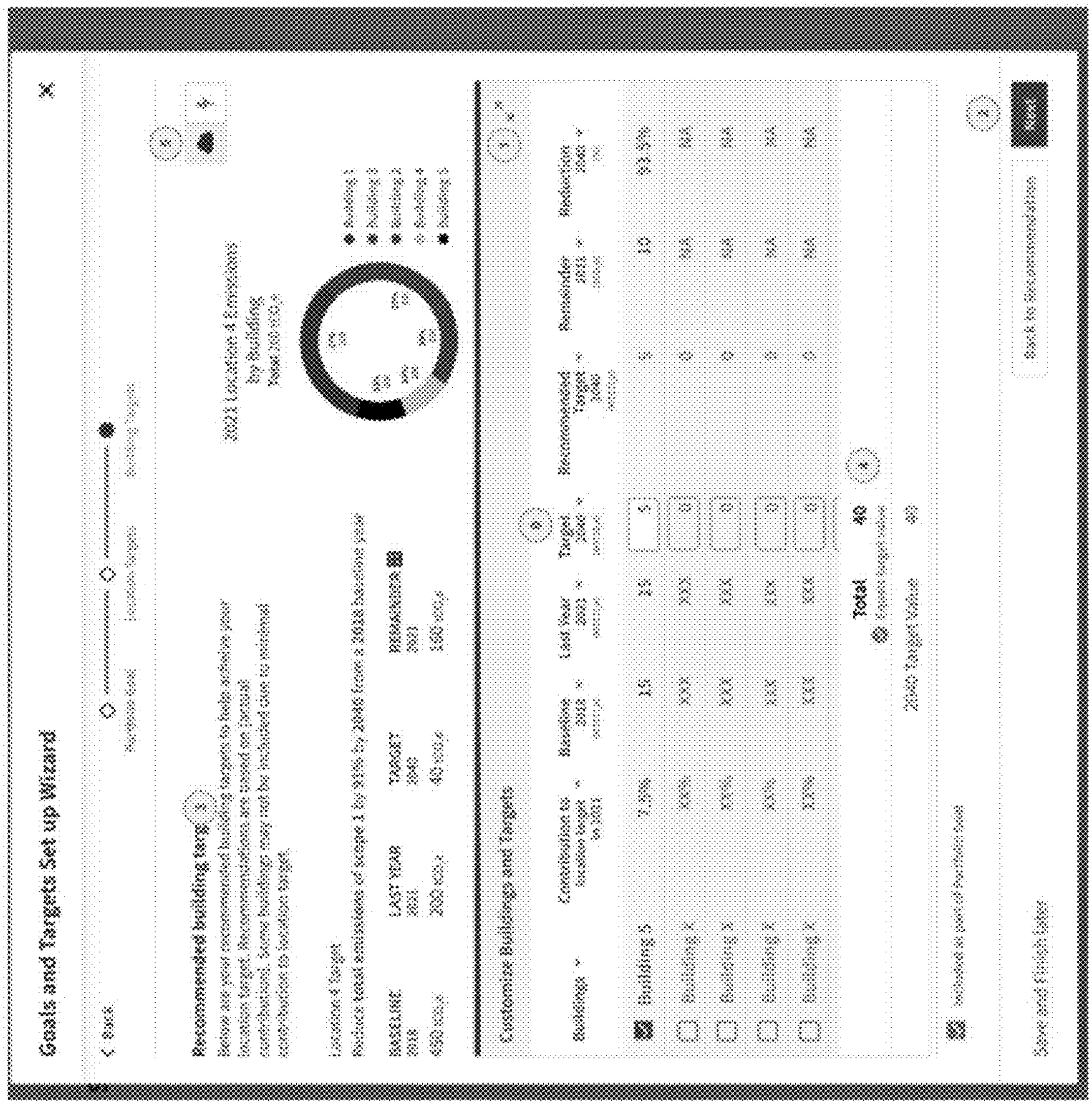
FIG. 44 is a user interface displaying a building targets window associated with a goals and targets dashboard, according to an exemplary embodiment.

Referring to FIG. 44, a user interface is displayed. The user interface can include a buildings target window. In some embodiments, the user can be directed to the FIG. 44 window by selecting the customize tab on FIGS. 39-42. In some embodiments, the user can adjust the target value for the buildings. The sustainability manager can update the location recommendation and the business goal using the inputs received by the user in FIG. 43. In some embodiments, the FIG. 43 window and FIG. 44 window can be included in one user interface.

Figure 45:
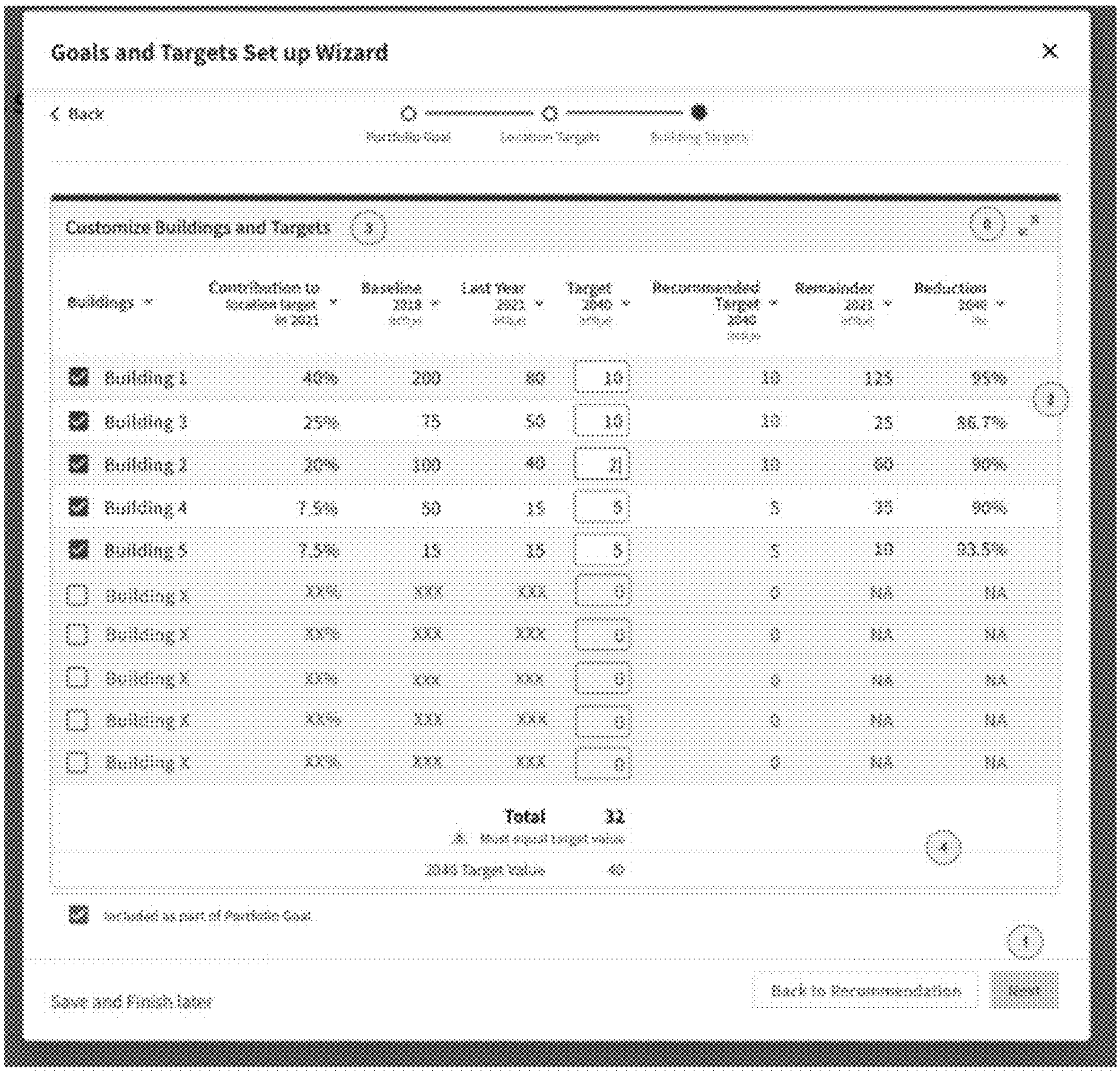
FIG. 45 is a user interface displaying a building targets window associated with a goals and targets dashboard, according to an exemplary embodiment.

Referring to FIG. 45, a user interface is displayed. The user interface can include a buildings target window. In some embodiments, the user can be directed to the FIG. 44 window by selecting the customize tab on FIGS. 39-42. In some embodiments, the user can adjust the target value for the buildings. The sustainability manager can update the location recommendation and the business goal using the inputs received by the user in FIG. 45.

Figure 46:
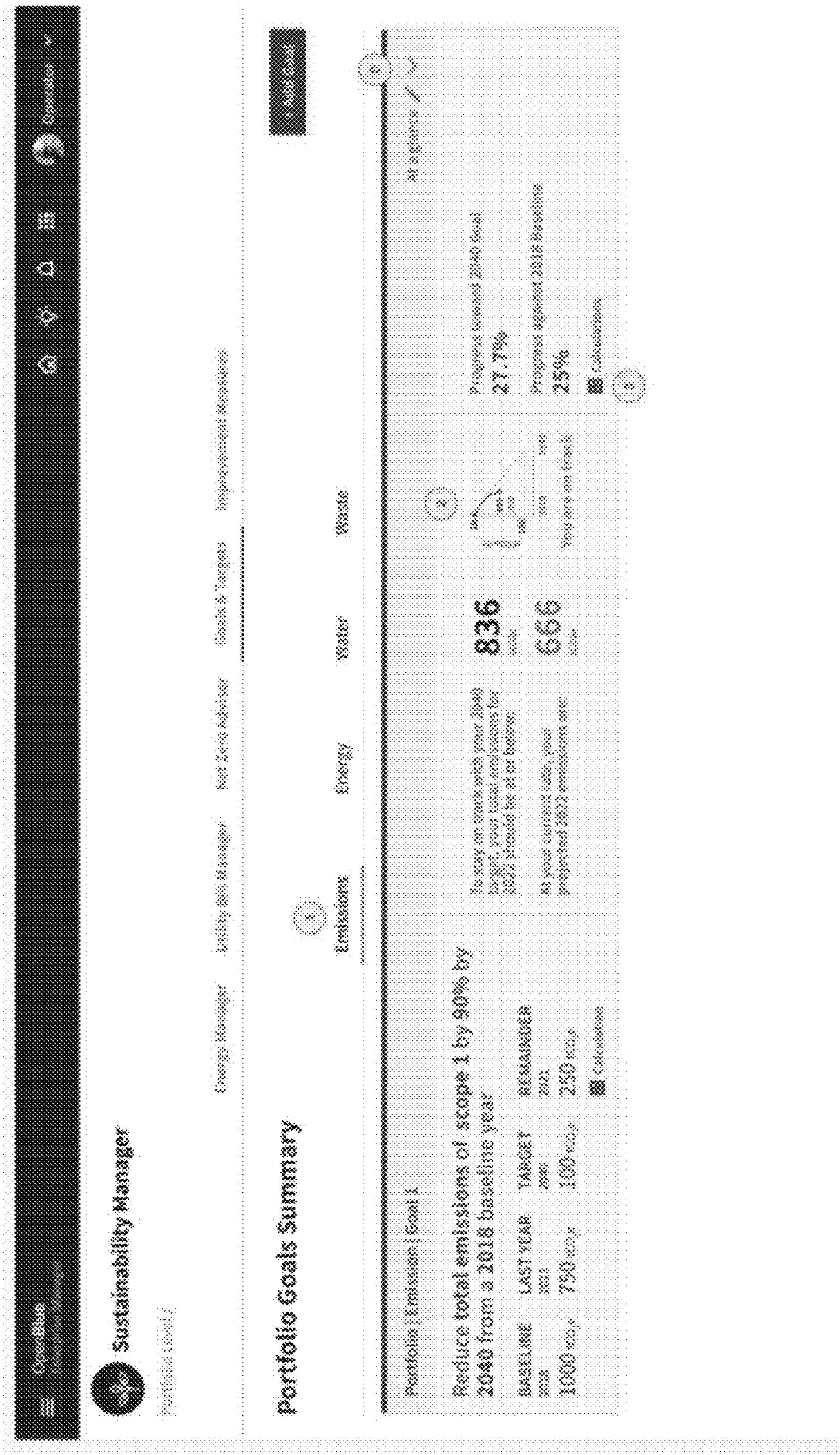
FIG. 46 is a user interface displaying a goals and targets dashboard, according to an exemplary embodiment.

Referring to FIG. 46, a user interface is displayed. The user interface can include a goals and targets dashboard. In some embodiments, the user can be directed to the goals and targets dashboard by selecting the next tab in FIG. 43-45. The dashboard can include a business goals summary. The business goals summary can include information about emissions, energy, water or waste. The information about emissions can include a business goal. In some embodiments, the business goal can be the business goal in FIG. 26 or 27. The business goal summary can include a current emissions value and a target emissions value. In some embodiments, the current emissions value is based on usage data and the target emissions value is based on the business goal. In some embodiments, the locations can include at a glance tab. The business summary can also include a progress towards goal and a progress against baseline.

Figure 47:
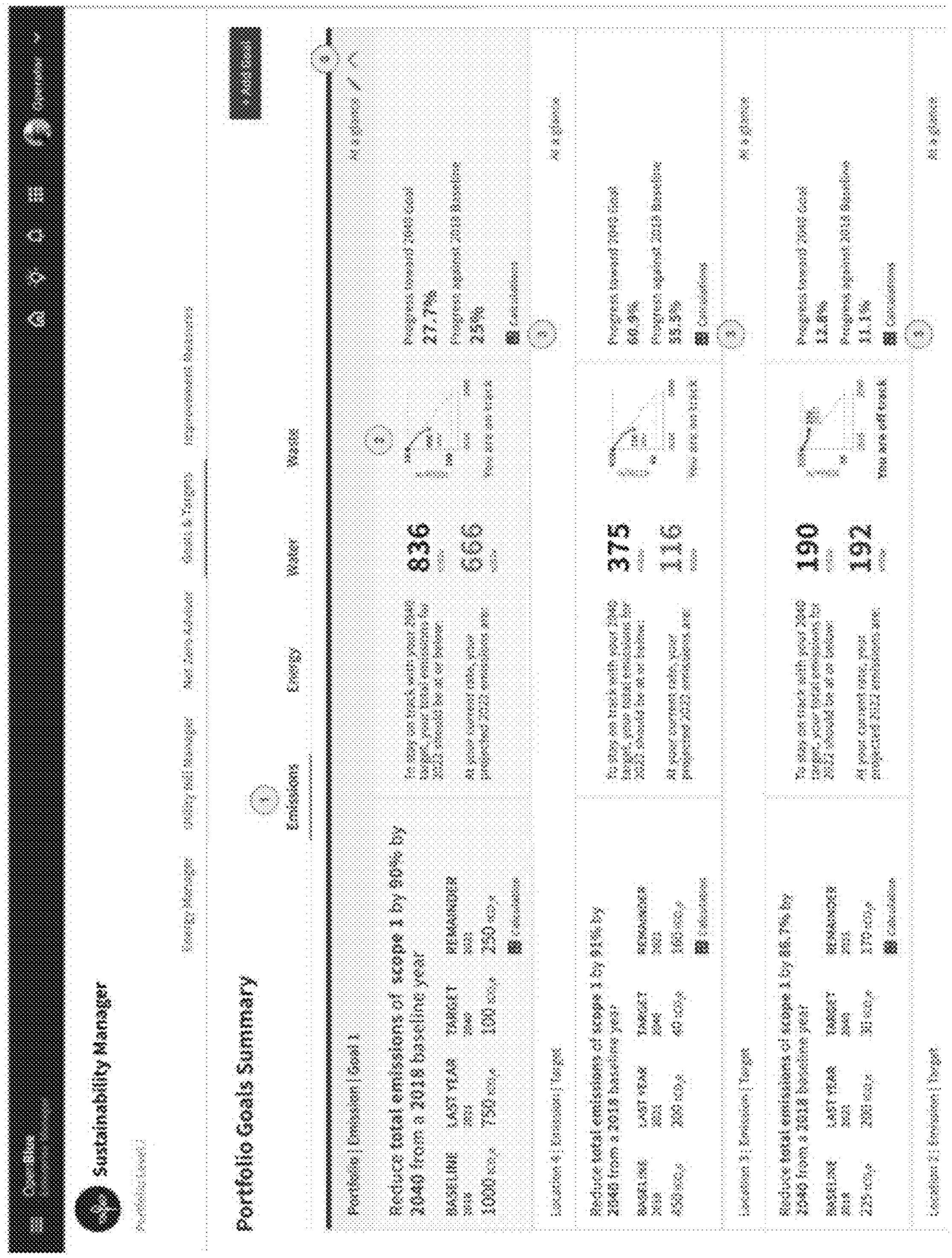
FIG. 47 is a user interface displaying a goals and targets dashboard, according to an exemplary embodiment.

Referring to FIG. 47, a user interface is displayed. The user interface can include a goals and targets dashboard. In some embodiments, the user can be directed to the goals and targets dashboard by selecting the next tab in FIG. 43-45. The dashboard can include a business goals summary. The business goals summary can include information about emissions, energy, water or waste. The information about emissions can include a business goal and location recommendations for one or more locations associated with the business. In some embodiments, the business goal can be the business goal in FIG. 26 or 27. The business goal summary can include a current emissions value and a target emissions value. In some embodiments, the current emissions value is based on usage data and the target emissions value is based on the business goal. In some embodiments, the business goal summary can include a current emissions value for a location and a target emissions value for the location. In some embodiments, the FIG. 46 and FIG. 47 dashboard can be included in one user interface. In some embodiments, the locations can include at a glance tab. The business summary can also include a progress towards goal and a progress against baseline.

Figure 48:
FIG. 48 is a user interface displaying a goals and targets dashboard, according to an exemplary embodiment.

Referring to FIG. 48, a user interface is displayed. The user interface can include information about emissions and location recommendations for one or more locations associated with a business. The information can include a current emissions value for a location and a target emissions value for the location. In some embodiments, the FIG. 46, FIG. 47 and FIG. 48 dashboard can be included in one user interface. In some embodiments, the locations can include at a glance tab. The business summary can also include a progress towards goal and a progress against baseline.

In some embodiments, the sustainability manager can determine a progress towards the business goal metric and a progress against a baseline metric. The sustainability model can use a current emission metric and the business goal metric to determine the progress towards business goal metric. The sustainability model can use the current emission metric and the baseline metric to determine the progress against a baseline metric. For example, if the baseline metric is 1000 and the current emission metric is 750, the progress against the baseline metric would be 25%. If the current emission metric is 750 and the business goal is 250, the progress against towards business goal would be 27.7%.

In some embodiments, the sustainability manager can use the progress towards the business goal metric and the progress against the baseline metric to determine if the business goal will be reached by the target year. In some embodiments, the sustainability model can determine that the business goal will be reached prior to the target year. In some embodiments, the sustainability model can determine that the business goal will not be reached by the target year. The sustainability model can use the progress towards the business goal metric and the progress against the baseline metric to determine if any actions need to be taken. The sustainability model can update the recommendations if the progress towards the business goal metric or the progress against the baseline metric are not within a predetermined value given the target year. The updated recommendations can be used to enhance the progress toward the business goal metric and the progress against the baseline metric.

Figure 49:
FIG. 49 is a user interface displaying a window associated with a goals and targets dashboard, according to an exemplary embodiment.
Figure 50:
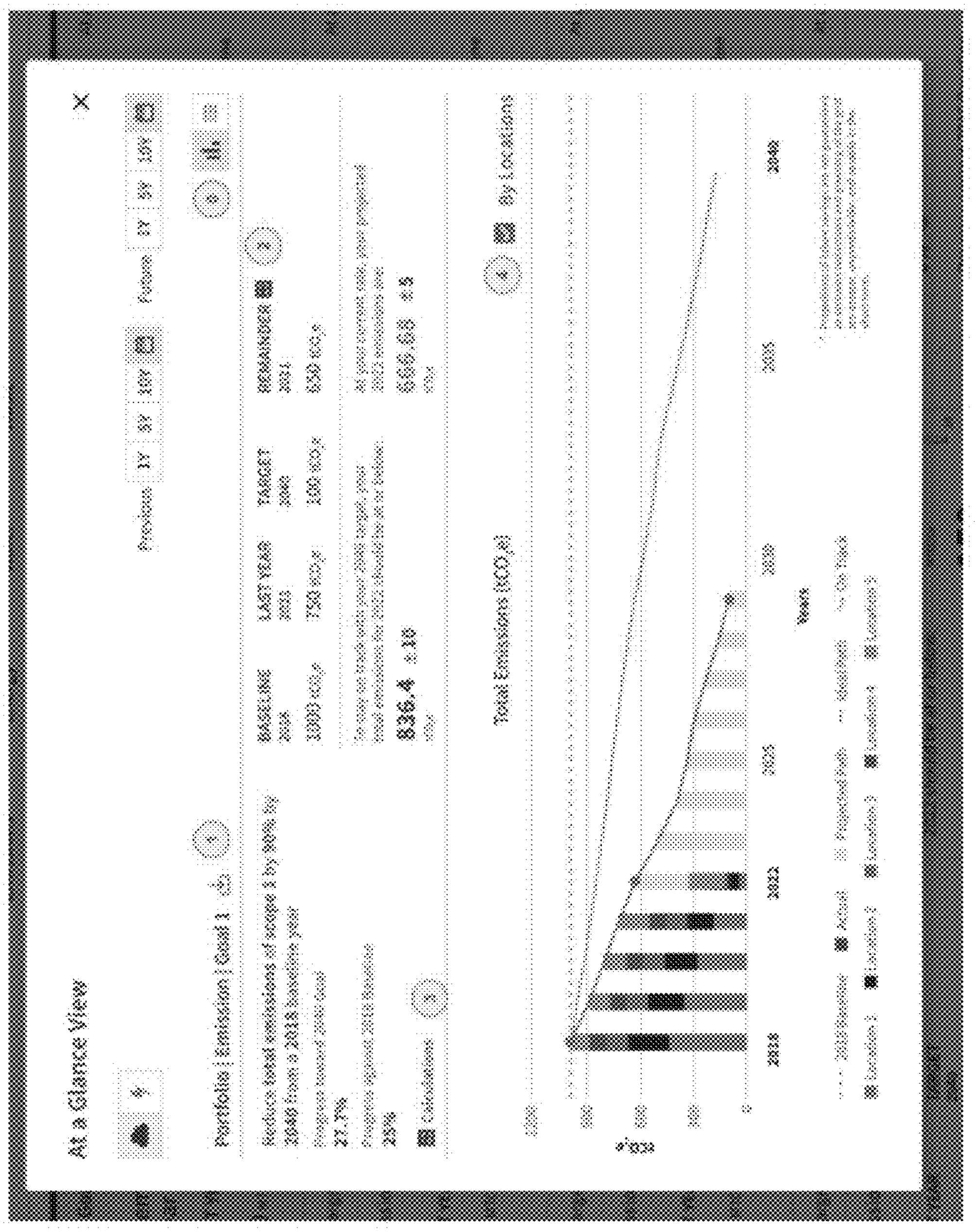
FIG. 50 is a user interface displaying a window associated with a goals and targets dashboard, according to an exemplary embodiment.

Referring to FIG. 49, a user interface is displayed. The user interface can include a window associated with a goals and targets dashboard. In some embodiments the user can be directed to the window by selecting one of the at a glance tabs in FIG. 46-48. The window can include a graphical view of the business emissions. In some embodiments, the user can view a location view by selecting the by location box. In some embodiments, the window can include the information displayed in FIGS. 46-48. In some embodiments, the total emissions graph can present a target trajectory and a current trajectory. The target trajectory can be based on the business goal. The current trajectory can be based on the current emissions trends and if those emission trends continue a new target date can be reached. The graphical view of the business emissions can allow for a user to see a current year emission values along with the emissions target for the current year. This graphical representation can allow the user to view how the current emission values relate to the emission target Referring to FIG. 50, a user interface is displayed. The user interface can include a window associated with a goals and targets dashboard. In some embodiments the user can be directed to the window by selecting the by location box in FIG. 49. The window can include a graphical view of the location emissions. In some embodiments, the graphical view can include information about one or more buildings associated with the location. In some embodiments, the window can include the information displayed in FIGS. 46-48. In some embodiments, the total emissions graph can present a target trajectory and a current trajectory. The target trajectory can be based on the location recommendation. The current trajectory can be based on the current emissions trends and if those emission trends continue a new target date can be reached. The location view can allow the user to view the emission difference between one or more years as well as the emission adjustments for one or more locations.

Figure 51:
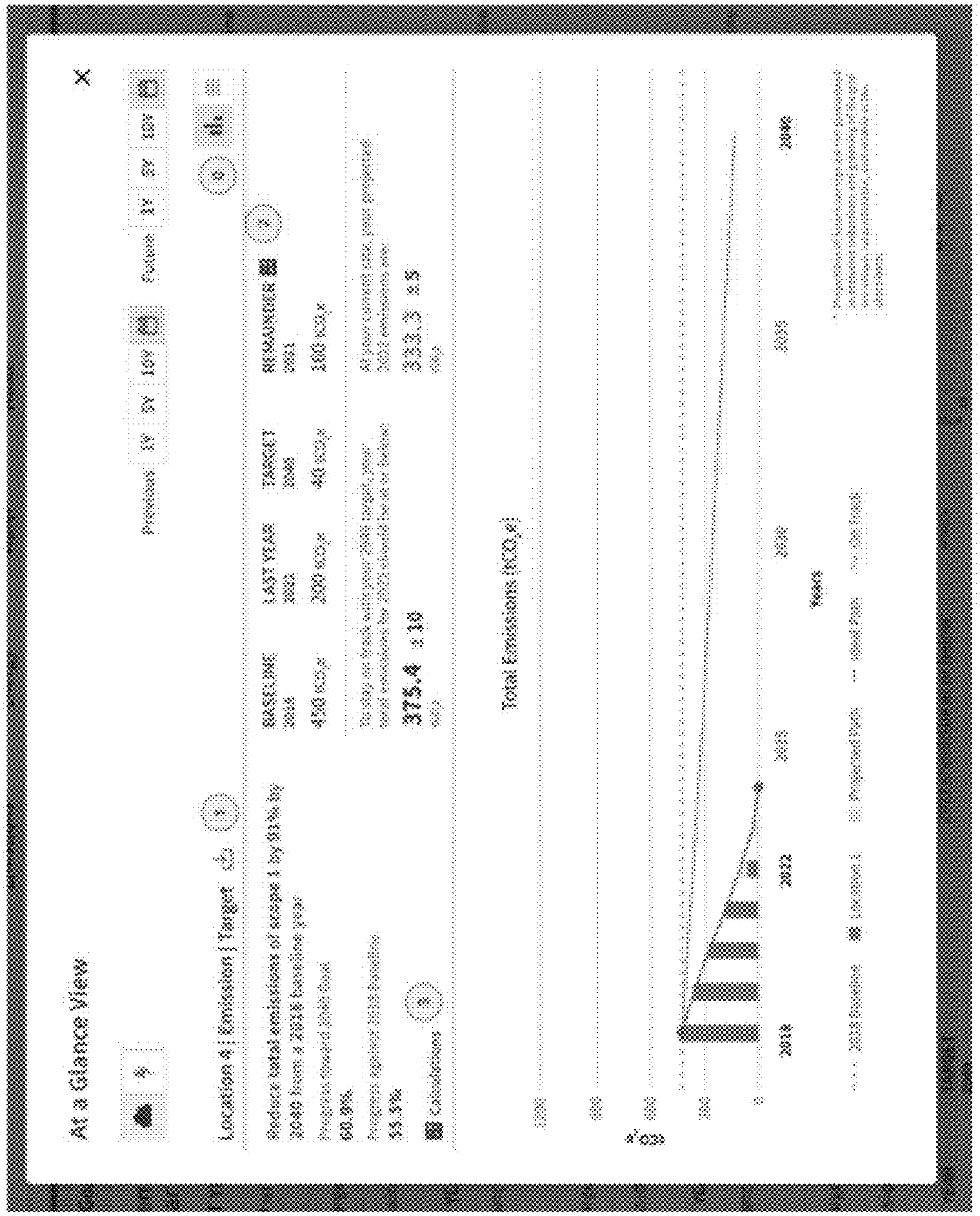
FIG. 51 is a user interface displaying a window associated with a goals and targets dashboard, according to an exemplary embodiment.

Referring to FIG. 51, a user interface is displayed. The user interface can include a window associated with a goals and targets dashboard. In some embodiments the user can be directed to the window by selecting the by location box in FIG. 49. The window can include a graphical view of the location emissions. In some embodiments, the graphical view can include information about one or more buildings associated with the location. In some embodiments, the window can include the information displayed in FIGS. 46-48. In some embodiments, the total emissions graph can present a target trajectory and a current trajectory. The target trajectory can be based on the location recommendation goal. The current trajectory can be based on the current emissions trends and if those emission trends continue a new target date can be reached. The graphical view can allow the user to view the emission differences for a location between one or more years.

Figure 52:
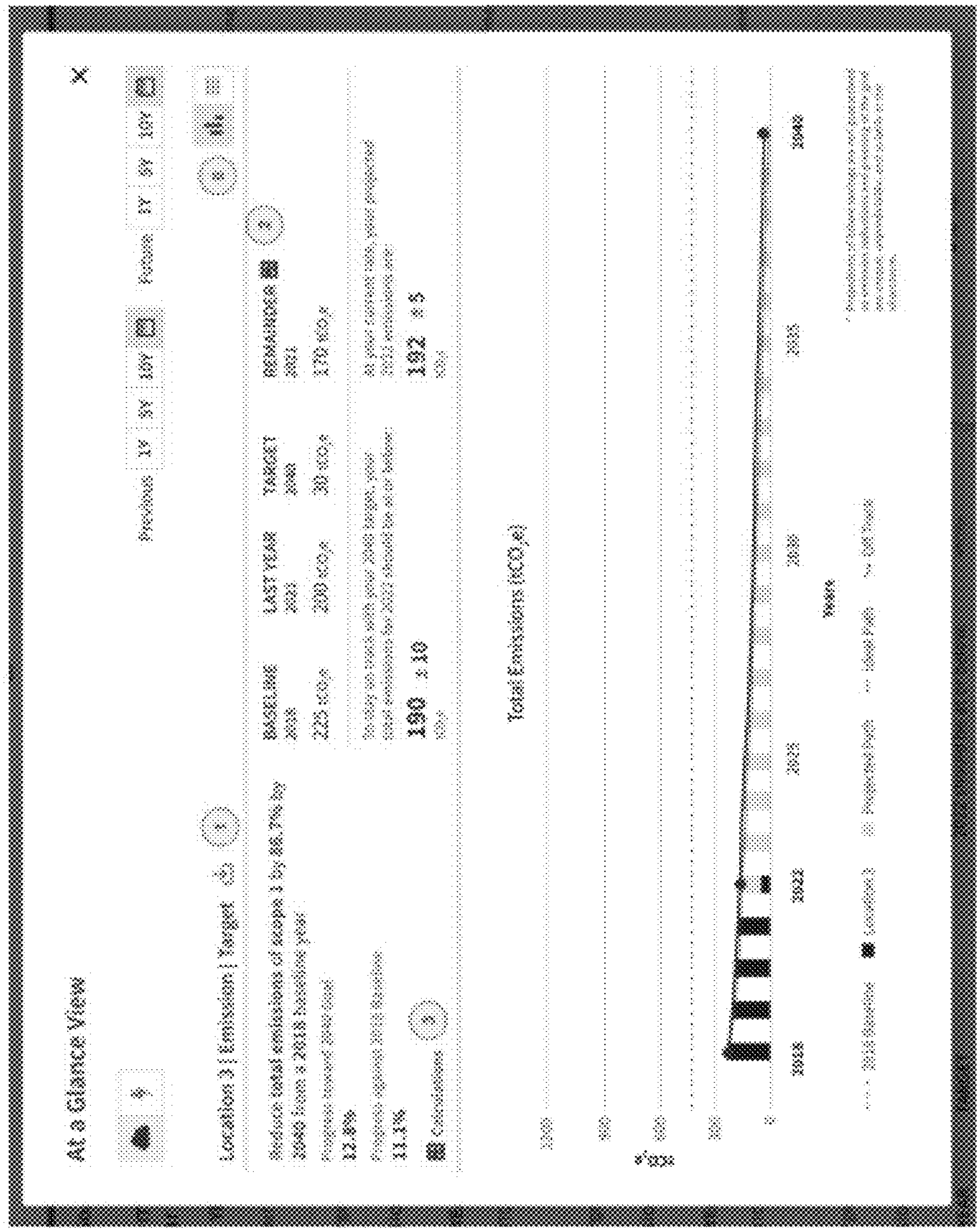
FIG. 52 is a user interface displaying a window associated with a goals and targets dashboard, according to an exemplary embodiment.

Referring to FIG. 52, a user interface is displayed. The user interface can include a window associated with a goals and targets dashboard. In some embodiments the user can be directed to the window by selecting the by location box in FIG. 49. The window can include a graphical view of the location emissions. In some embodiments, the graphical view can include information about one or more buildings associated with the location. In some embodiments, the window can include the information displayed in FIGS. 46-48. In some embodiments, the total emissions graph can present a target trajectory and a current trajectory. The target trajectory can be based on the location recommendation goal. The current trajectory can be based on the current emissions trends and if those emission trends continue a new target date can be reached.

Figure 53:
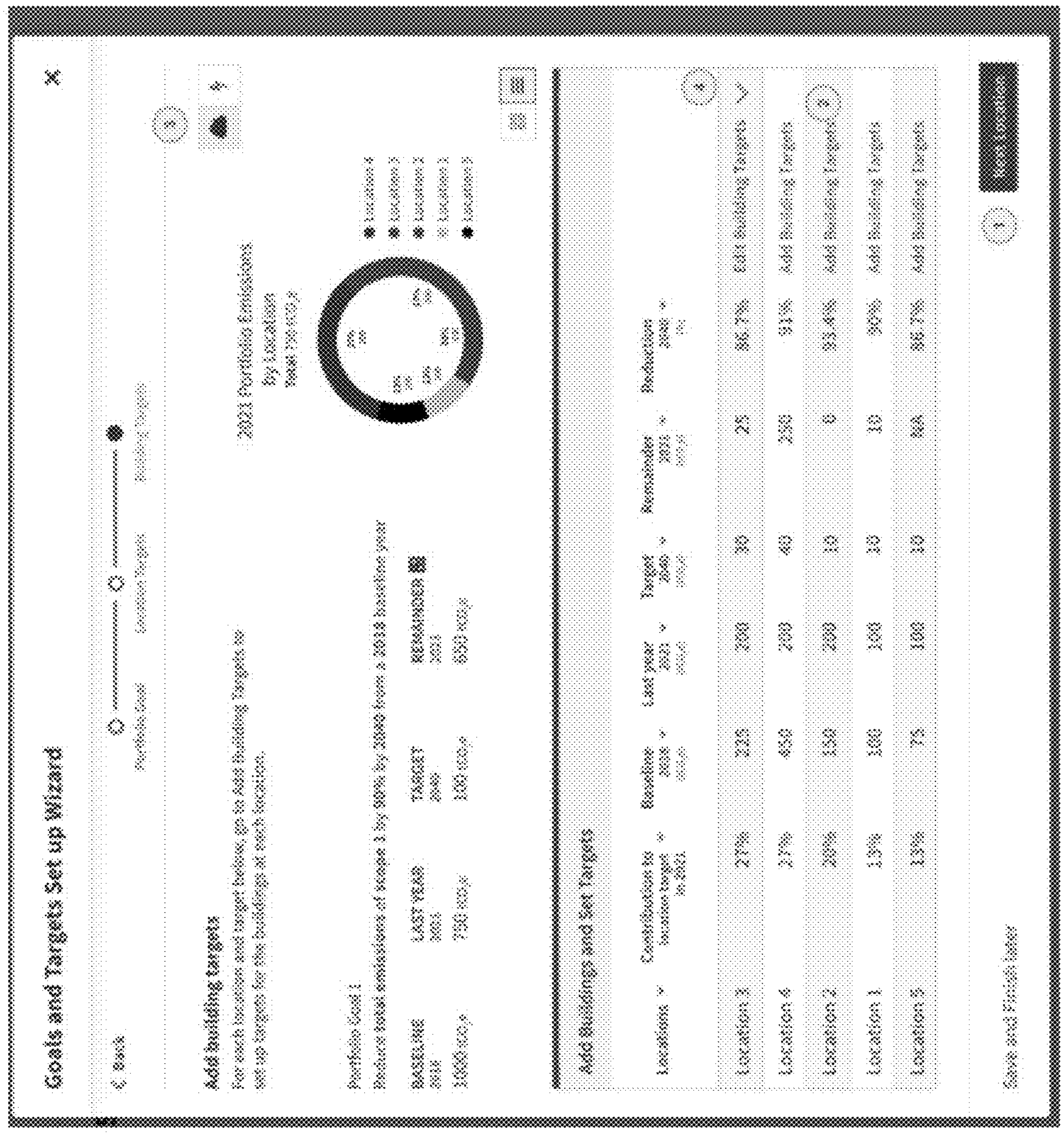
FIG. 53 is a user interface displaying a building targets window associated with a goals and targets dashboard, according to an exemplary embodiment.

Referring to FIG. 53, a user interface is displayed. The user interface can include a window associated with the goals and targets dashboard. The user can adjust a location recommendation that is associated with a business goal by selecting the edit building targets tab. The user can add a buildings target by selecting add buildings targets tab. The user can be directed to a new window with a new location by selecting the next location tab.

Figure 54:
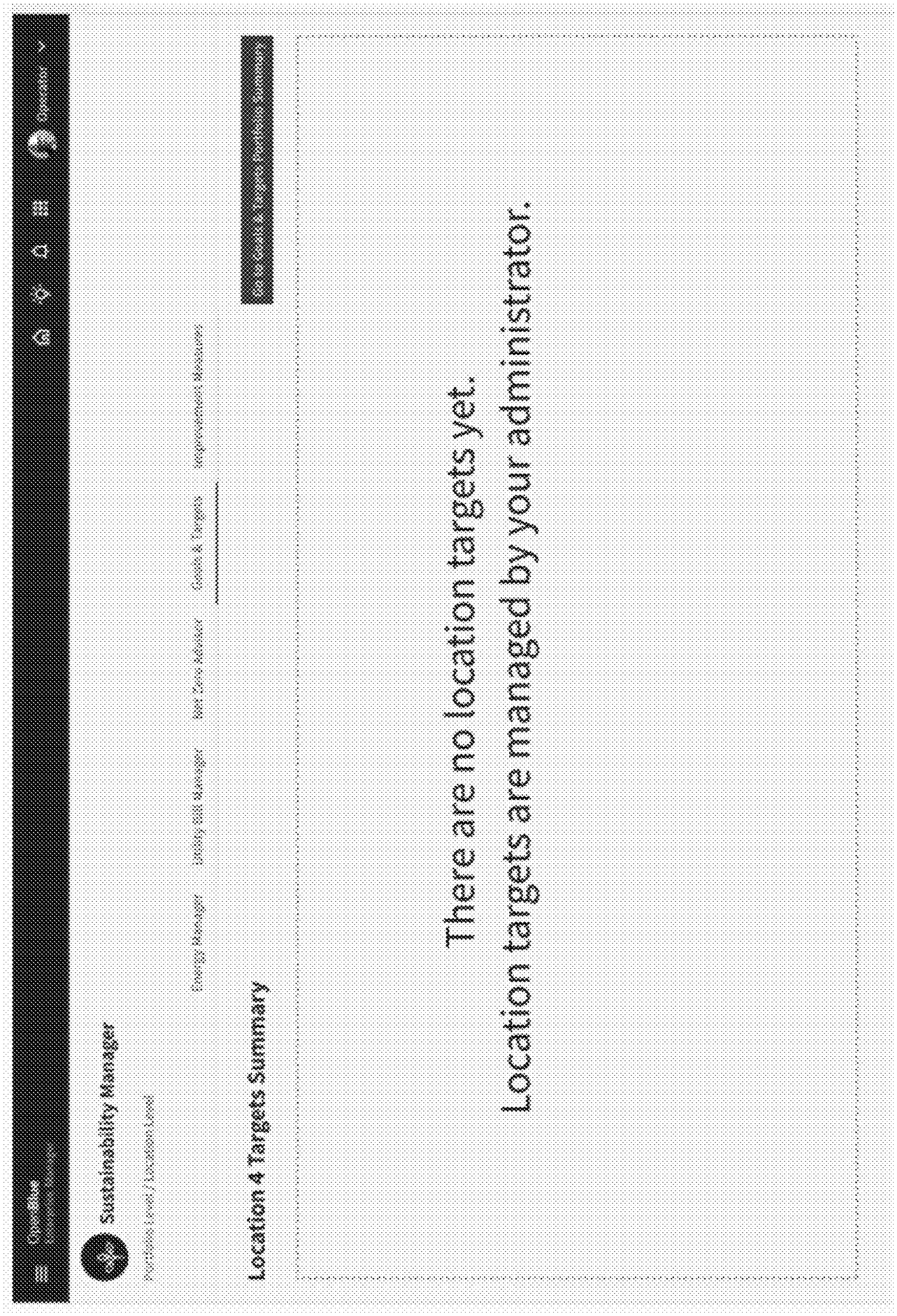
FIG. 54 is a user interface displaying a goals and targets dashboard, according to an exemplary embodiment.

Referring to FIG. 54, a user interface is displayed. The user interface includes a goals and targets dashboard. The goals and targets dashboard can notify the user that location target has not been created. The user can return to the business summary by selecting the go to tab. In some embodiments, the user may be directed to the windows in FIG. 46-48.

Figure 55:
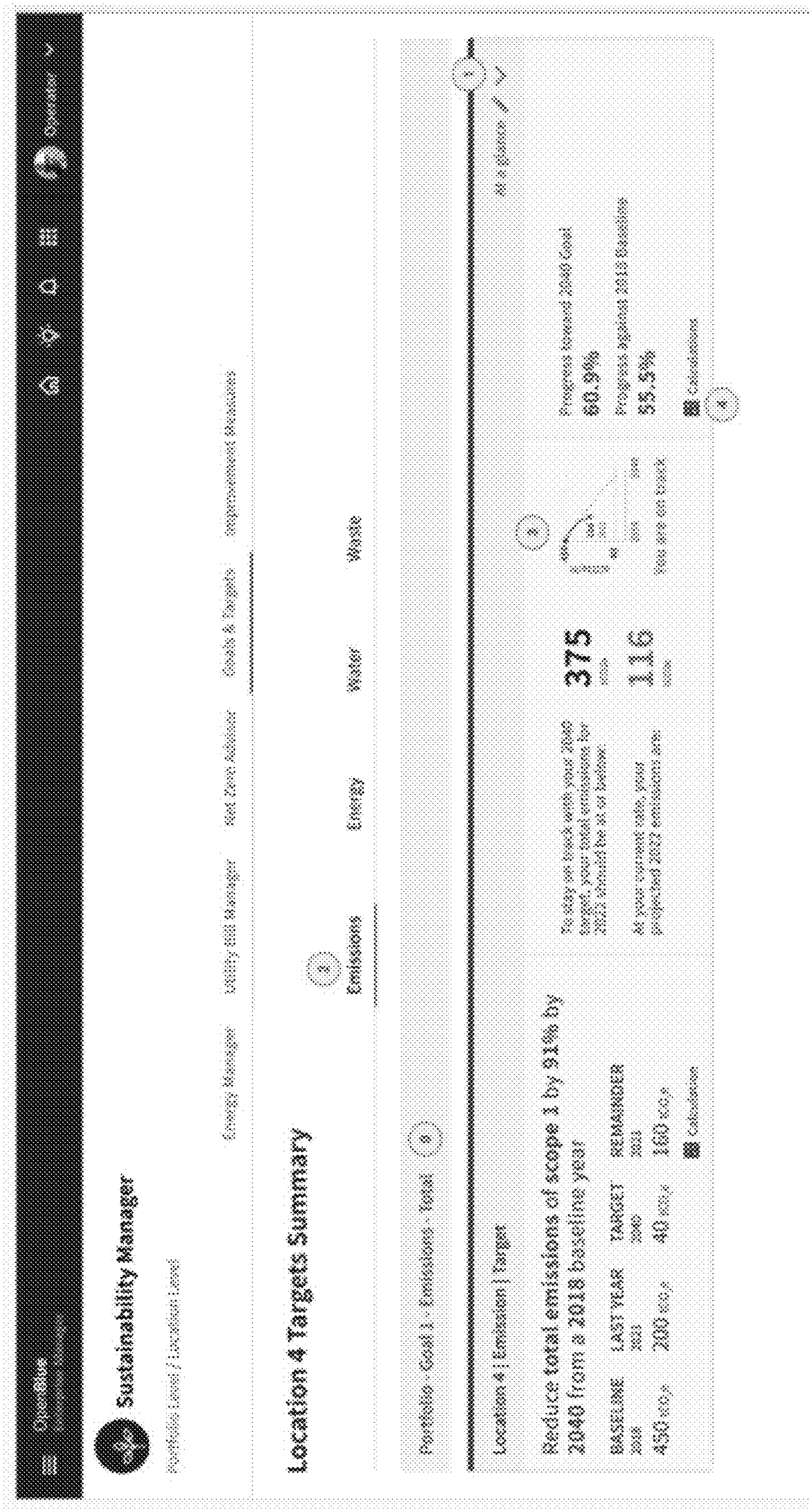
FIG. 55 is a user interface displaying a goals and targets dashboard, according to an exemplary embodiment.

Referring to FIG. 55, a user interface is displayed. The user interface can include a goals and targets dashboard. In some embodiments, the user can be directed to the goals and targets dashboard by selecting the next tab in FIG. 43-45. The dashboard can include a location target summary. The location target summary can include information about emissions, energy, water or waste. The information about emissions can include a business goal and a location target recommendation. In some embodiments, the business goal can be the business goal in FIG. 26 or 27. The location summary can include a current emissions value and a target emissions value. In some embodiments, the current emissions value is based on usage data and the target emissions value is based on the business goal. In some embodiments, the locations can include at a glance tab. The location summary can also include a progress towards goal and a progress against baseline.

Figure 56:
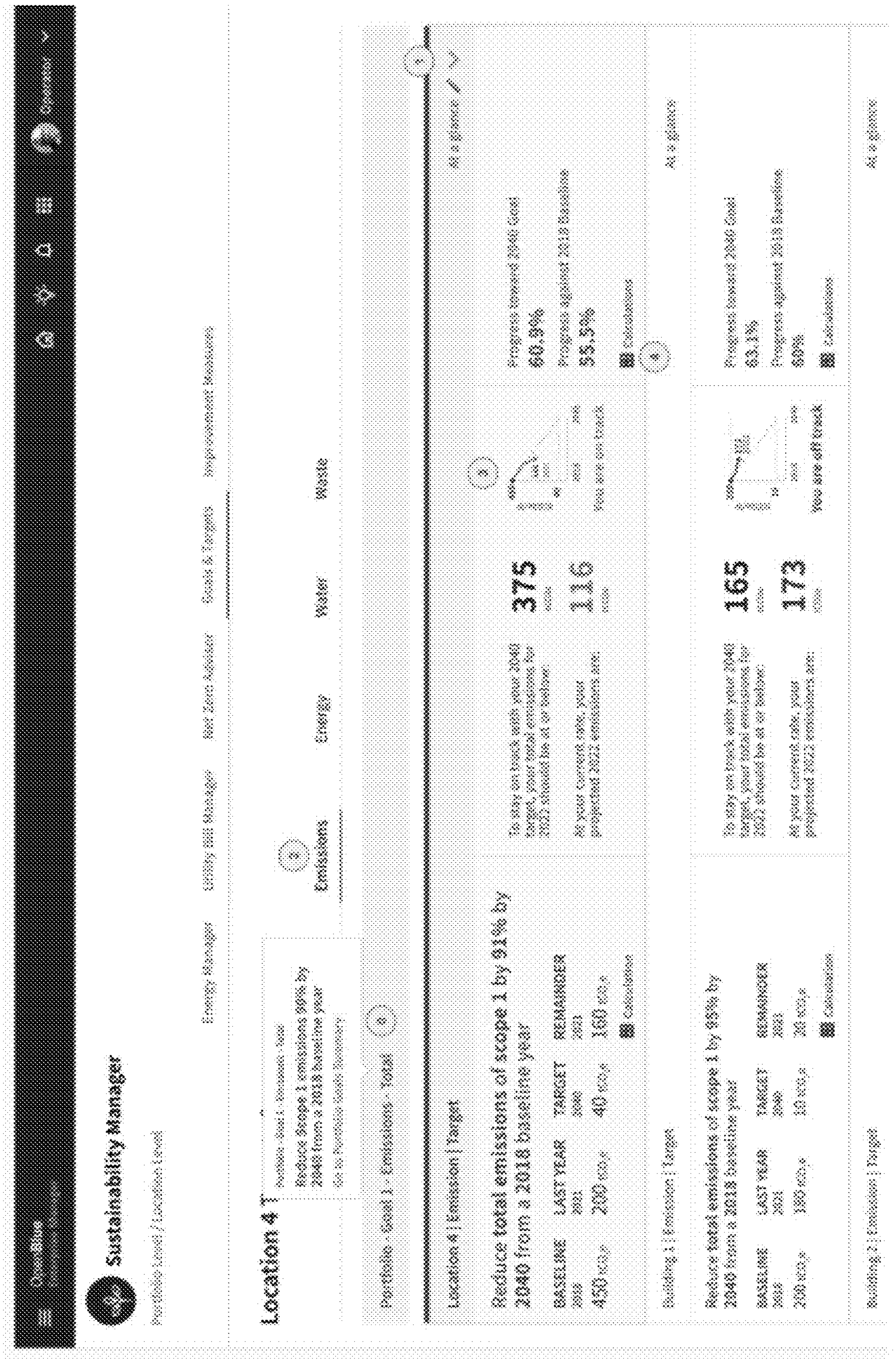
FIG. 56 is a user interface displaying a goals and targets dashboard, according to an exemplary embodiment.

Referring to FIG. 56, a user interface is displayed. The user interface can include a location summary. The location summary can include information about the location as well as one or more buildings associated with the location. The location summary can include a current emissions value and a target emissions value for a location. In some embodiments, the current emissions value is based on usage data and the target emissions value is based on the location recommendation. In some embodiments, the location summary can include a current emissions value for a building and a target emissions value for the building. In some embodiments, the FIG. 46 and FIG. 47 dashboard can be included in one user interface. In some embodiments, the locations can include at a glance tab. The location summary can also include a progress towards goal and a progress against baseline for the building and the location. The progress towards goal can be related to a percentage of the goal being reached. The progress against the baseline can be related to a percentage decrease from the baseline value. In some embodiments, the FIG. 55 location summary and the FIG. 56 location summary can be included in one user interface.

Figure 57:
FIG. 57 is a user interface displaying a goals and targets dashboard, according to an exemplary embodiment.

Referring to FIG. 57, a user interface is displayed. The user interface can include a building summary. The building summary can include information about one or more buildings associated with a location. The building summary can include a current emissions value and a target emissions value for a one or more buildings. In some embodiments, the current emissions value is based on usage data and the target emissions value is based on the building recommendation. In some embodiments, the FIG. 46 and FIG. 47 dashboard can be included in one user interface. In some embodiments, the locations can include at a glance tab. The location summary can also include a progress towards goal and a progress against baseline for the building and the location. The progress towards goal can be related to a percentage of the goal being reached. The progress against the baseline can be related to a percentage decrease from the baseline value. In some embodiments, the FIG. 55 location summary and the FIG. 56 location summary can be included in one user interface.

Figure 58:
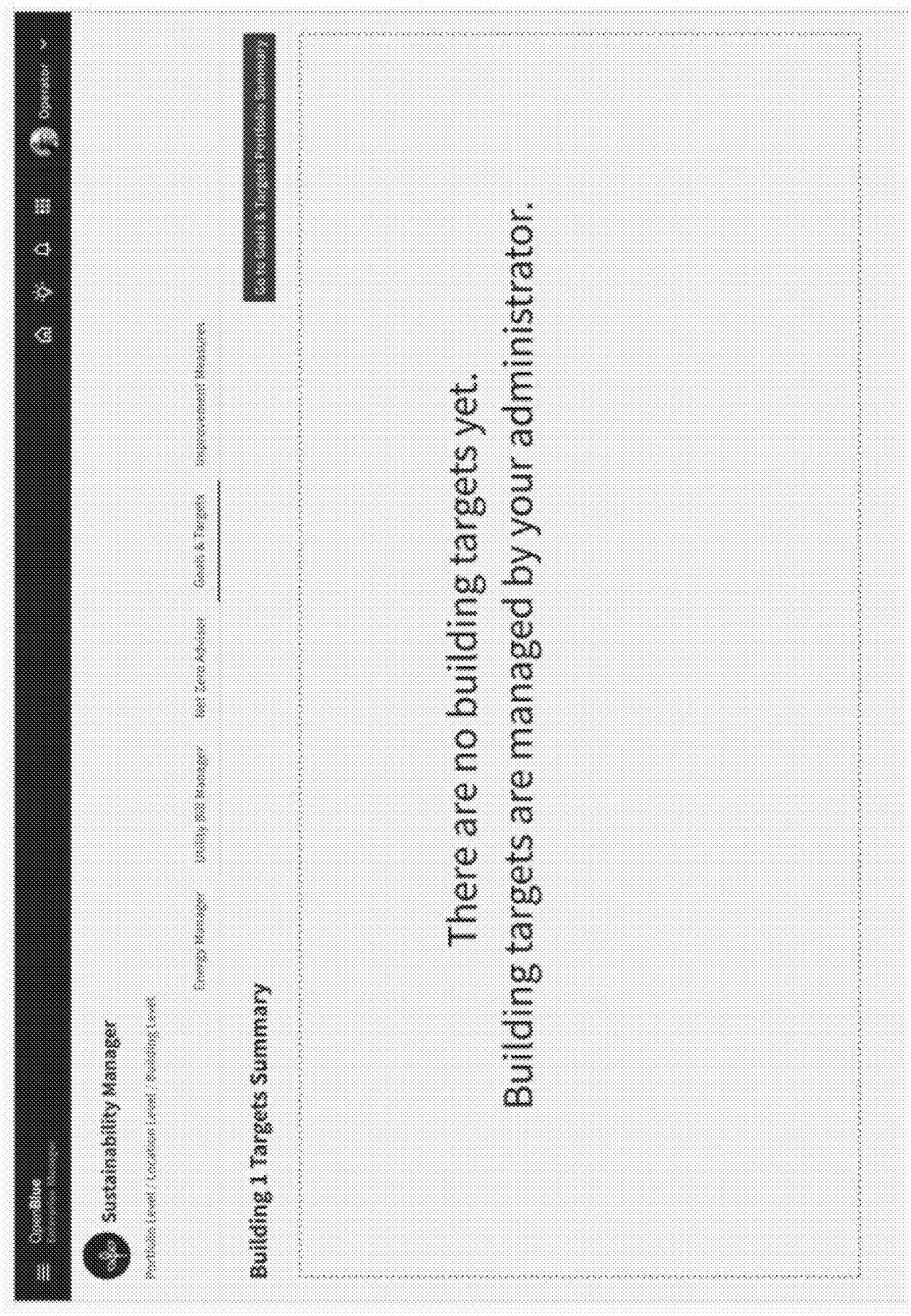
FIG. 58 is a user interface displaying a goals and targets dashboard, according to an exemplary embodiment.

Referring to FIG. 58, a user interface is displayed. The user interface includes a goals and targets dashboard. The goals and targets dashboard can notify the user that building target has not been created. The user can return to the business summary by selecting the go to tab. In some embodiments, the user may be directed to the windows in FIG. 46-48.

Figure 59:
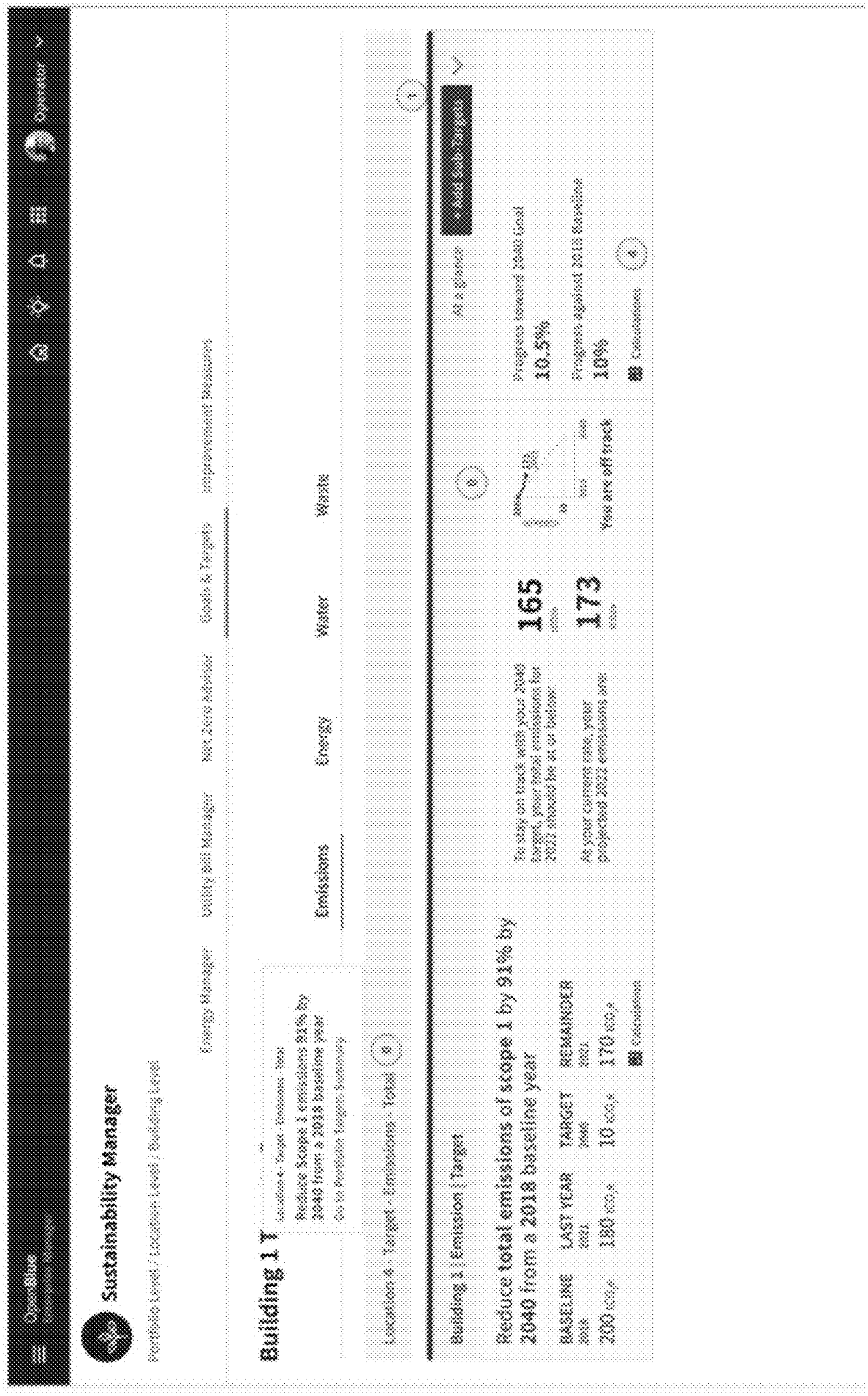
FIG. 59 is a user interface displaying a goals and targets dashboard, according to an exemplary embodiment.

Referring to FIG. 59, a user interface is displayed. The user interface includes a building target summary. The building target summary can include information about a building associated with a location. The information can include a building total emissions goal and a current buildings emissions. The building total emissions goal can be based on the building recommendation. The current building emissions can be based on usage data. In some embodiments, the user can be notified that the current emissions rate is not within the buildings emissions goal. In some embodiments, the sustainability model can update recommendations to adjust the emissions rate so that the buildings emissions rate can be adjusted in order to aid in reaching the buildings emissions goal.

Figure 60:
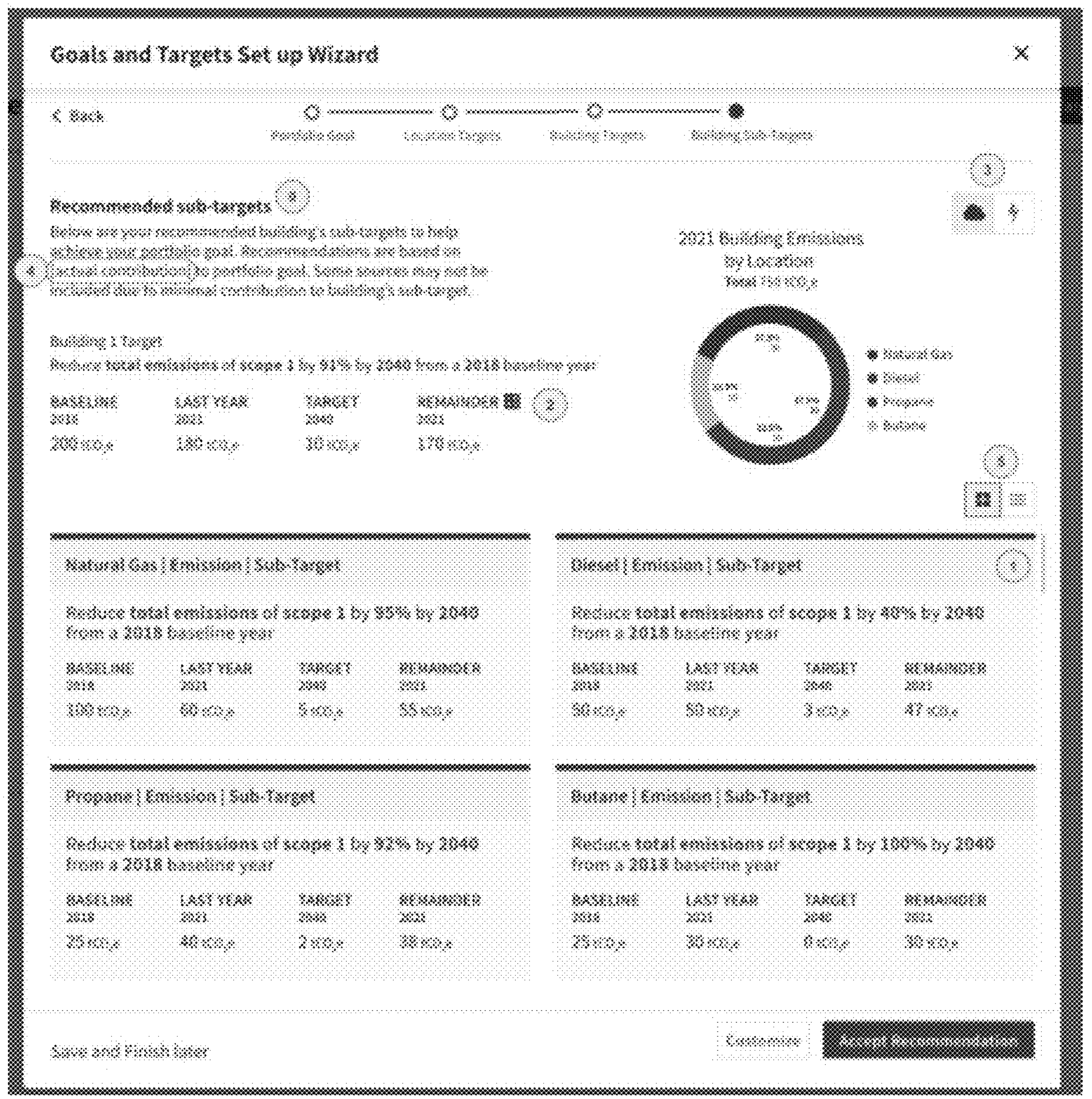
FIG. 60 is a user interface displaying a building sub-targets window associated with a goals and targets dashboard, according to an exemplary embodiment.

Referring to FIG. 60, a user interface is displayed. The user interface includes a building sub-targets window associated with a goals and targets dashboard. In some embodiments, a building can have sub-target recommendations. The sub-target recommendations can pertain to specific emission sources. For example, recommendations about natural gas, diesel, propane and butane. The user can accept the sub-target recommendations by selecting the accept recommendations tab. The user can customize the recommendations by selecting the customize tab.

Figure 61:
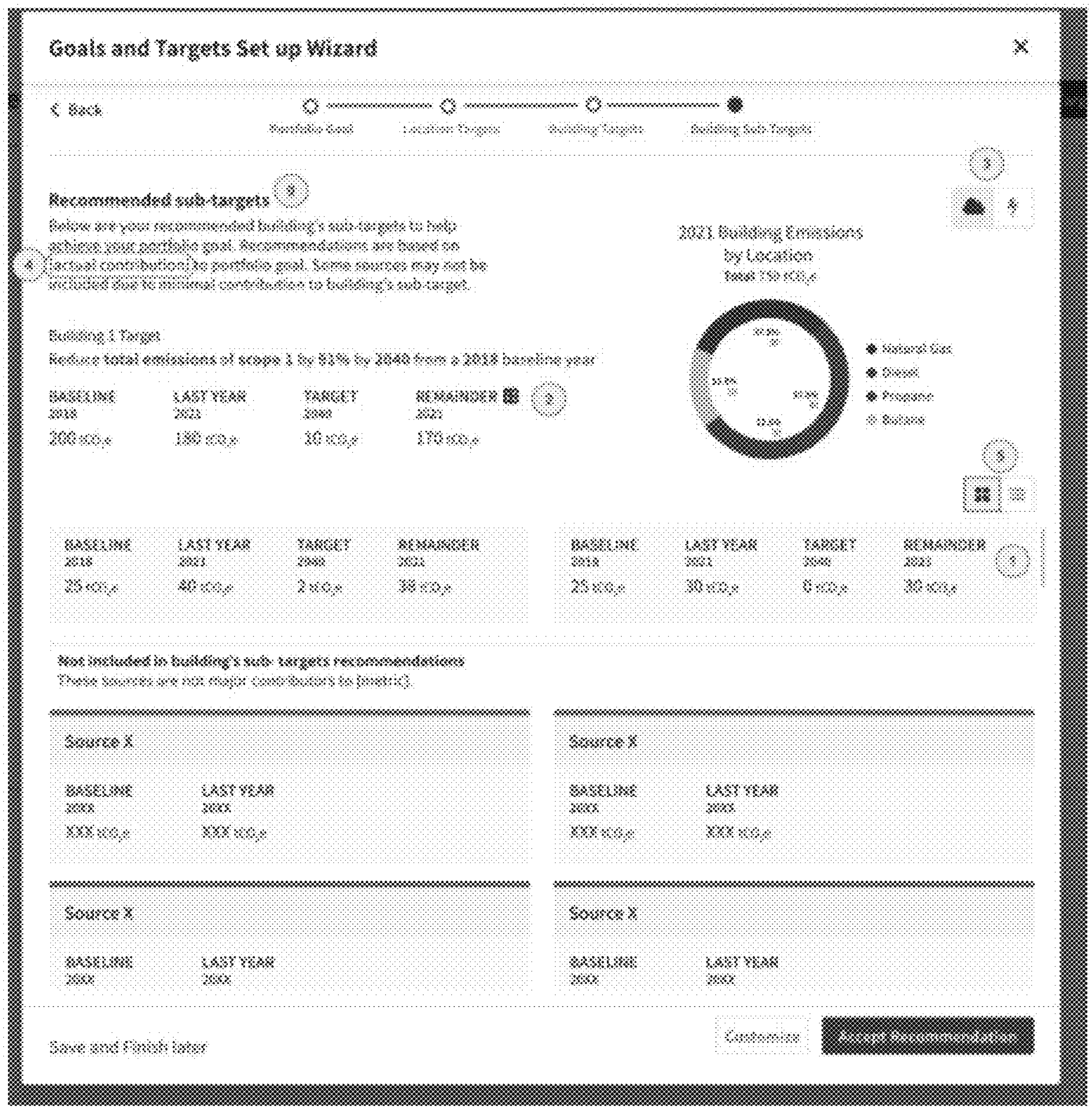
FIG. 61 is a user interface displaying a building sub-targets window associated with a goals and targets dashboard, according to an exemplary embodiment.

Referring to FIG. 61, a user interface is displayed. The user interface includes a building sub-targets window associated with a goals and targets dashboard. In some embodiments, the user can view emission sources that are not major contributors to the emissions of a building. In some embodiments the FIG. 60 window and the FIG. 61 window can be included in one user interface.

Figure 62:
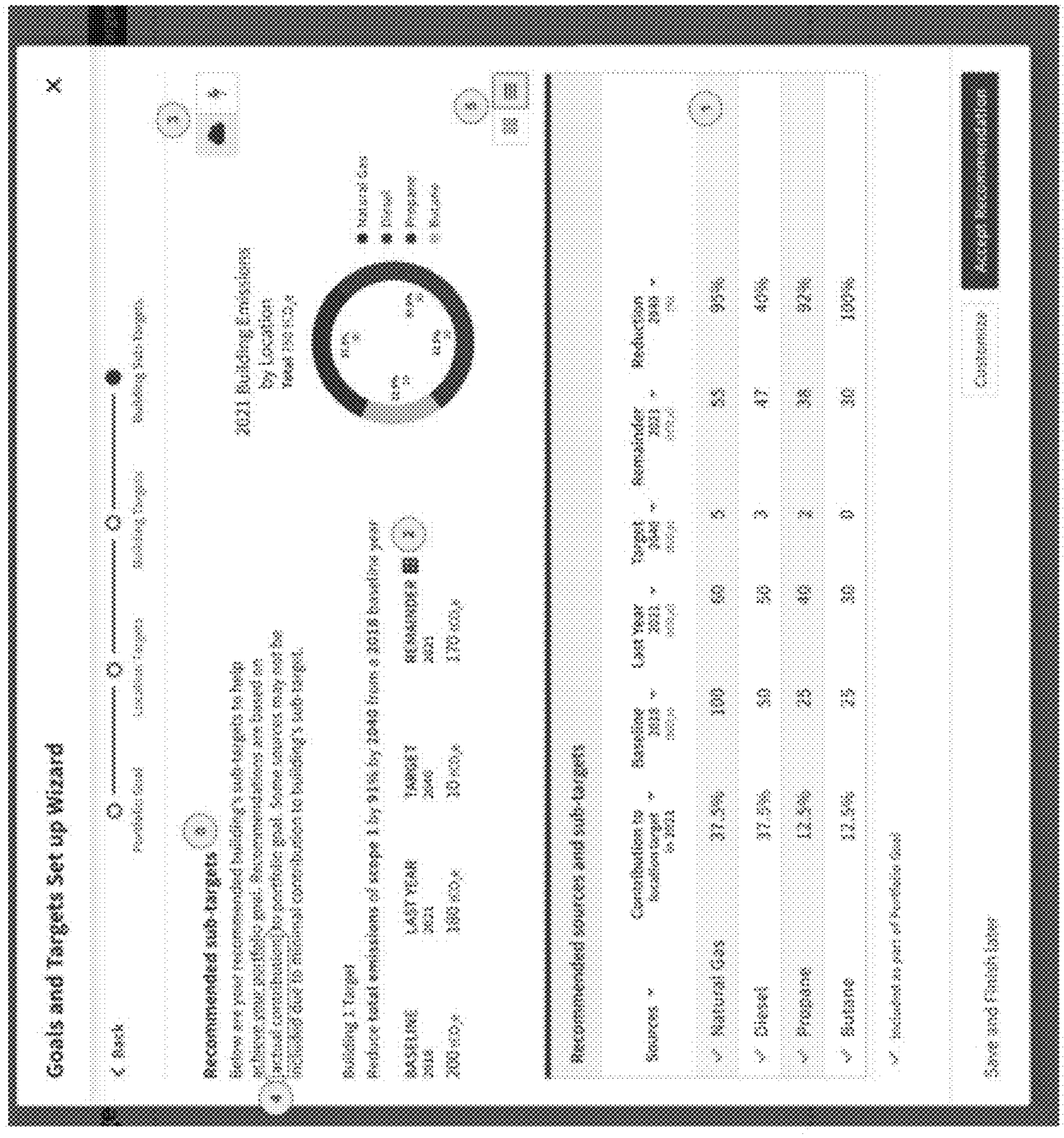
FIG. 62 is a user interface displaying a building sub-targets window associated with a goals and targets dashboard, according to an exemplary embodiment.

Referring to FIG. 62, a user interface is displayed. The user interface includes buildings sub-target window. The sub-target window includes a list view of a building emission sources and a sub-target recommendation. The user can accept the recommendations by selecting the accept recommendation tab. The user can customize the recommendations by selecting the customize tab.

Figure 63:
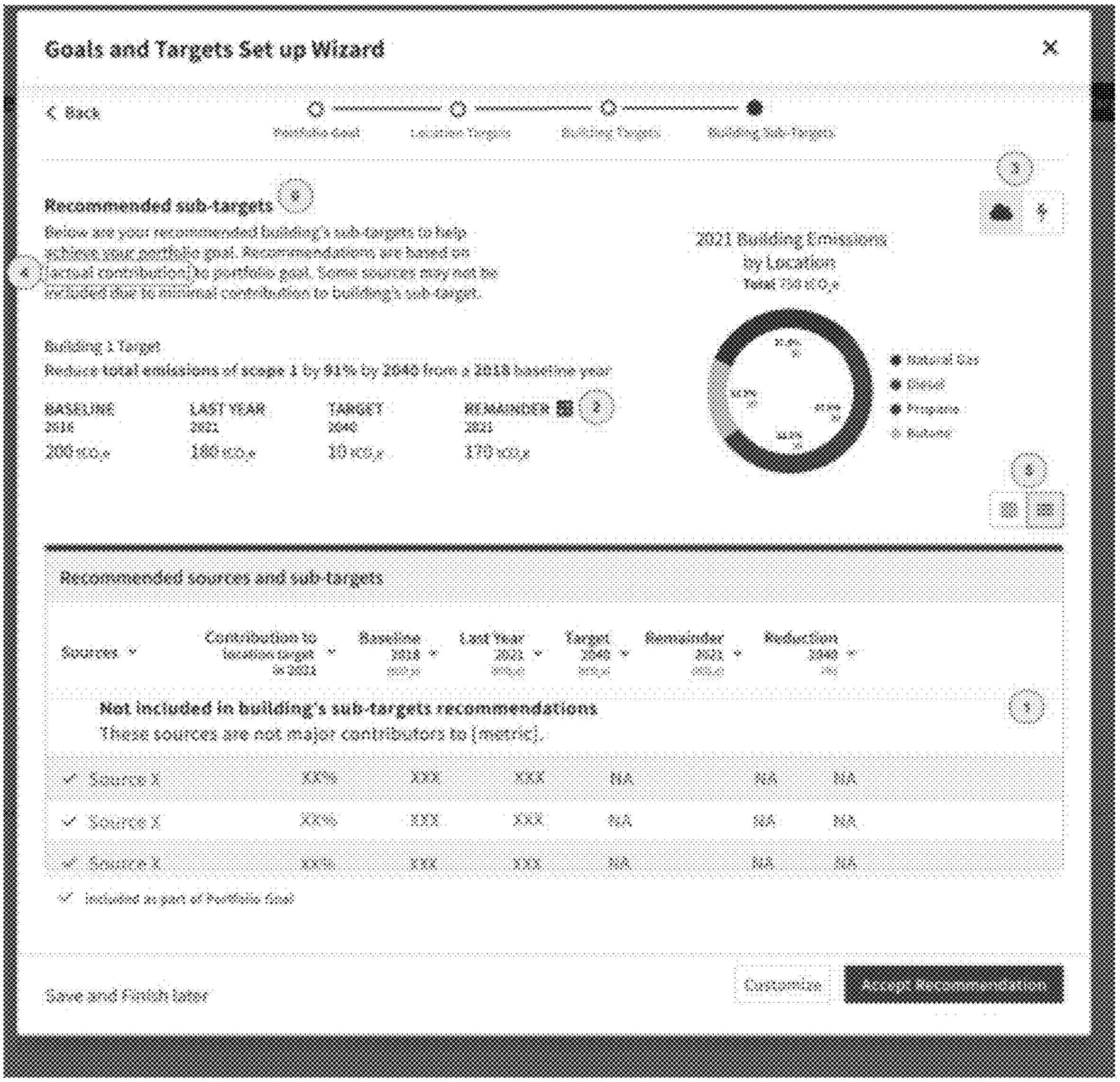
FIG. 63 is a user interface displaying a building sub-targets window associated with a goals and targets dashboard, according to an exemplary embodiment.

Referring to FIG. 63, a user interface is displayed. The user interface includes buildings sub-target window. The sub-target window includes a list view of emission sources that are not major contributors to the emissions of a building. In some embodiments, the FIG. 62 window and the FIG. 63 window are included in one user interface.

Figure 64:
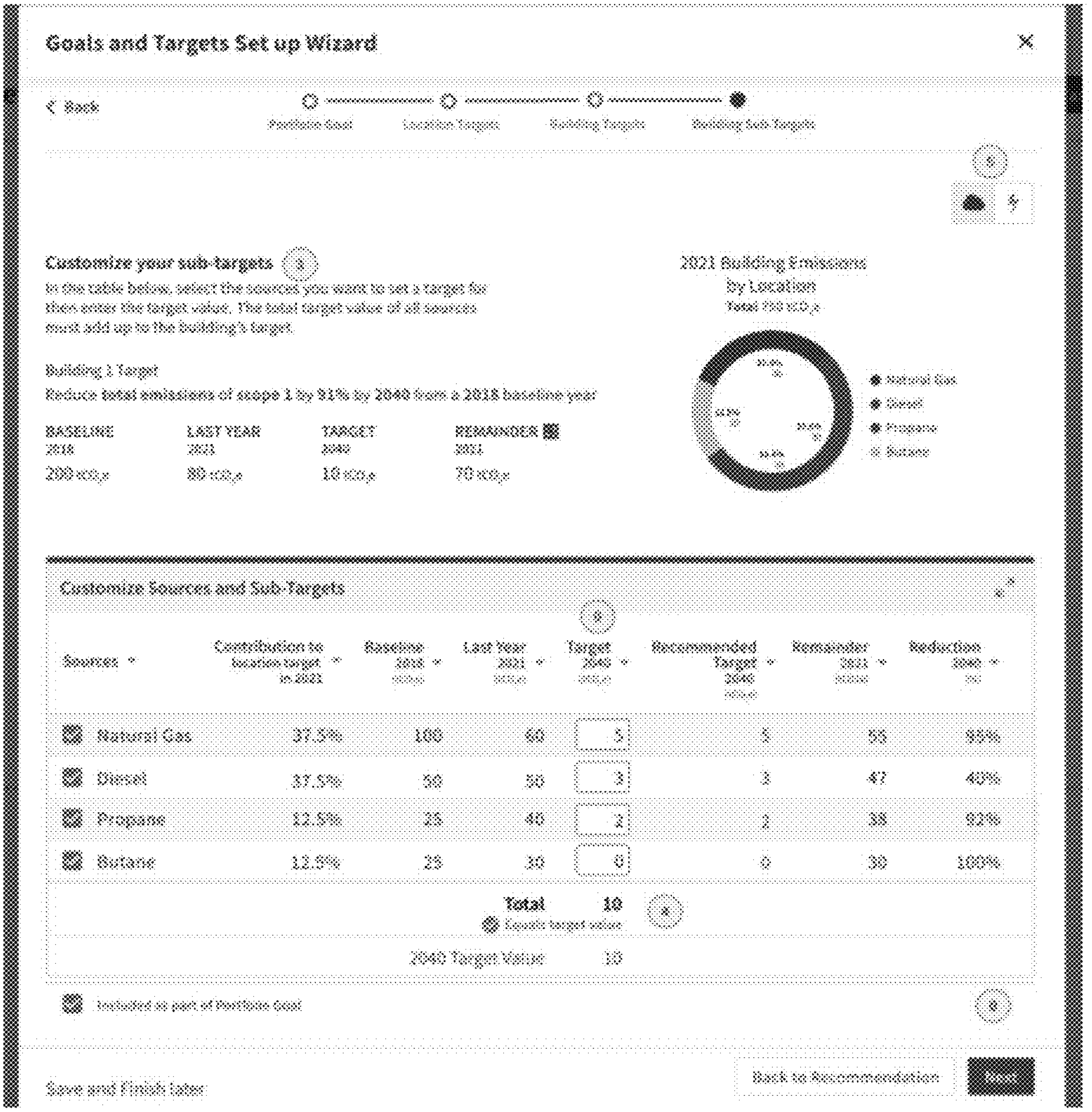
FIG. 64 is a user interface displaying a building sub-targets window associated with a goals and targets dashboard, according to an exemplary embodiment.

Referring to FIG. 64, a user interface is displayed. The user interface includes a buildings sub-target window. The window includes a list view of the emission sources of a building. The user can adjust the target value for one or more of the emission sources that are included in the sub-target recommendation. The updated target value can adjust the building recommendation, the location recommendation or the business goal. The user can move to a new building by selecting the next tab.

Figure 65:
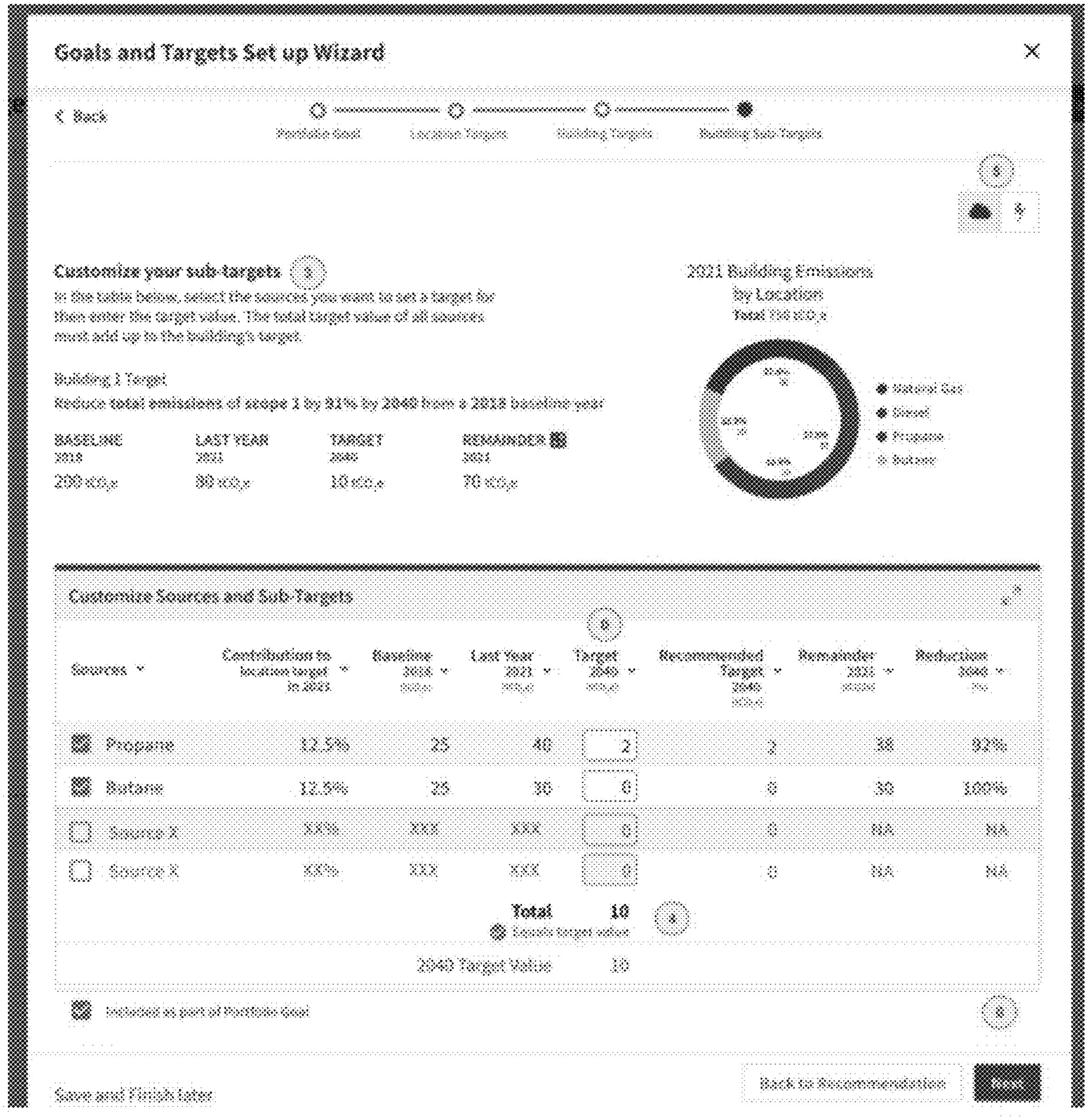
FIG. 65 is a user interface displaying a building sub-targets window associated with a goals and targets dashboard, according to an exemplary embodiment.

Referring to FIG. 65, a user interface is displayed. The user interface includes a buildings sub-target window. The window includes a list view of the emission sources of a building. The user can adjust the target value for one or more of the emission sources that are included in the sub-target recommendation. The user can also view the emission sources that are not included in the sub-target recommendation. The update target value can adjust the building recommendation, the location recommendation or the business goal. The user can move to a new building by selecting the next tab. In some embodiments, the FIG. 64 window and the FIG. 65 window can be included in one user interface.

Figure 66:
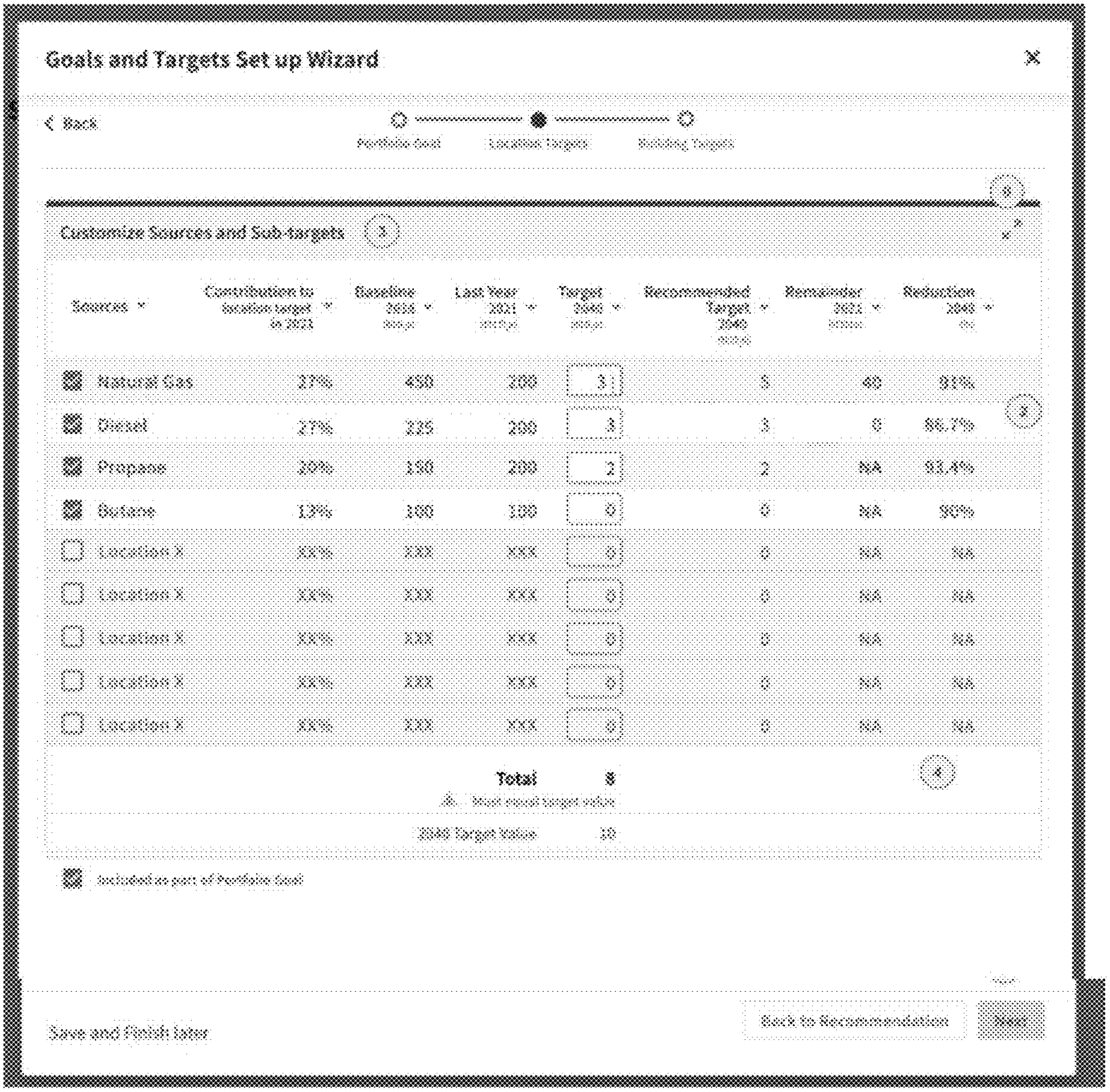
FIG. 66 is a user interface displaying a building sub-targets window associated with a goals and targets dashboard, according to an exemplary embodiment.

Referring to FIG. 66, a user interface is displayed. The user interface includes a building sub-target window. The window includes a list view of the emission sources of a building. The user can adjust the target value for one or more of the emission sources that are included in the sub-target recommendation. The user can also view the emission sources that are not included in the sub-target recommendation. The updated target value can adjust the building recommendation, the location recommendation or the business goal. The user can move to a new building by selecting the next tab.

Figure 67:
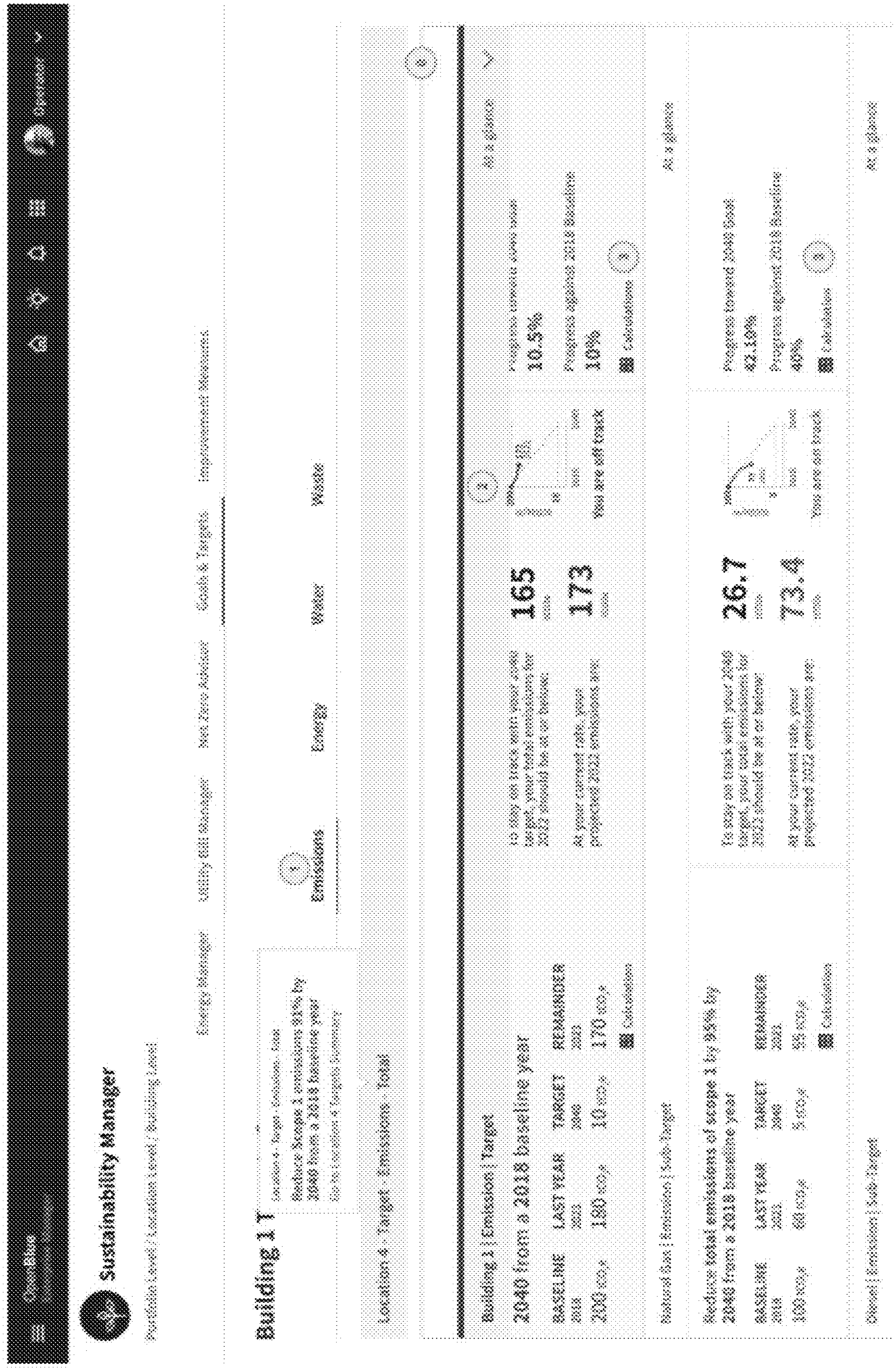
FIG. 67 is a user interface displaying a goals and targets dashboard, according to an exemplary embodiment.

Referring to FIG. 67, a user interface is displayed. The user interface includes a goals and targets dashboard. In some embodiments, the user can be directed to the goals and targets dashboard by selecting the next tab in FIG. 43-45. The dashboard can include a building goals summary. The building goals summary can include information about the buildings emissions target value as well as the buildings current emissions rate. The dashboard can include if the current emissions rate is in line with the buildings emissions target value. The building goals summary can include information about the buildings progress towards reaching the target goal as well as information about the buildings progress in relation to the buildings baseline values. The building goals summary can include information about the emission sources of the building. The information about the emission sources of the building can include the emission source, the sub-target goal associated with the emission source, the baseline information, a previous year information and the remainder of the sub-target goal. In some embodiments, the information pertaining to the emission source can also include the current emission rate and the target emission rate. The information can also include whether the current emission rate is in line with the target rate. The building goals summary can include information about the emission sources progress towards reaching the target goal as well as information about the emission source progress in relation to the emission source baseline values. The user interface can also include an at a glance tab for each of the emission sources.

Figure 68:
FIG. 68 is a user interface displaying a goals and targets dashboard, according to an exemplary embodiment.

Referring to FIG. 68, a user interface is displayed. The user interface can include information about emission sources. The information can include a current emissions source value and a target emissions source value. In some embodiments, the FIG. 67 and FIG. 68 dashboard can be included in one user interface. In some embodiments, the locations can include at a glance tab. The information about the emissions sources can also include a progress towards goal and a progress against baseline for each of the emission sources. The user interface can also include an at a glance tab for each of the emission sources.

Figure 69:
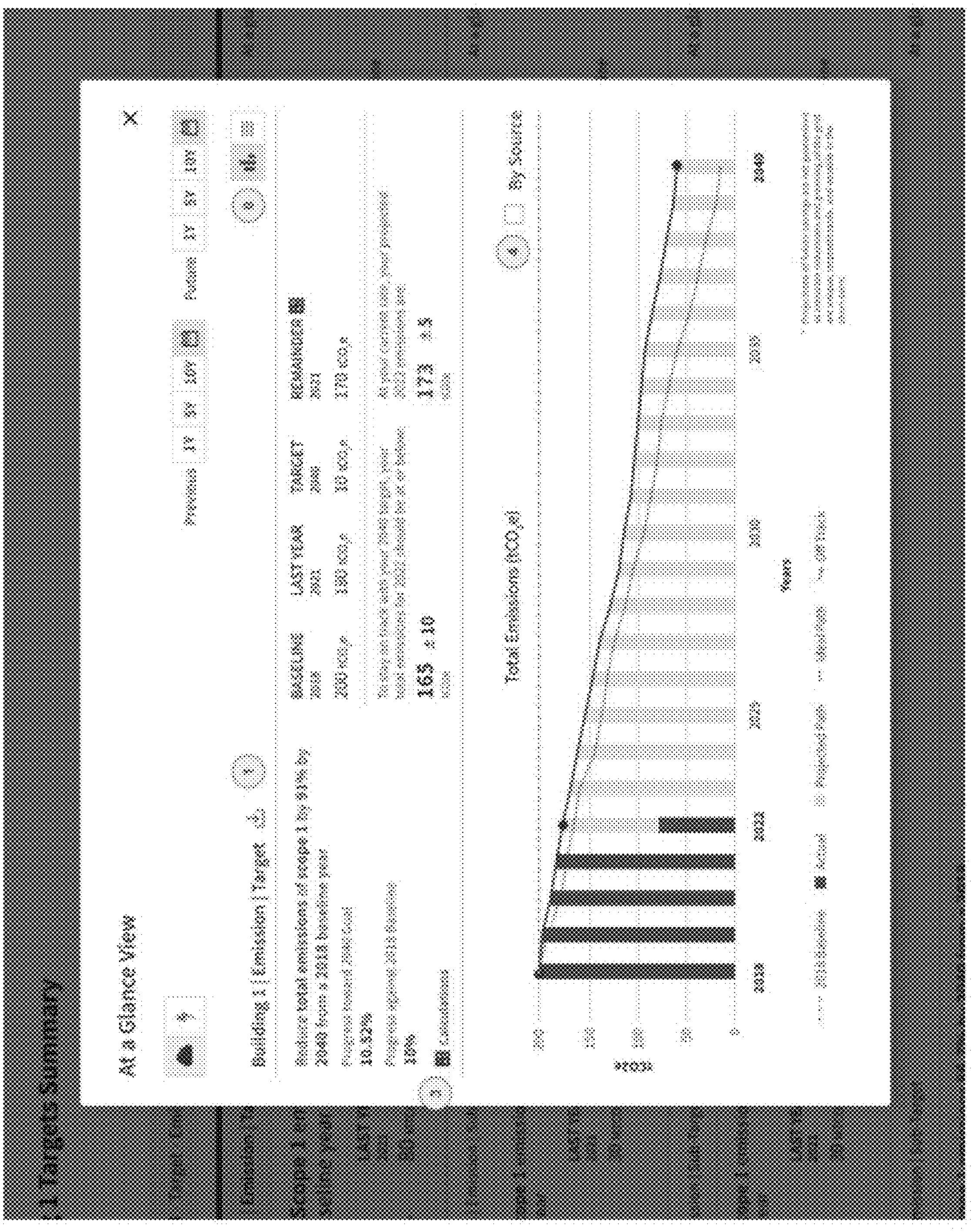
FIG. 69 is a user interface displaying a window associated with a goals and targets dashboard, according to an exemplary embodiment.

Referring to FIG. 69, a user interface is displayed. The user interface can include a window associated with a goals and targets dashboard. In some embodiments the user can be directed to the window by selecting one of the at a glance tabs in FIG. 67 or 68. The window can include a graphical view of a buildings emissions. In some embodiments, the user can view an emission source view by selecting the by source box. In some embodiments, the window can include the information displayed in FIGS. 67-68. In some embodiments, the total emissions graph can present a target trajectory and a current trajectory. The target trajectory can be based on the business goal. The current trajectory can be based on the current emissions trends and if those emission trends continue a new target date can be reached.

Figure 70:
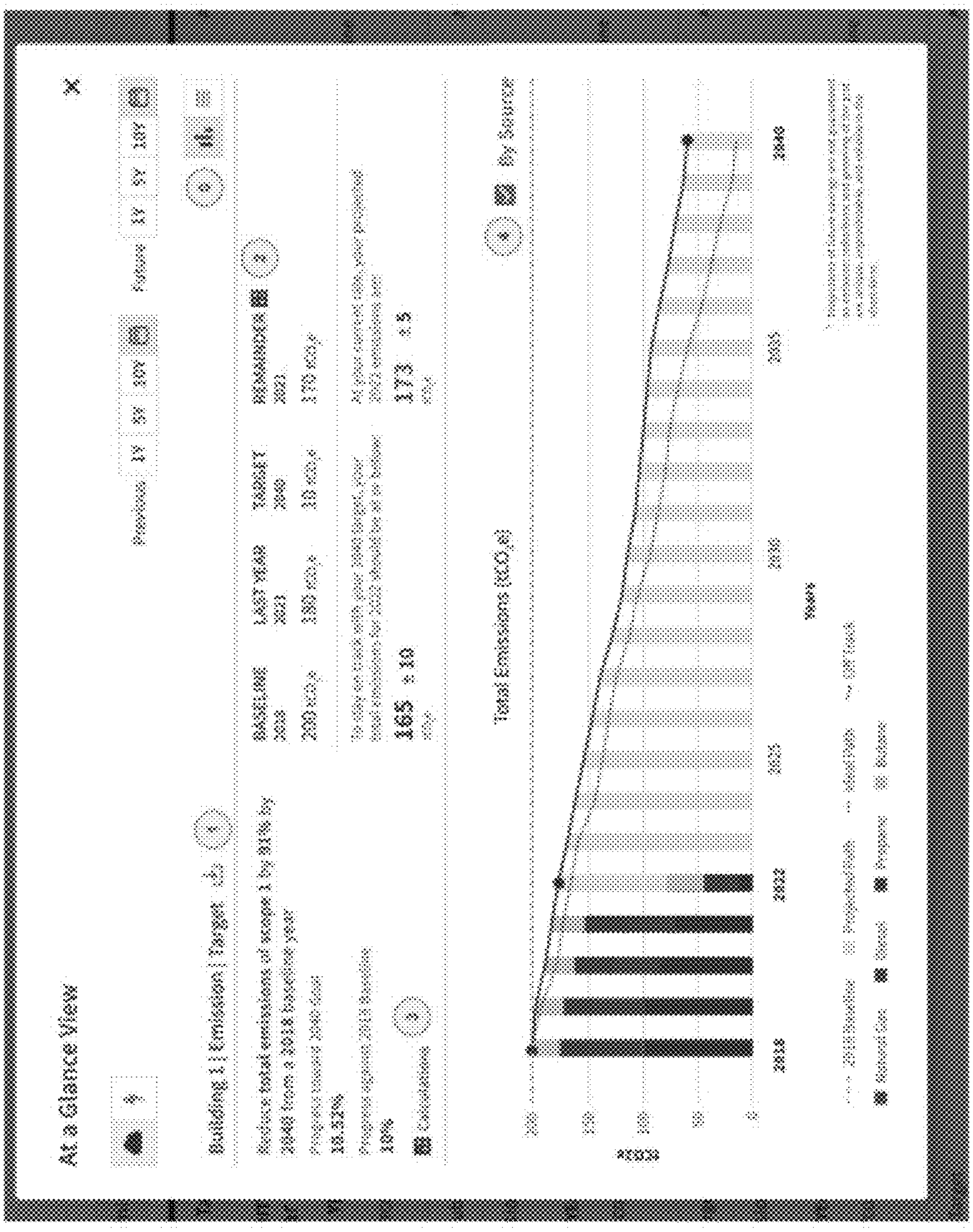
FIG. 70 is a user interface displaying a window associated with a goals and targets dashboard, according to an exemplary embodiment.

Referring to FIG. 70, a user interface is displayed. The user interface can include a window associated with a goals and targets dashboard. In some embodiments the user can be directed to the window by selecting the by source box in FIG. 69.8. The window can include a graphical view of building emissions from the emission sources. In some embodiments, the window can include the information displayed in FIGS. 67-68. In some embodiments, the total emissions graph can present a target trajectory and a current trajectory. The target trajectory can be based on the business goal. The current trajectory can be based on the current emissions trends and if those emission trends continue a new target date can be reached.

Figure 71:
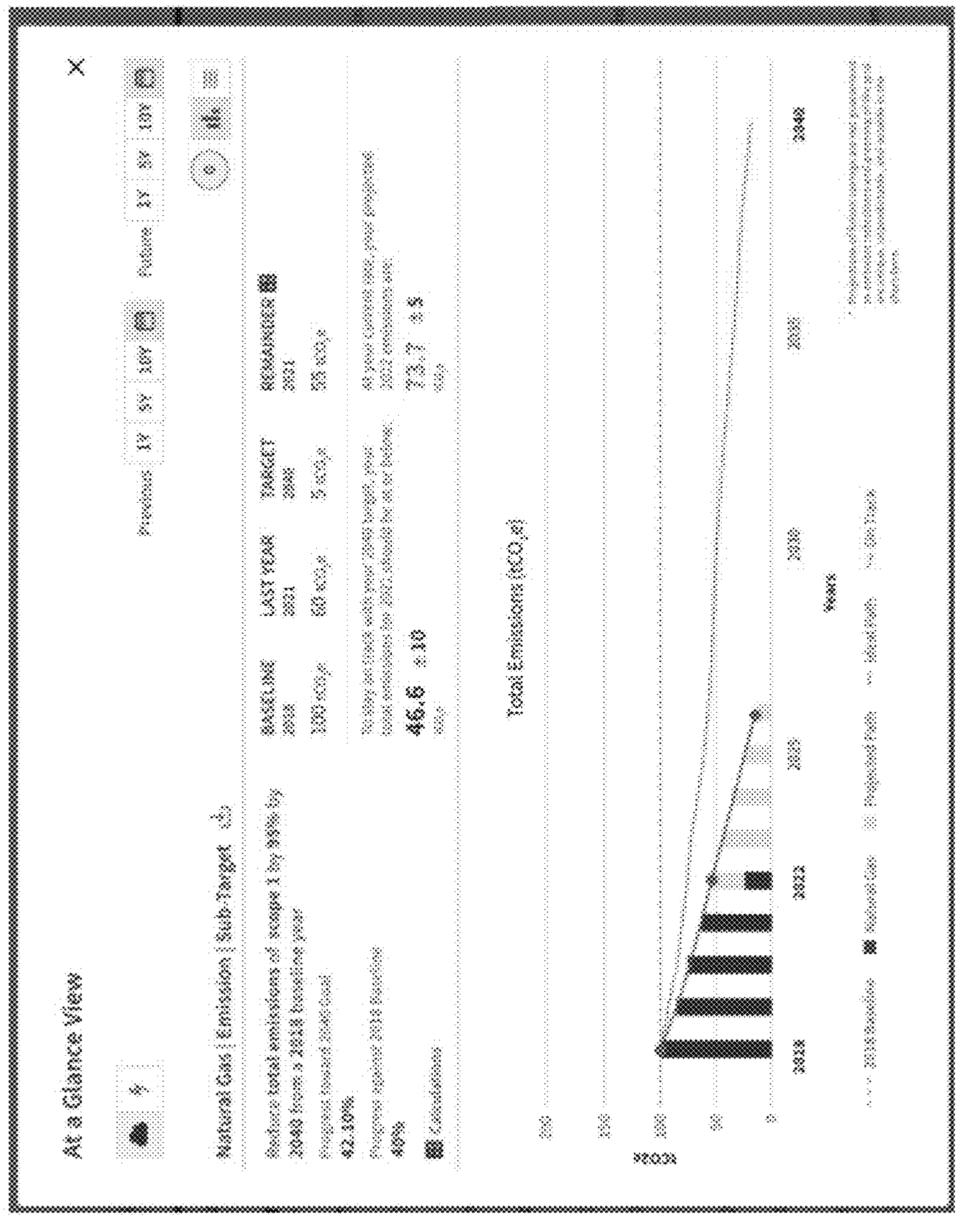
FIG. 71 is a user interface displaying a window associated with a goals and targets dashboard, according to an exemplary embodiment.

Referring to FIG. 71, a user interface is displayed. The user interface can include a window associated with a goals and targets dashboard. In some embodiments the user can be directed to the window by selecting the by source box in FIG. 69.8. The window can include a graphical view of emissions from an emission source. In some embodiments, the window can include the information displayed in FIGS. 67-68. In some embodiments, the total emissions graph can present a target trajectory and a current trajectory. The target trajectory can be based on the business goal. The current trajectory can be based on the current emissions trends and if those emission trends continue a new target date can be reached. The graphical view can allow the user to view the emission differences for an emission source between one or more years.

Figure 72:
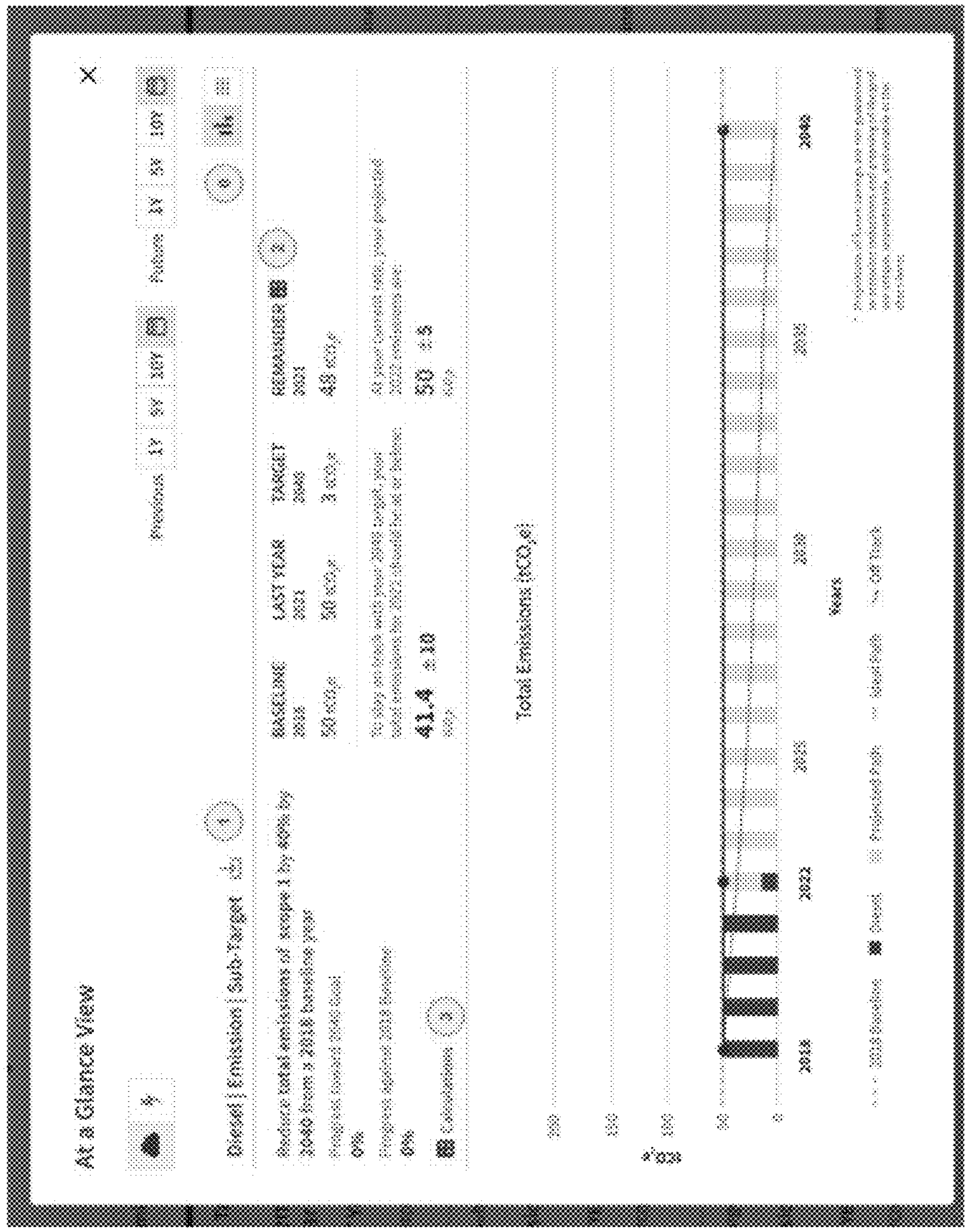
FIG. 72 is a user interface displaying a window associated with a goals and targets dashboard, according to an exemplary embodiment.

Referring to FIG. 72, a user interface is displayed. The user interface can include a window associated with a goals and targets dashboard. In some embodiments the user can be directed to the window by selecting the by source box in FIG. 69. The window can include a graphical view of emissions from an emission source. In some embodiments, the window can include the information displayed in FIGS. 67-68. In some embodiments, the total emissions graph can present a target trajectory and a current trajectory. The target trajectory can be based on the business goal. The current trajectory can be based on the current emissions trends and if those emission trends continue a new target date can be reached. The graphical view can allow the user to view the emission differences for an emission source between one or more years.

Figure 73:
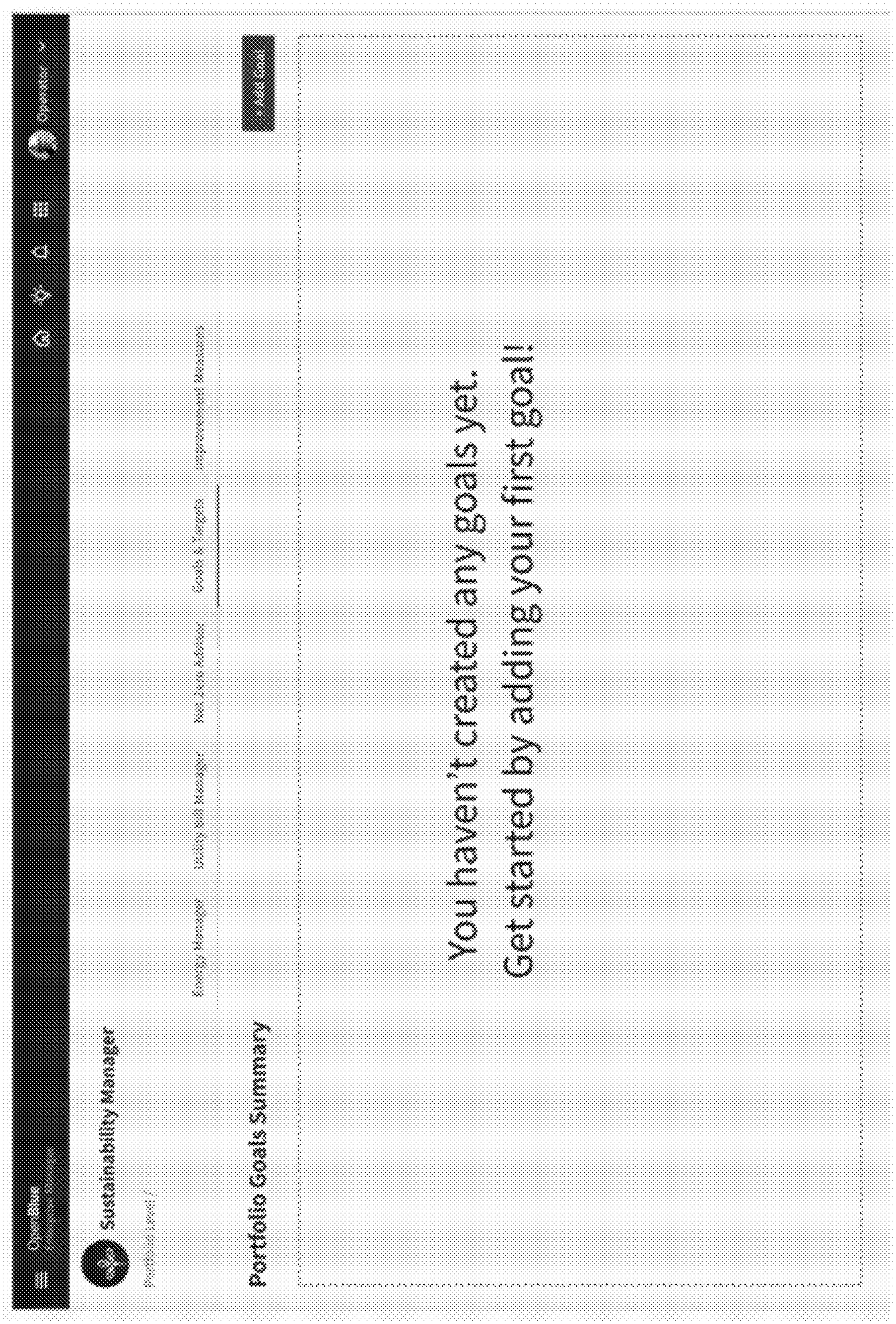
FIG. 73 is a user interface displaying a goals and targets dashboard, according to an exemplary embodiment.

Referring to FIG. 73, a user interface is displayed. The user interface includes a goals and targets dashboard. The goals and targets dashboard can notify the user that a business goal has not been created. The user can return enter a business goal by selecting the add goal tab. In some embodiments, the user may be directed to the windows in FIG. 26 or 27.

In some embodiments, the user can determine that the current trends associated with one or more of the emissions sources need adjusting. The user can provide an indication to the sustainability manager that the trends associated with the emission sources can be adjusted. In some embodiments, the sustainability manager can provide one or more recommendations that can be taken to adjust the trends associated with the emission sources.

Figure 74:
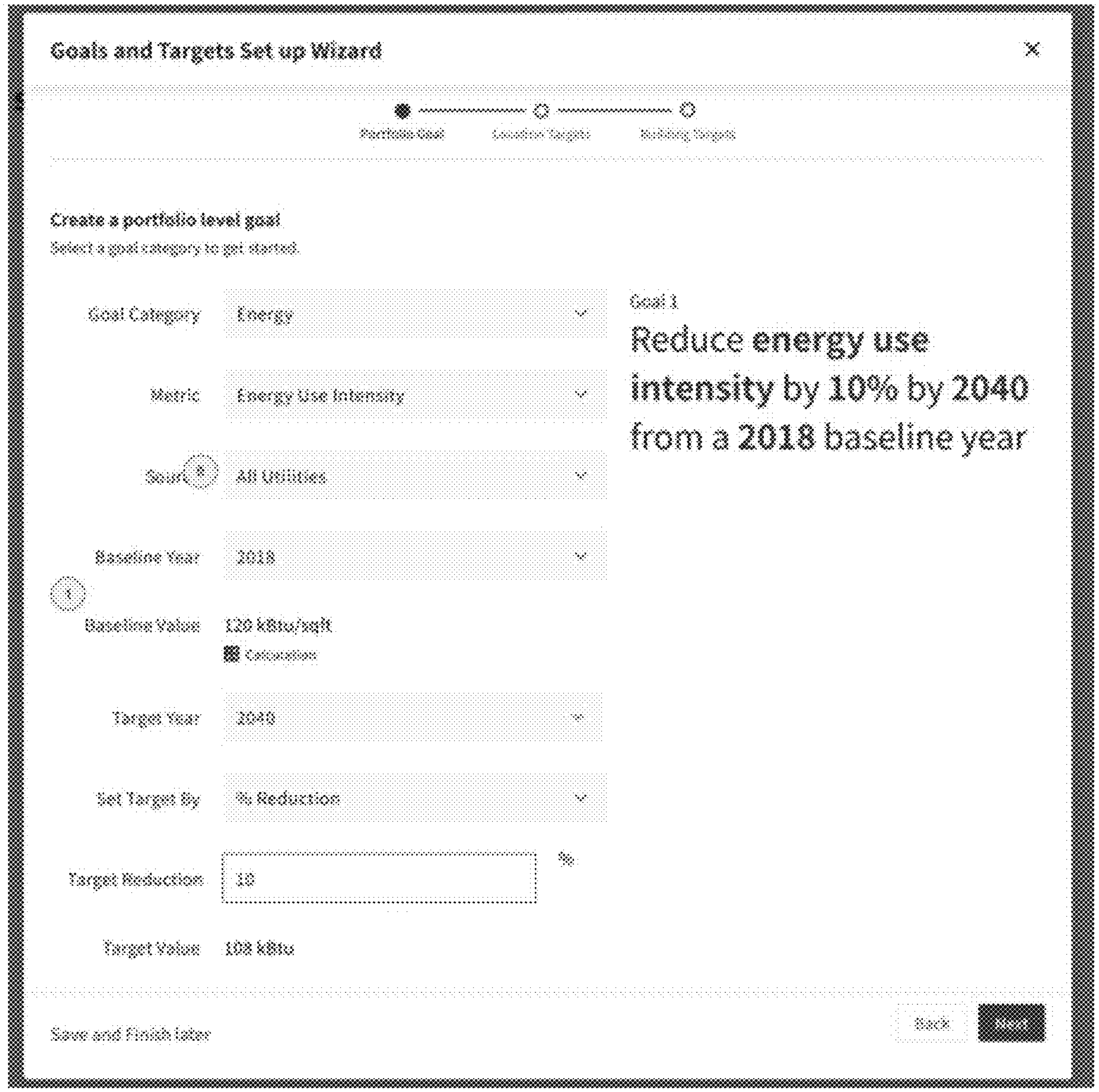
FIG. 74 is user interface displaying a business goal window associated with a goals and targets dashboard, according to an exemplary embodiment.

Referring to FIG. 74, a user interface is displayed. The user interface includes a window that allows a user to establish a business level goal. In some embodiments, the user can reach the FIG. 74 window by selecting the add goal tab in the FIG. 73 window. In some embodiments, the user can select one or more options. The user can select a goal category, a metric, a source, a baseline year, a baseline value, a target year, a set target, a target value and a target reduction. For example, the user can select energy as the goal category, energy use intensity (EUI) as the metric, all utilities as the source, the year 2018 as the baseline year, the year 2040 as the target year, a set target % reduction and a target reduction of 10%. Based on the selection of 2018 as the baseline year the corresponding total emissions value will be displayed. Based on the target value of 10% the target value 108 can be displayed. Upon entering the information a goal 1 can be established.

Figure 75:
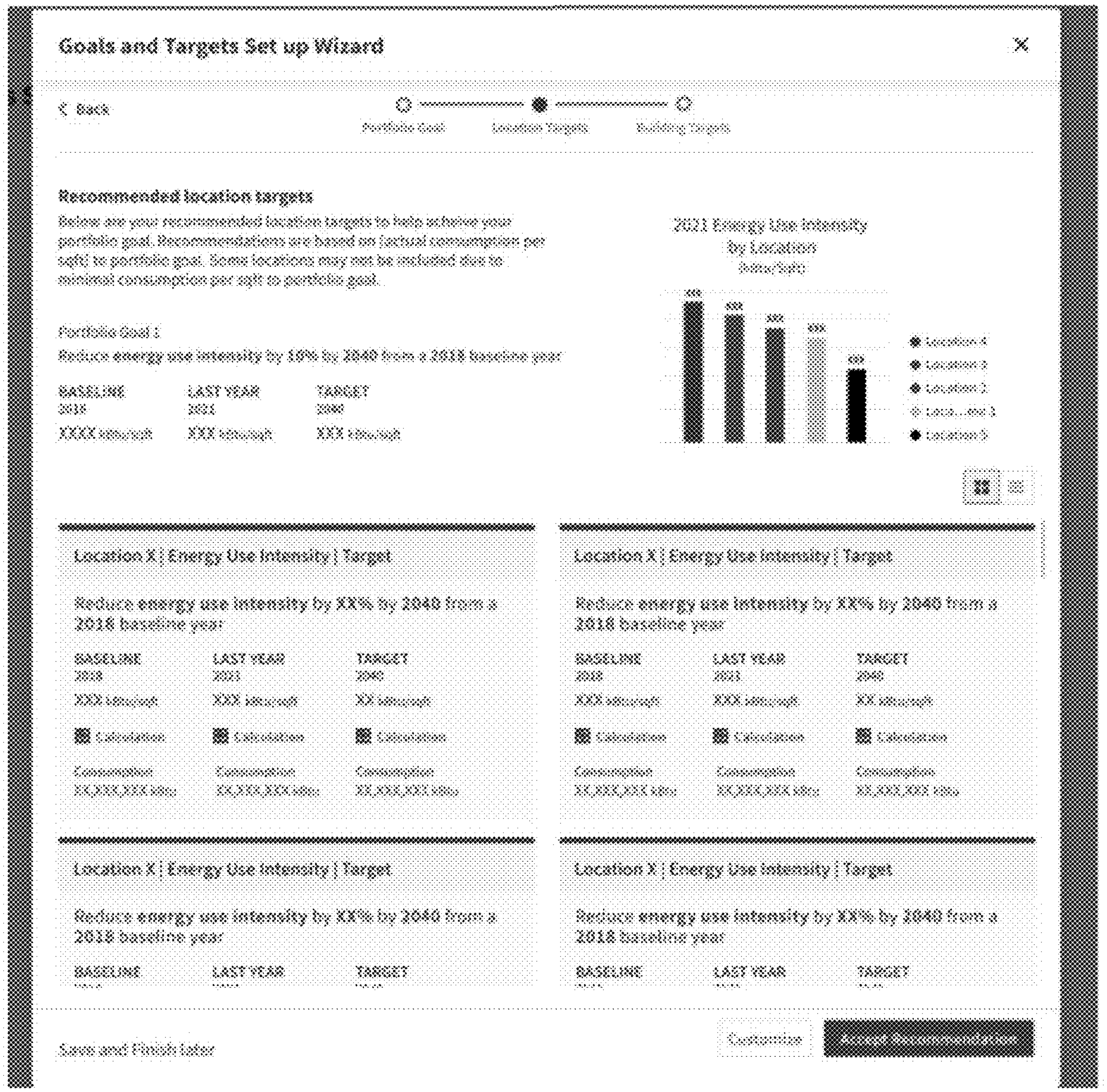
FIG. 75 is a user interface displaying a location targets window associated with a goals and targets dashboard, according to an exemplary embodiment.

Referring to FIG. 75, a user interface is displayed. The user interface includes a location targets window. The user can be directed to the FIG. 75 window by selecting the next tab in FIG. 74. In some embodiments, the sustainability manager can generate one or more recommendations for one or more locations associated with a business. The sustainability manager can use a business goal to generate the recommendations. The recommendations can include an emissions target for one or more locations. In some embodiments the business goal can be the business goal established in FIG. 26, 27 or 74.

Figure 76:
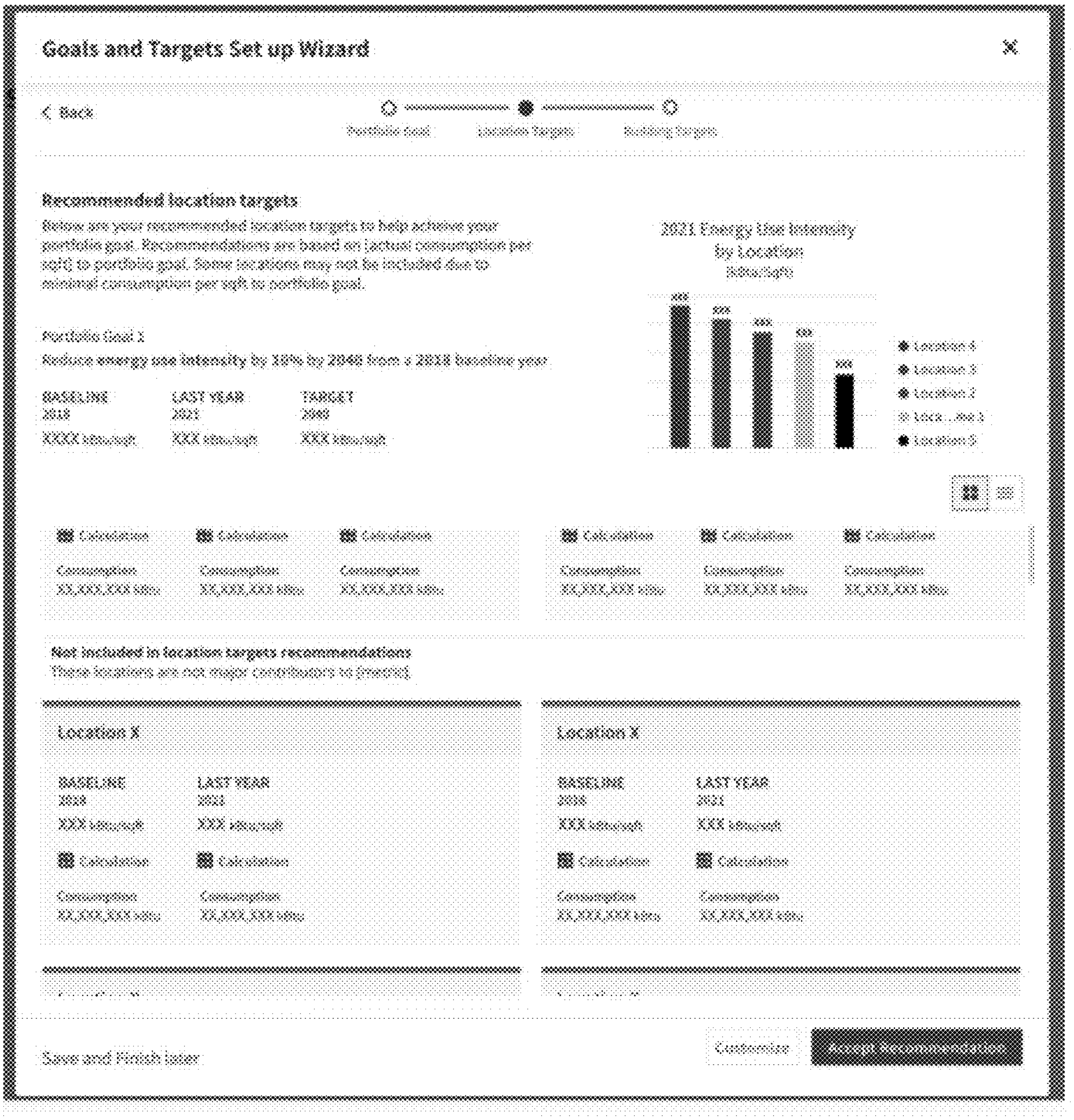
FIG. 76 is a user interface displaying a location targets window associated with a goals and targets dashboard, according to an exemplary embodiment.

Referring to FIG. 76, a user interface is displayed. The user interface can include a locations target window. The sustainability generator can determine that one or more locations are not major contributors to the business emissions value. In some embodiments, the sustainability generator can determine that a location target recommendation will not be included. In some embodiments the FIG. 76 window and the FIG. 75 window can be included in a single user interface. In some embodiments the business goal can be the business goal established in FIG. 26, 27 or 74.

Figure 77:
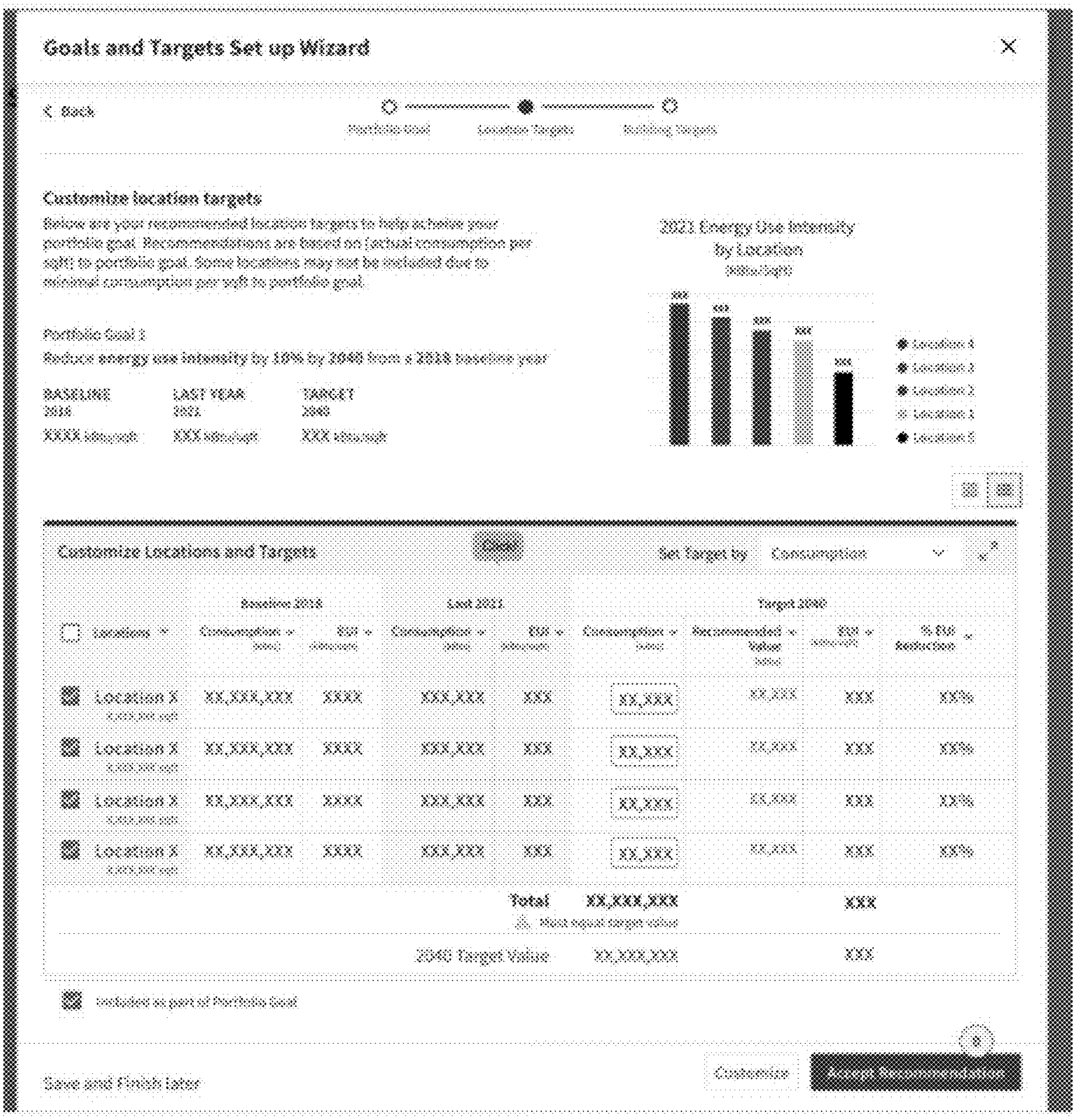
FIG. 77 is a user interface displaying a location targets window associated with a goals and targets dashboard, according to an exemplary embodiment.

Referring to FIG. 77, a user interface is displayed. The user interface can include a locations target window. The target window can include location information in a list view. In some embodiments, the information can be the same as the information displayed in FIG. 76. The user can select a set target by tab to customize the target. The target can be set by consumption, EUI or % EUI reduction. The user can select the accept recommendation tab to complete the recommendation.

Figure 78:
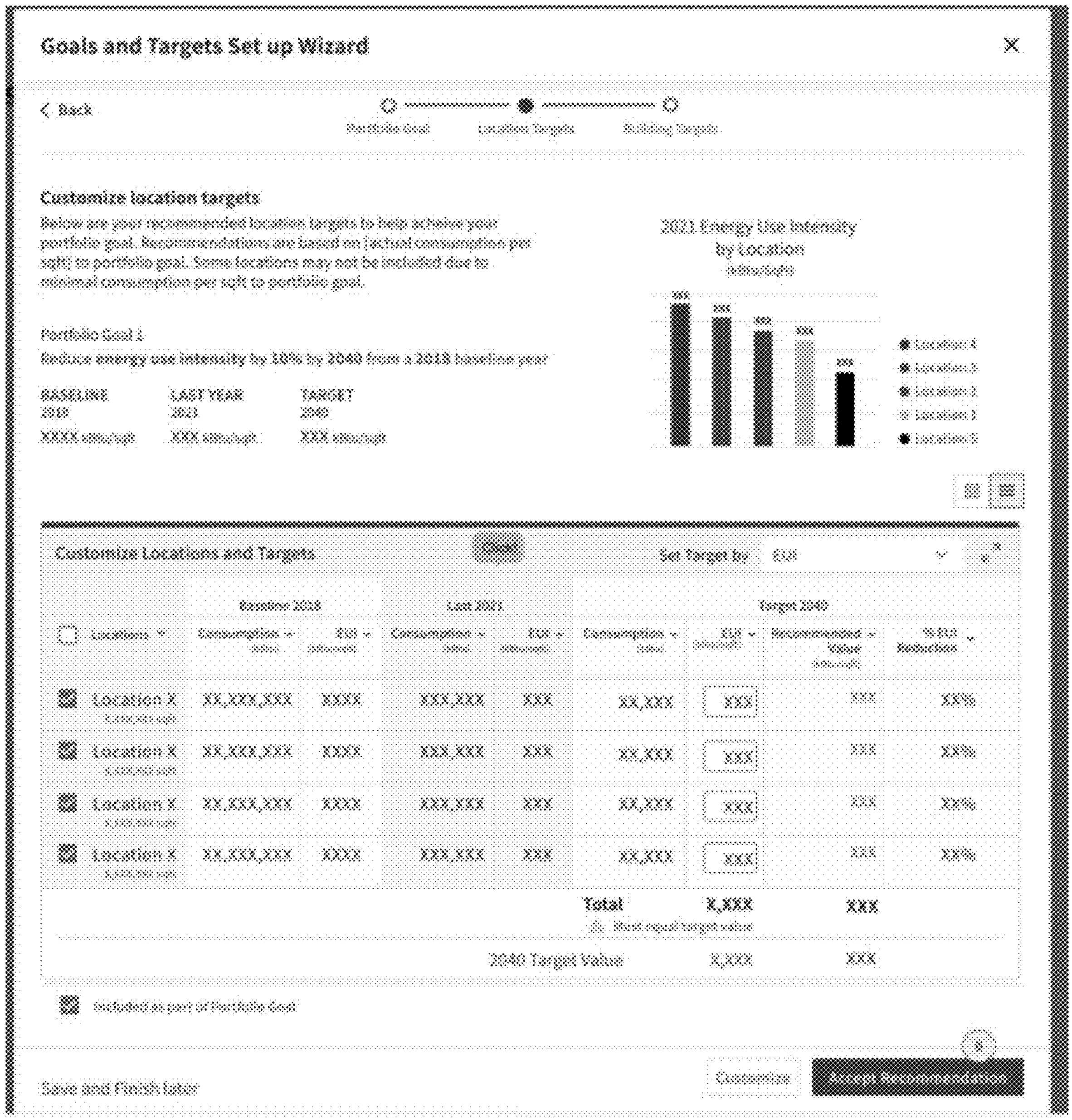
FIG. 78 is a user interface displaying a location targets window associated with a goals and targets dashboard, according to an exemplary embodiment.

Referring to FIG. 78, a user interface is displayed. The user interface can include a locations target window. The target window can include location information in a list view. In some embodiments, the information can be the same as the information displayed in FIG. 76. The customize locations and target information can be generated after the user has selected to set target by using EUI. The user can select the accept recommendation tab to complete the recommendation.

Figure 79:
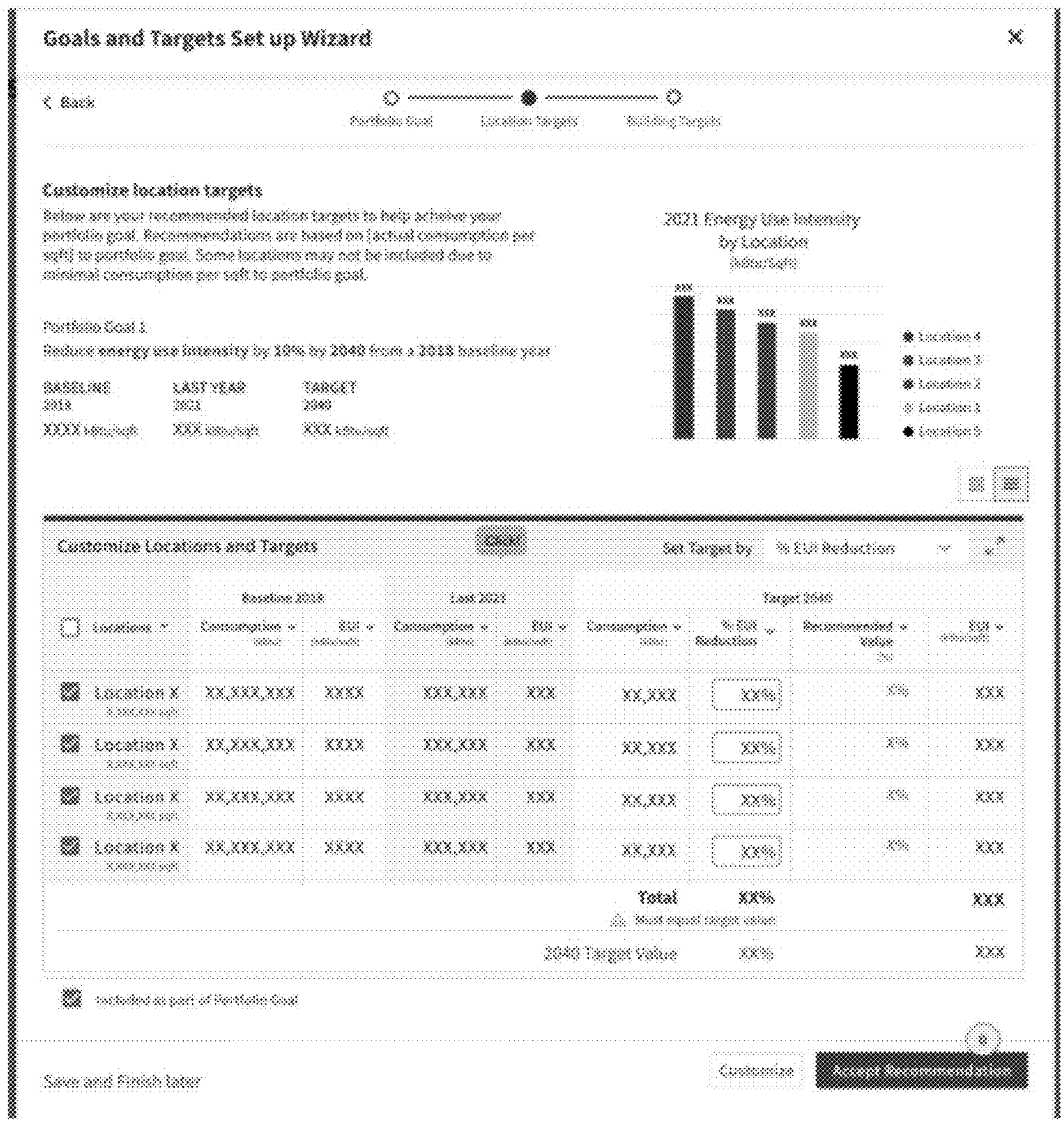
FIG. 79 is a user interface displaying a location targets window associated with a goals and targets dashboard, according to an exemplary embodiment.

Referring to FIG. 79, a user interface is displayed. The user interface can include a locations target window. The target window can include location information in a list view. In some embodiments, the information can be the same as the information displayed in FIG. 76. The customize locations and target information can be generated after the user has selected to set target by using % EUI reduction. The user can select the accept recommendation tab to complete the recommendation.

Figure 80:
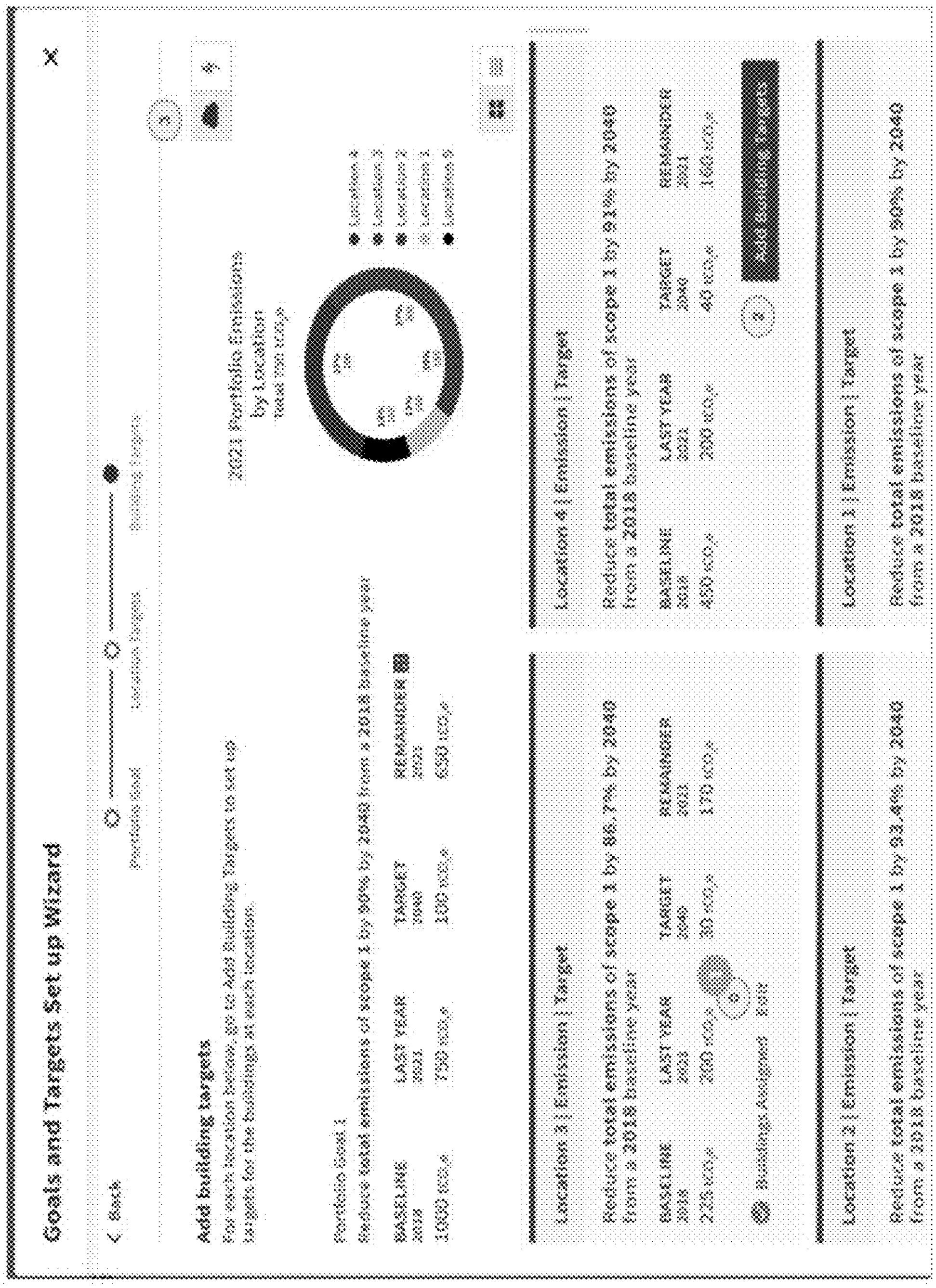
FIG. 80 is a user interface displaying a building targets window associated with a goals and targets dashboard, according to an exemplary embodiment.

Referring to FIG. 80, a user interface is displayed. The user interface includes a building targets window. As describe herein a location can have one or more buildings. The sustainability manager can use the location recommendations to generate one or more building targets for the one or more buildings associated with a location. In some embodiments, the information displayed, provided, produced or otherwise displayed in FIG. 80 can be similar to the information so in at least one FIGS. 35-45. The user interface can include an icon that indicates that a building target has been assigned to at least one of the locations associated with the business. For example, FIG. 80 includes a check mark in the location 3 window. The check mark indicates that at least one building has been assigned to location 3. The building can be assigned to location 3 in response to a building target being established for the building that is associated with location 3. In some embodiments, the check mark can be included in, provided as an overlay or otherwise shown in at least one of the user interfaces described herein.

The user interface displayed in FIG. 80 can also include an add building target icon. The add building target icon shown in FIG. 80 corresponds to buildings associated with location 4. In some embodiments, the add building target icon will be shown when building targets have not been established for a location. In some embodiments, the add building target icon can be replaced by the check mark that indicates that a building target has been assigned to the location. In some embodiments, the add building target icon can be included in, provided as an overlay or otherwise shown in at least one of the user interfaces described herein.

Figure 81:
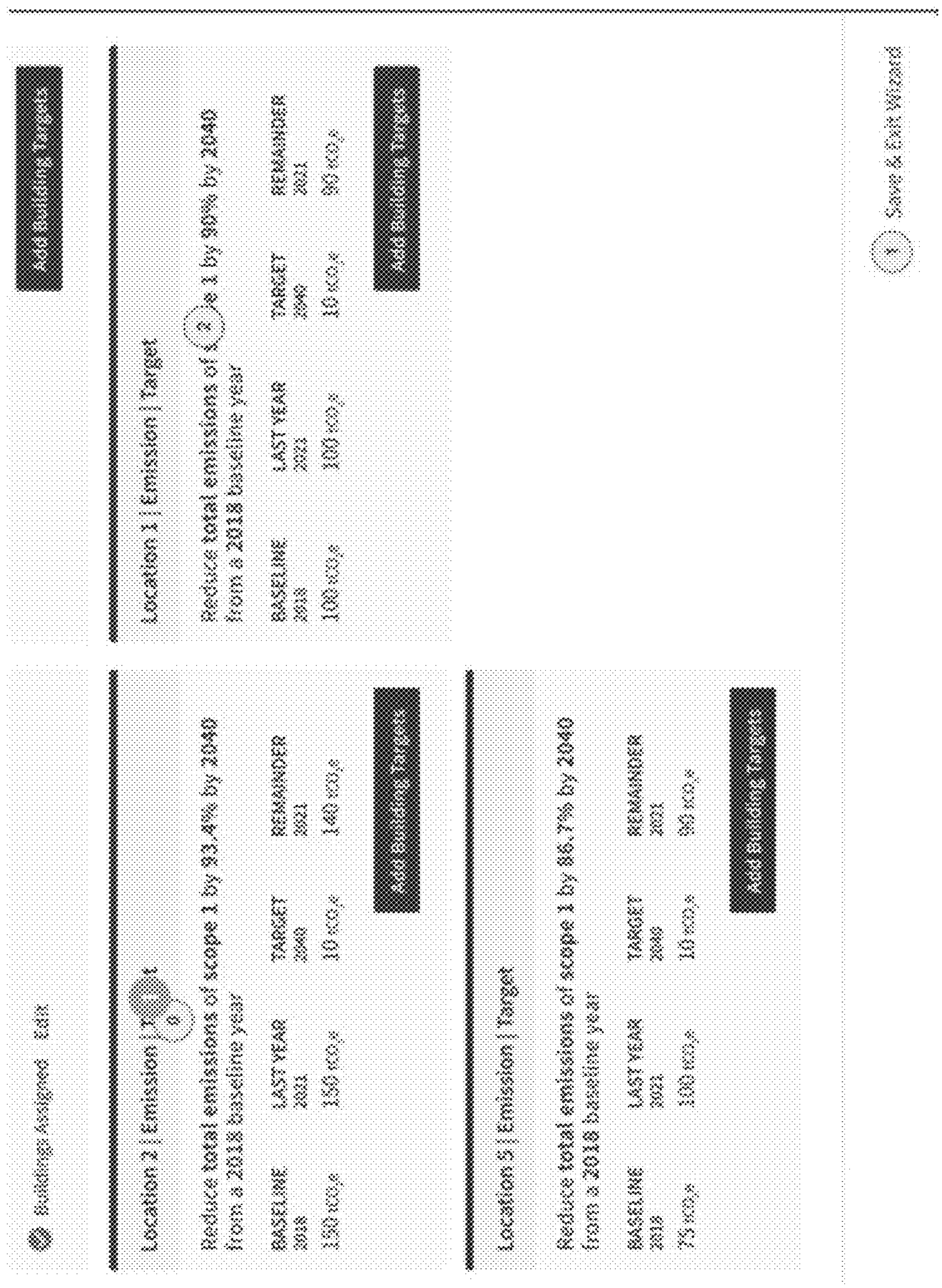
FIG. 81 is a user interface displaying a building targets window associated with a goals and targets dashboard, according to an exemplary embodiment.

Referring to FIG. 81, a user interface is displayed. In some embodiments, the user interface shown in FIG. 81 can be included in, provided as an overlay or otherwise shown with FIG. 80. For example, FIG. 81 can include location windows that are associated with the business that was shown in FIG. 80. Similarly, FIG. 81 can include the check mark that indicates that a building target has been assigned and/or FIG. 81 can include the add building target icon.

Figure 82:
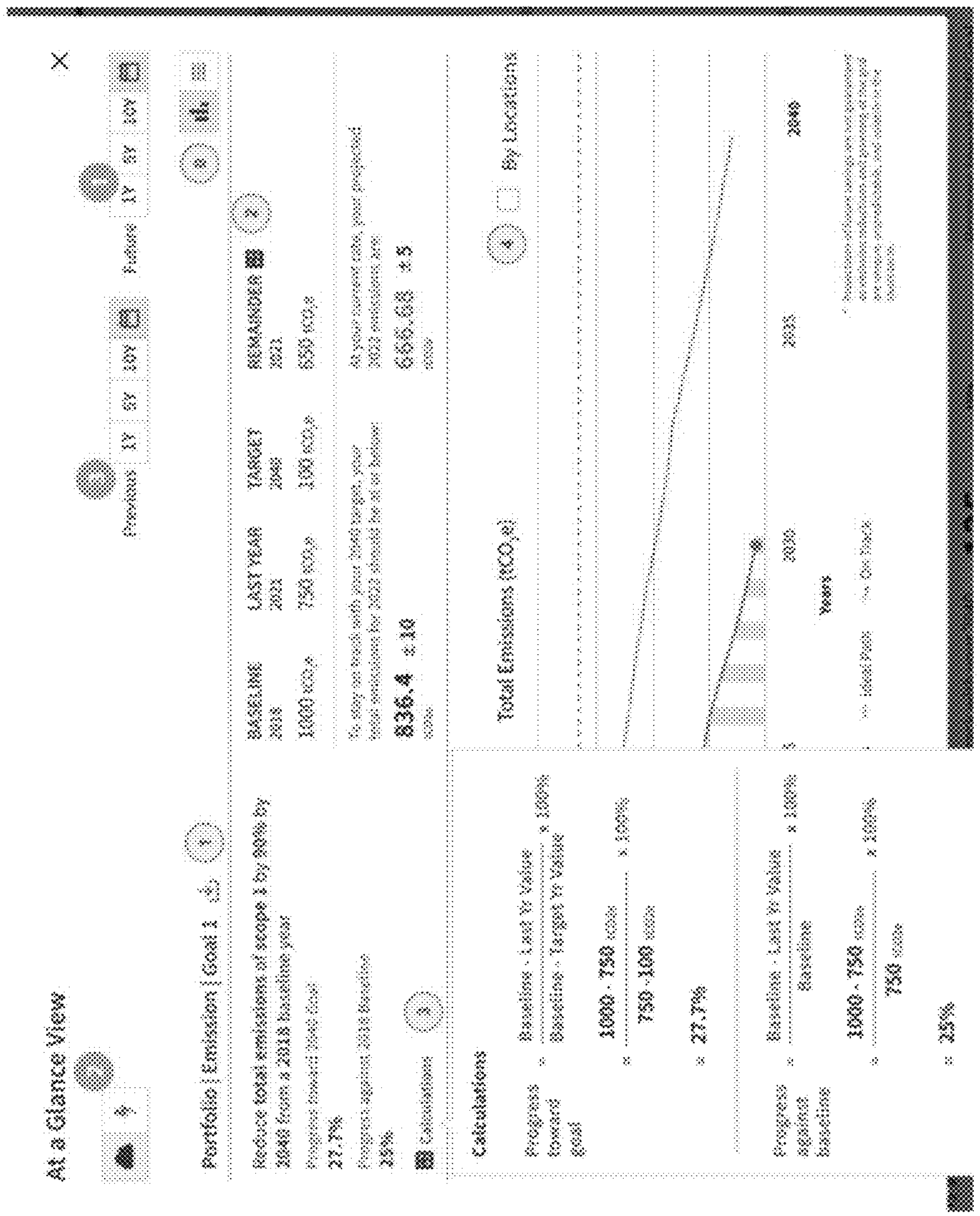
FIG. 82 is a user interface displaying a window associated with a goals and targets dashboard, according to an exemplary embodiment.

Referring to FIG. 82, a user interface is displayed. In some embodiments, the information displayed, shown or otherwise provided by the user interface can include information that is similar to the information shown in at least one FIGS. 49, 50, 51, 52, 69, 70, 71 and/or 72. In some embodiments, the user interface can include a calculation icon. An operator of the device displaying the user interface can select, hover across or otherwise interact with the calculation icon. In some embodiments, the operator interacting with the calculation icon can cause a calculation dropdown to be displayed. The calculation dropdown can be at least one of an overlay that is provided on top of the user interface, a user interface that replaces the user interface shown in FIG. 82 and/or a pop up window.

The calculation dropdown can provide information that pertains to how the progress towards the business goal has been calculated. For example, FIG. 82 shows that the progress towards the business goal can be calculated by calculating a first difference between the baseline metric and the most recent parameter value and then dividing the first difference by a second difference between the most recent parameter value and the target parameter value. The first difference divided by the second difference can then be multiplied by 100 to provide the progress toward goal percentage.

Similarly, the calculation dropdown can provide information that pertains to how the progress against the baseline metric has been calculated. For example, FIG. 82 shows that the progress against the baseline metric can be calculated by calculating a first difference between the baseline metric and the most recent parameter value and then dividing the first difference by the baseline metric. The first difference divided by the baseline metric can then be multiplied by 100 to provide the progress against the baseline metric.

Figure 83:
FIG. 83 is a user interface displaying a goals and targets dashboard, according to an exemplary embodiment.

Referring to FIG. 83, a user interface is displayed. The user interface can include a goals and targets dashboard. In some embodiments, the user can be directed to the goals and targets dashboard by selecting the next tab in FIG. 43-45. The dashboard can include a business goals summary and at least one location goal summary. The business goals summary can include information about emissions, energy, water or waste. The information about emissions can include a business goal. In some embodiments, the business goal can be the business goal in FIG. 26, 27 or 74. The business goal summary can include a current emissions value and a target emissions value. In some embodiments, the current emissions value is based on usage data and the target emissions value is based on the business goal. In some embodiments, the locations can include at a glance tab. The business summary can also include a progress towards goal and a progress against baseline.

The location goal summary can include a current emissions value and a target emissions value. The current emissions value can be at least one of a predicted end of year emission value, an emission value determined after the passing of a predetermined amount of time (e.g., the value was determined after 30 days), or any other possible measure emission value. The target emission value can be based on the business goal and/or the location target value that was previously established. The business goal summary or the location goal summary can include a prompt, an icon or any other possible icon that can indicate that a building target has not been setup for the business and/or a location associated with the business. For example, FIG. 83 includes a prompt in the location 4 goal summary and a prompt in the location 3 goal summary. The prompts can indicated that a building target has not been setup for location 4 and/or location 3. The operator of the device displaying FIG. 83 select the finish setup icon shown in at least one of the location 3 goal summary or the location 4 goal summary. In some embodiments, information similar to that shown in at least one of FIGS. 56-66 can be shown in the user interface responsive to the operator selecting at least one of the finish setup icons.

Figure 84:
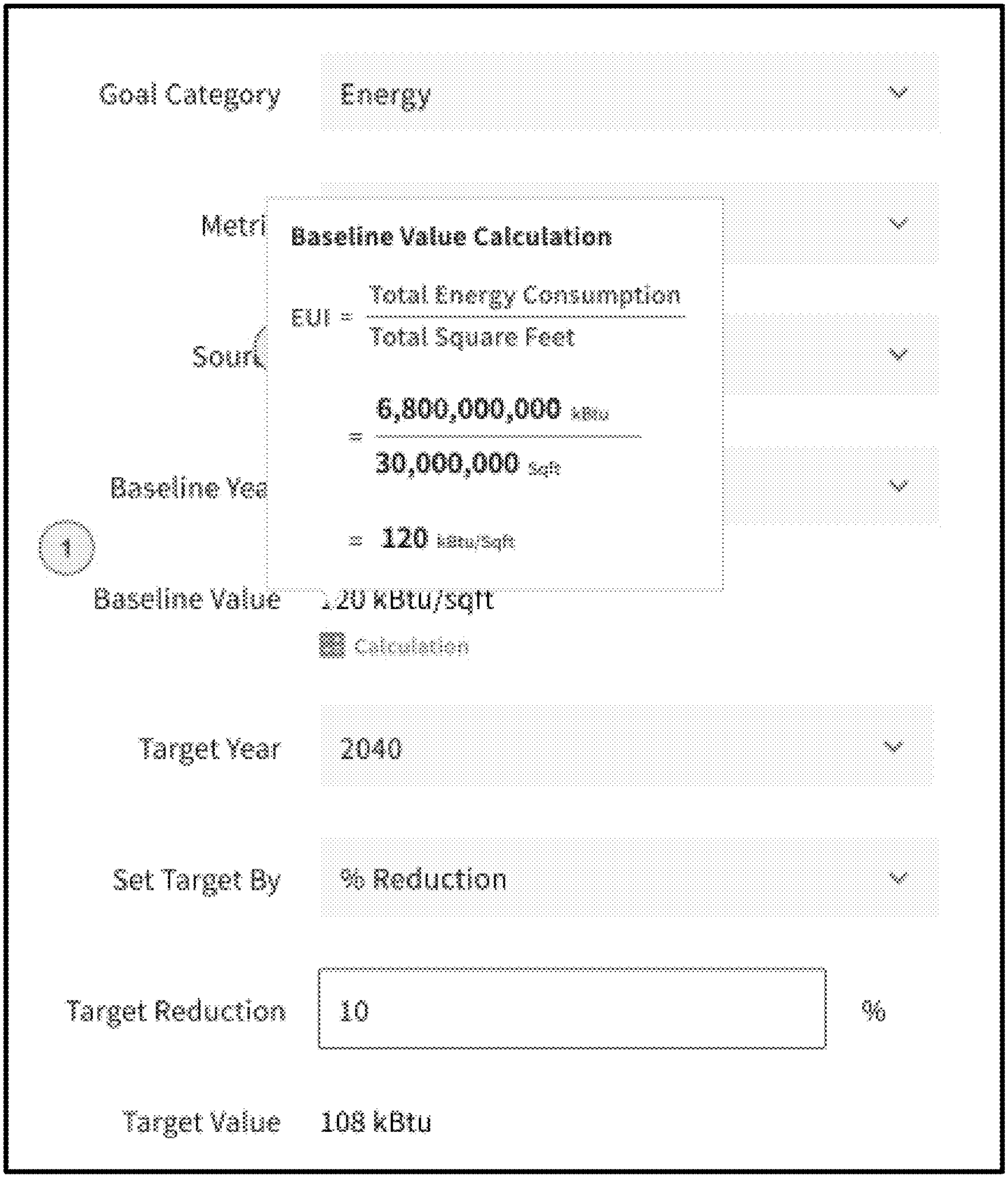
FIG. 84 is user interface displaying a business goal window associated with a goals and targets dashboard, according to an exemplary embodiment.

Referring to FIG. 84, a user interface is displayed. In some embodiments, the information shown in FIG. 84 can be similar to or include information shown in at least one of FIG. 26, 27 or 74. For example, the user interface includes a window that allows a user to establish a business level goal. In some embodiments, the user can reach the FIG. 84 window by selecting the add goal tab in the FIG. 73 window. The window can include a baseline value. The baseline value can correspond with the emission metric that the operator has selected. For example, in FIG. 84 the metric is Energy Usage Intensity (EUI) and the baseline value is shown to be 120 kBtu/sqft. An operator of the display can select the calculation icon to be provided information that pertains to how the baseline value can be calculated. For example, FIG. 84 includes a baseline value calculation window.

The baseline value calculation window can be generated response to the operator hovering over, selecting or otherwise interacting with the calculation icon. The baseline calculation window can be at least one an overlay on top of the additional information shown in FIG. 84, a dropdown window, or pop up window. FIG. 84 shows that the baseline value can be calculated by dividing the total energy consumption by the total square feet. In some embodiments, the total energy consumption can correspond to the total energy consumption of at least one of the business, at least one location associated with the business and/or at least one building associated with the business or the locations associated with the business. In some embodiments, the total square feet can correspond to the total square feet of at least one of the business, at least one location associated with the business and/or at least one building associated with the business or the locations associated with the business.

In some embodiments, at least one business goal can be established. In some embodiments, a business goal can be established responsive to an operator selecting and/or entering at least one of a goal category, a metric, an emission scope, a baseline year, a target year and/or a target value and once the information has been selected and/or entered the operator can select the next icon to establish the business goal. For example, a business goal can be established after the operator, of the device displaying the user interface in FIG. 24, has selected and/or entered the information shown in FIG. 24 and the operator has selected the next icon shown in FIG. 24.

In some embodiments, the business goal can be a sustainability target. The sustainability target can be or include at least one target sustainability level. The sustainability target can include at least one sustainability performance. The sustainability performances can be or include parameters. The parameters can be associated with the sustainability of the business. The parameters can be at least one of greenhouse gas emission, electricity consumption, natural gas consumption, diesel consumption and/or butane consumption. As described herein a business can include at least one location and the locations can include at least one building and the buildings can include at least one piece of building equipment. The parameters can be associated with the business, the locations, the buildings, the pieces of the building equipment and/or any possible combination of the business, the locations, the buildings or the pieces of building equipment. For example, the parameter can be how much electricity is consumed by the business in a predetermined amount of time (e.g., how much energy is consumed every day, every month, every year or any other possible amount of time).

In some embodiments, the sustainability manager can, responsive to the sustainability manager providing signals to the device, cause the device to display the user interface shown if FIG. 24. In some embodiments, the sustainability manager can cause the user device 318 to display a user interface that can be used to establish a business goal (e.g., the user device 318 can display at least one of the user interfaces shown in FIG. 24, 25 or 74). The sustainability manager can establish the business goal responsive to the sustainability manager determining that the operator has selected and/or entered the information shown in FIG. 24 and that the operator has selected the next icon. The sustainability manger, responsive to establishing the business goal, can generate, using the sustainability target and a baseline value for the parameter included in the sustainability target, at least one target value for the parameter. In some embodiments, the target value can be established responsive to the operator providing the target value to the sustainability manager. For example, the target value has been entered in FIG. 24 by the operator. In some embodiments, the sustainability target can a percent reduction in the parameters and/or the sustainability target can be a net zero date. For example, the sustainability target can be to reduce total emissions by 90%. The sustainability manager can use the sustainability target of reducing total emissions by 90% to generate the target value.

In some embodiments, the sustainability manager can, responsive to generating the target value, identify at least one control action that can meet the target value. The control actions can be at least one of adjusting setpoints (e.g., temperature setpoints for a building or a zone of the building, equipment runtime setpoints, lighting setpoints, etc.), control schemes, control strategies and/or any other possible action that can be taken to control pieces of building equipment.

The sustainability manager can provide, to business manager (e.g., the operator that established the business goal), the control actions. The business manager can select a subset of the control actions. The sustainability manager can, in response to receiving an indication, form the business manager, to accept the subset of the control actions, operate, using the subset of control actions, one or more pieces of building equipment.

Referring now to FIG. 85, a flow diagram of a process 8500 for improving sustainability of a set of one or more buildings, is shown according to an exemplary embodiment. The set of one or more buildings can be or include the building 10. The building 10 can be or be including in at least one location of a business. For example, the building 10 can be located in a first campus of a business and the business can include a plurality of campuses. The building 10 can contribute to the sustainability of itself and/or the sustainability of the business. In some embodiments, at least one step of the process 8500 can be performed by the system 300 and/or a component thereof. For example, the sustainability advisor 320 can perform at least one step of the process 8500. In some embodiments, at least one step of the process 8500 can be performed by the sustainability manger and/or a component thereof. In some embodiments, at least one step of the process 8500 can be performed by at least one component depicted in FIG. 8. In some embodiments, at least one step of the process 8500 can be performed by the system 900 and/or a component thereof.

In step 8505, operational data can be received. For example, the sustainability manager can receive operational data that pertains to a set of one or more buildings. The set of one or more buildings can be or include the building 10. The operational data can be or include operational data for one or more pieces of equipment included in the set of one or more buildings and/or one or more pieces of equipment that serve the set of one or more buildings. The operational data can be or include at least one of current operational data and/or historical operational data. For example, the operational data can be an average of the operational data over a set amount of time (e.g., average over an hour, a day, a week, a month, a year, and a decade). The operational data can be or include data similar to facility data 312, utility access data 316, and/or any other data stored and/or located in data storage 324.

In step 8510, a baseline sustainability performance can be determined. The baseline sustainability performance can be determined using the operational data received in the step 8505. For example, the sustainability manager can use the utility bills retrieved by the energy bill retrieval system 304 to determine a baseline energy consumption level (e.g., a baseline sustainability performance). The baseline sustainability performance can also be a collection of baseline levels. For example, the baseline sustainability performance can be a collection of baseline values for electricity consumption, emissions, water consumption, waste production, and/or other sustainability factors and/or metrics described herein.

The baseline sustainability performances can be provided to a user. For example, the baseline sustainability performances can be provided to a user associated with the user device 318. The baseline sustainability performances can be or included in the sustainability reports generated by the analyzer 408. The baseline sustainability performances can be provided as a user interface, displayed on and/or by the user device 318, similar to the user interface shown in FIG. 28.

In step 8515, a sustainability goal can be established. The sustainability goal can be established for the set of one or more buildings. For example, the sustainability goal can be established for the building 10. The sustainability goal can improve a sustainability of the set of one or more buildings. For example, the sustainability goal can improve the sustainability of the building 10. The sustainability manager can, using the baseline sustainability performances determined in step 8510, establish the sustainability goals. The sustainability goals can also be established by a user selecting an icon included in and/or on the user interface displaying the baseline sustainability performances. For example, the sustainability goals can be established, by the sustainability manager, responsive to the user selection the next icon displayed in FIG. 27.

The sustainability goals can include at least one target sustainability level and at least one timeframe to achieve the target sustainability level. For example, the target sustainability level can be to reduce yearly carbon emissions, for the building 10, from 1000 $tco_2e$ (tonne's of carbon dioxide equivalent) to 100 $tco_2e$. The timeframe can be an amount of time set aside to reach the target sustainability level. For example, the timeframe can be 10 years and in this example along with the example of reducing the buildings (e.g., building 10) yearly carbon emission to 100 $tco_2e$ (e.g., the target sustainability level) the sustainability goals includes reaching 100 $tco_2e$ within 10 years.

In step 8520, one or more operational changes can be generated. The operational changes can be generated responsive to the establishing of the sustainability goal in step 8515. The operational changes can be generated by the sustainability manager. The sustainability manager can use the baseline sustainability performances from step 8510 and the sustainability goal from step 8515 to generate the operational changes. The operational changes can include and/or pertain to one or more pieces of equipment. For example, the operational changes can pertain to the pieces of equipment described with respect to step 8505. The operational changes can be or include at least one of control actions, control strategies, equipment maintenance, equipment repairs, replacement of equipment, retrofitting of additional and/or subsequent pieces of equipment and/or among other FIMs described herein. For example, the operational changes can be adjusting a temperature setpoint for at least one of a room, a zone, a floor and or a building. The operational changes can also be replacing a boiler with a more energy efficient boiler. Similarly, the operational changes can include providing additional solar power generating systems and/or devices (e.g., solar photovoltaic (PV) cells, fuel cells, energy storage). The operational changes can move the sustainability of the buildings towards the target sustainability level. For example, the operational changes can result and/or assist in the building 10 reducing its yearly carbon emissions from a baseline value (e.g., the baseline sustainability performance) to the established target sustainability level.

In step 8525, operational changes can be outputted. The operational changes can be the operational changes generated in step 8520. The operational changes can be output by the sustainability manager. For example, the sustainability manager can output the operational changes by providing the operational changes to the pieces of equipment impacted by the operational changes. Similarly, the operational changes can be output to a user via a user device (e.g., the user device 318). For example, the operational changes can include performing maintenance on one of the pieces of building equipment impacted by the operational changes, and the operational changes can include alerting a maintenance worker and/or company that can service the building 10 and/or perform the maintenance on the impacted pieces of building equipment.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS), the BMS including one or more memory devices storing instructions thereon that, when executed by one or more processors, cause the one or more processors to:

receive, for a set of one or more buildings, operational data for the set of one or more buildings, the operational data comprising at least one of current or historical operational data;

determine, for the set of one or more buildings, a baseline sustainability performance based on the operational data;

establish, for the set of one or more buildings, a sustainability goal to improve a sustainability of the set of one or more buildings from the baseline sustainability performance, the sustainability goal comprising a target sustainability level and a timeframe to achieve the target sustainability level;

generate, using the baseline sustainability performance and the sustainability goal, a plurality of control actions for a plurality of pieces of building equipment of the set of one or more buildings to move the sustainability of the set of one or more buildings towards the target sustainability level; and control the plurality of pieces of building equipment using the plurality of control actions.

2. The BMS of claim 1, wherein the sustainability goal comprises a goal to improve a sustainability level impacted by a plurality of sustainability characteristics of the set of one or more buildings, and wherein the instructions cause the one or more processors to:

determine, using the baseline sustainability performance and the sustainability goal, target characteristic levels for the plurality of sustainability characteristics to achieve, in the aggregate, the target sustainability level within the timeframe; and generate, using the target characteristic levels for the plurality of sustainability characteristics, a second plurality of control actions to move operation of the set of one or more buildings towards the target characteristic levels.

3. The BMS of claim 1, wherein generating the plurality of control actions comprises:

generating a first control action for a first set of one or more pieces of the building equipment in a first building equipment domain based on a first target characteristic level of a first sustainability characteristic of a plurality of sustainability characteristics; and generating a second control action for a second set of one or more pieces of the building equipment in a second building equipment domain based on a second target characteristic level of a second sustainability characteristic of the plurality of sustainability characteristics, the second building equipment domain different than the first building equipment domain.

4. The BMS of claim 1, wherein the instructions cause the one or more processors to:

receive an indication to update the target sustainability level, wherein the indication includes a user defined target sustainability level that pertains to the sustainability goal for the set of one or more buildings;

determine, using the user defined target sustainability level and the sustainability goal, that the user defined target sustainability level satisfies the sustainability goal; and update the target sustainability level to reflect the user defined target sustainability level.

5. The BMS of claim 1, wherein the instructions cause the one or more processors to:

receive, responsive to using the plurality of control actions to control the plurality of pieces of building equipment, second operational data for the set of one or more buildings;

determine, using the second operational data for the set of one or more buildings, a current sustainability performance, wherein the current sustainability performance is determined responsive to a predetermined period of time;

determine a difference between the current sustainability performance and the baseline sustainability performance; and determine, responsive to the difference being larger than a predetermined threshold, that the sustainability of the set of one or more buildings has improved.

6. The BMS of claim 1, wherein the instructions cause the one or more processors to cause a user interface to display an element, wherein the element includes the target sustainability level, the baseline sustainability performance and a difference between the target sustainability level and the baseline sustainability performance.

7. The BMS of claim 1, wherein the instructions cause the one or more processors to:

establish, for a particular building of the set of one or more buildings, a second sustainability goal, wherein the second sustainability goal includes a second target sustainability level associated with the particular building of the set of one or more buildings; and generate, using the second target sustainability level and a second baseline sustainability performance, a second plurality of control actions that move the sustainability of the particular building of the set of one or more buildings towards the second target sustainability level.

8. The BMS of claim 7, wherein the instructions cause the one or more processors to:

receive an indication to update the second target sustainability level, wherein the indication includes a second user defined target sustainability level; and update the second target sustainability level to reflect the second user defined target sustainability level responsive to determining that the second user defined target sustainability level satisfies the second sustainability goal.

9. The BMS of claim 1, wherein the instructions cause the one or more processors to:

establish, for a particular building of the set of one or more buildings, a third sustainability goal, wherein the third sustainability goal includes a third target sustainability level, wherein the particular building includes a second plurality of pieces of building equipment; and generate, using the third target sustainability level and a third baseline sustainability performance, one or more control actions for the second plurality of pieces of building equipment to move the sustainability of the particular building towards the third target sustainability level.

10. The BMS of claim 9, wherein the instructions cause the one or more processors to:

control the second plurality of pieces of building equipment using the one or more control actions;

receive operational data for the second plurality of pieces of building equipment; and determine, using the operational data for the second plurality of pieces of building equipment, that the sustainability of the particular building has moved towards the third target sustainability level.

11. The BMS of claim 1, wherein the sustainability of the set of one or more buildings pertains to at least one of:

carbon emission;

greenhouse gas emission;

electricity consumption;

natural gas consumption;

diesel consumption; or butane consumption.

12. A method of improving sustainability of a set of one or more buildings, the method comprising:

receiving, by one or more processors for the set of one or more buildings, operational data for the set of one or more buildings, the operational data comprising at least one of current or historical operational data;

determining, by the one or more processors for the set of one or more buildings, a baseline sustainability performance based on the operational data;

establishing, by the one or more processors for the set of one or more buildings, a sustainability goal to improve the sustainability of the set of one or more buildings from the baseline sustainability performance, the sustainability goal comprising a target sustainability level and a timeframe to achieve the target sustainability level;

generating, by the one or more processors using the baseline sustainability performance and the sustainability goal, one or more operational changes for a plurality of pieces of building equipment of the set of one or more buildings to move the sustainability of the set of one or more buildings towards the target sustainability level; and outputting, by the one or more processors, the one or more operational changes.

13. The method of claim 12, wherein the sustainability goal comprises a goal to improve a sustainability level impacted by a plurality of sustainability characteristics of the set of one or more buildings, and comprising:

determining, by the one or more processors using the baseline sustainability performance and the sustainability goal, target characteristic levels for the plurality of sustainability characteristics to achieve, in the aggregate, the target sustainability level within the timeframe; and generating, by the one or more processors using the target characteristic levels for the plurality of sustainability characteristics, a plurality of control actions to move operation of the set of one or more buildings towards the target characteristic levels.

14. The method of claim 12, comprising:

generating, by the one or more processors, a first control action for a first set of one or more pieces of the building equipment in a first building equipment domain based on a first target characteristic level of a first sustainability characteristic of a plurality of sustainability characteristics; and generating, by the one or more processors, a second control action for a second set of one or more pieces of the building equipment in a second building equipment domain based on a second target characteristic level of a second sustainability characteristic of the plurality of sustainability characteristics, the second building equipment domain different than the first building equipment domain.

15. The method of claim 12, comprising:

receiving, by the one or more processors, an indication to update the target sustainability level, wherein the indication includes a user defined target sustainability level that pertains to the sustainability goal for the set of one or more buildings;

determining, by the one or more processors using the user defined target sustainability level and the sustainability goal, that the user defined target sustainability level satisfies the sustainability goal; and updating, by the one or more processors, the target sustainability level to reflect the user defined target sustainability level.

16. The method of claim 12, wherein outputting the one or more operational changes comprises generating a recommendation to implement the one or more operational changes, and wherein the method further comprises:

receiving, by the one or more processors, approval to implement the one or more operational changes;

generating control actions to implement the one or more operational changes; and controlling the building equipment using the control actions.

17. The method of claim 12, comprising:

establishing, by the one or more processors for a particular building of the set of one or more buildings, a second sustainability goal, wherein the second sustainability goal includes a second target sustainability level associated with the particular building of the set of one or more buildings; and generating, by the one or more processors using the second target sustainability level and a second baseline sustainability performance, a plurality of control actions that move the sustainability of the particular building of the set of one or more buildings towards the second target sustainability level.

18. A carbon reduction system for a building, the carbon reduction system including one or more memory devices storing instructions thereon that, when executed by one or more processors, cause the one or more processors to:

receive operational data for the building, the operational data comprising at least one of current or historical operational data;

determine, for the building, a baseline value for carbon emissions based on the operational data; and establish, for the building, a carbon reduction goal to improve carbon emissions for the building from the baseline value for carbon emissions, the carbon reduction goal comprising a target value for carbon emissions and a timeframe to achieve the target value for carbon emissions.

19. The carbon reduction system of claim 18, wherein the instructions cause the one or more processors to:

generate, using the baseline value for carbon emissions and the carbon reduction goal, a plurality of control actions for a plurality of pieces of building equipment of the building to move the sustainability of the building towards the target value for carbon emissions; and control the plurality of pieces of building equipment using the plurality of control actions.

20. The carbon reduction system of claim 18, wherein the instructions cause the one or more processors to:

receive, responsive to using a plurality of control actions to control a plurality of pieces of building equipment of the building, second operational data for the building;

determine, using the second operational data for the building, a current value for carbon emissions, wherein the current value for carbon emissions is determined responsive to a predetermined period of time;

determine a difference between the current value for carbon emissions and the baseline value for carbon emissions; and determine, responsive to the difference being larger than a predetermined threshold, that the sustainability of the building has moved towards the target value for carbon emissions.

* * * * *